United States Patent
Blaney et al.

(10) Patent No.: US 12,067,048 B1
(45) Date of Patent: Aug. 20, 2024

(54) APPARATUS AND METHOD FOR ENTITY DATA AGGREGATION AND ANALYSIS

(71) Applicant: AUTOMATED SERVICE POINT LLC, Vero Beach, FL (US)

(72) Inventors: Jeffrey Blaney, Vero Beach, FL (US); Jonathan Hardie, Vero Beach, FL (US)

(73) Assignee: AUTOMATED SERVICE POINT LLC, Vero Beach, FL (US)

( * ) Notice: Subject to any disclaimer, the term of this patent is extended or adjusted under 35 U.S.C. 154(b) by 0 days.

(21) Appl. No.: 18/234,412

(22) Filed: Aug. 16, 2023

(51) Int. Cl.
*G06F 16/58* (2019.01)

(52) U.S. Cl.
CPC ................... *G06F 16/58* (2019.01)

(58) Field of Classification Search
CPC ........ G06F 16/58; G06F 16/583; G01C 21/34
See application file for complete search history.

(56) References Cited

U.S. PATENT DOCUMENTS

| | | | |
|---|---|---|---|
| 11,373,249 B1 | 6/2022 | Hayward | |
| 11,495,061 B2 | 11/2022 | Mylaraswamy | |
| 11,543,250 B2 * | 1/2023 | Gardiner | G01C 21/3484 |
| 2019/0251759 A1 | 8/2019 | Lora | |
| 2021/0357766 A1 | 11/2021 | Paul | |
| 2023/0083255 A1 | 3/2023 | Ebrahimi | |
| 2023/0244968 A1 * | 8/2023 | Gurin | G06N 3/0475 |
| | | | 706/11 |
| 2024/0046717 A1 * | 2/2024 | Sequino | G07C 5/0816 |

* cited by examiner

*Primary Examiner* — Loc Tran
(74) *Attorney, Agent, or Firm* — Caldwell Intellectual Property Law

(57) ABSTRACT

An apparatus and method for entity data aggregation and analysis is disclosed. The apparatus includes at least a processor and a memory communicatively connected to the at least a processor, wherein the memory contains instructions configuring the at least a processor to receive entity data from a data collection module, wherein the data collection module includes at least a sensor, determine an obstacle datum as a function of the entity data, classify the entity data into one or more obstacle groups as a function of the obstacle datum of the entity data, determine at least an obstacle resolution object as a function of an obstacle resolution template and generate the obstacle resolution data structure as a function of a template form field of an entity specific data structure template, the at least an obstacle resolution object and the one or more obstacle groups.

20 Claims, 13 Drawing Sheets

APPARATUS AND METHOD FOR ENTITY DATA AGGREGATION AND ANALYSIS

FIELD OF THE INVENTION

The present invention generally relates to the field of data aggregation. In particular, the present invention is directed to apparatus and method for entity data aggregation and analysis.

BACKGROUND

Aggregating data from different sources and analyzing it can be difficult. Existing technologies do not adequately utilize data processing to leverage existing reference data in order to provide evaluation of data.

SUMMARY OF THE DISCLOSURE

In an aspect, an apparatus for entity data aggregation and analysis is disclosed. The apparatus includes at least a processor and a memory communicatively connected to the at least a processor, wherein the memory contains instructions configuring the at least a processor to receive entity data from a data collection module, wherein the data collection module includes at least a sensor, determine an obstacle datum as a function of the entity data, classify the entity data into one or more obstacle groups as a function of the obstacle datum of the entity data, determine at least an obstacle resolution object as a function of the one or more obstacle groups, wherein determining the at least an obstacle resolution object includes retrieving an obstacle resolution template as a function of the one or more obstacle groups and determining the at least an obstacle resolution object as a function of the obstacle resolution template and generate an obstacle resolution data structure as a function of the at least an obstacle resolution object and the one or more obstacle groups, wherein generating the obstacle resolution data structure includes retrieving a plurality of data structure templates, determining an entity specific data structure template of the plurality of data structure templates as a function of the entity data, identifying a template form field of the entity specific data structure template and generating the obstacle resolution data structure as a function of the template form field of the entity specific data structure template, the at least an obstacle resolution object and the one or more obstacle groups.

In another aspect, a method for entity data aggregation and analysis is disclosed. The method includes receiving, using at least a processor, entity data from a data collection module, wherein the data collection module includes at least a sensor, determining, using the at least a processor, an obstacle datum as a function of the entity data, classifying, using the at least a processor, the entity data into one or more obstacle groups as a function of the obstacle datum of the entity data, retrieving, using the at least a processor, an obstacle resolution template as a function of the one or more obstacle groups, determining, using the at least a processor, at least an obstacle resolution object as a function of the obstacle resolution template, retrieving, using the at least a processor, a plurality of data structure templates, determining, using the at least a processor, an entity specific data structure template of the plurality of data structure templates as a function of the entity data, identifying, using the at least a processor, a template form field of the entity specific data structure template and generating, using the at least a processor, an obstacle resolution data structure as a function of the template form field of the entity specific data structure template, the at least an obstacle resolution object and the one or more obstacle groups.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for entity data aggregation and analysis is disclosed. The apparatus includes at least a processor and a memory communicatively connected to the at least a processor, wherein the memory contains instructions configuring the at least a processor to receive entity data from a data collection module, wherein the data collection module includes at least a sensor, determine an obstacle datum as a function of the entity data, classify the entity data into one or more obstacle groups as a function of the obstacle datum of the entity data, determine at least an obstacle resolution object as a function of the one or more obstacle groups, wherein determining the at least an obstacle resolution object includes retrieving an obstacle resolution template as a function of the one or more obstacle groups and determining the at least an obstacle resolution object as a function of the obstacle resolution template and generate an obstacle resolution data structure as a function of the at least an obstacle resolution object and the one or more obstacle groups, wherein generating the obstacle resolution data structure includes retrieving a plurality of data structure templates, determining an entity specific data structure template of the plurality of data structure templates as a function of the entity data, identifying a template form field of the entity specific data structure template and generating the obstacle resolution data structure as a function of the template form field of the entity specific data structure template, the at least an obstacle resolution object and the one or more obstacle groups.

The invention leverages data collection modules that gather relevant information including entity data. This data may be then processed and aggregated to generate comprehensive insights related to entity data. The system may employ sophisticated algorithms to analyze the aggregated data, identifying patterns, correlations, and anomalies that can assist in diagnosing issues, predicting failures, and recommending optimal strategies. By harnessing the power of advanced technologies, such as artificial intelligence, machine learning, and data analytics, the invention can enable the automated processing and interpretation of vast amounts of entity data from various sources. Exemplary embodiments illustrating aspects of the present disclosure are described below in the context of several specific examples.

Figure 1:
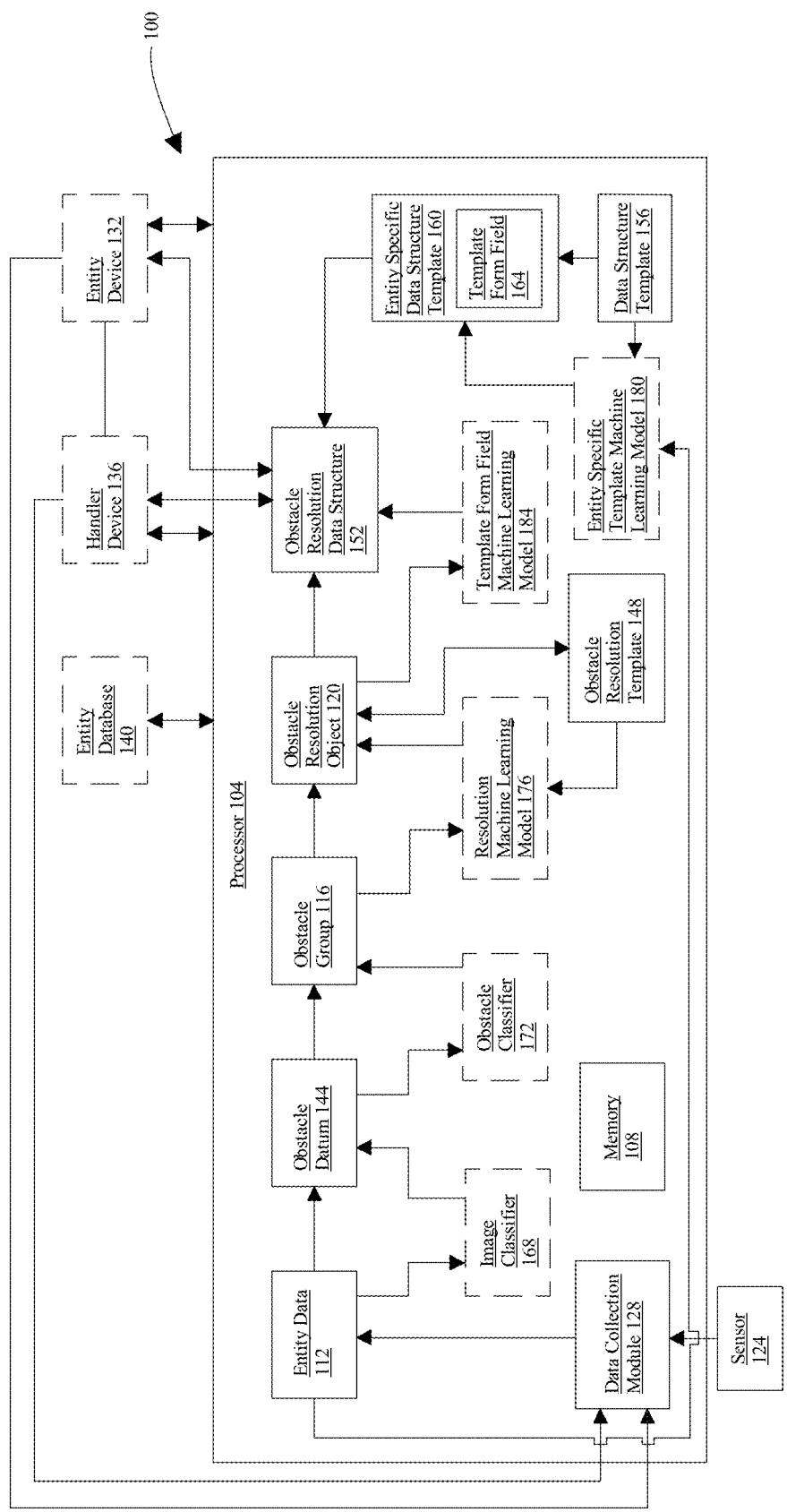
FIG. 1 illustrates a block diagram of an exemplary apparatus for data aggregation and analysis.

Referring now to FIG. 1, an exemplary embodiment of an apparatus 100 for entity data aggregation is illustrated. Apparatus 100 includes at least a processor 104. Processor 104 may include, without limitation, any processor described in this disclosure. Processor 104 may be included in a computing device. Processor 104 may include any computing device as described in this disclosure, including without limitation a microcontroller, microprocessor, digital signal processor (DSP) and/or system on a chip (SoC) as described in this disclosure. Processor 104 may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented, as a non-limiting example, using a "shared nothing" architecture.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 includes a memory 108 communicatively connected to processor 104. For the purposes of this disclosure, "communicatively connected" means connected by way of a connection, attachment or linkage between two or more relata which allows for reception and/or transmittance of information therebetween. For example, and without limitation, this connection may be wired or wireless, direct or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio and microwave data and/or signals, combinations thereof, and the like, among others. A communicative connection may be achieved, for example and without limitation, through wired or wireless electronic, digital or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, memory 108 contains instructions configuring processor 104 to receive entity data 112. For the purposes of this disclosure, "entity data" are information related to an entity associated with an obstacle datum handler. For the purposes of this disclosure, an "entity" is a person, organization, object, or any other identifiable entity in an apparatus 100. As a non-limiting example, entity may include a user, vehicle, machinery, home appliance, medical equipment, or the like. For the purposes of this disclosure, a "user" is a person, organization, object or any other identifiable entity associated with an obstacle datum handler. As a non-limiting example, user may include driver, owner, passenger, or the like of a vehicle. For the purposes of this disclosure, a "vehicle" is any means in or by which someone or something may be transported. As a non-limiting example, vehicle may include a car, truck, bus, motorcycle, bicycle, watercraft, aircraft, spacecraft, and the like. For the purposes of this disclosure, an "obstacle datum handler" is a component or entity that is responsible for processing and managing entity data. In some cases, obstacle datum handler may include a human laborer; for instance, and without limitation, a technician, service manager, parts manager, customer support, dealer, or the like. In other cases, obstacle datum handler may include a computing device having a processor capable of processing incoming entity data associated with a designated obstacle group 116; for instance, and without limitation, each obstacle datum handler corresponds to each obstacle group 116 may include a separate server configured to only process and analyze entity data 112 with corresponding obstacle group 116. In other cases, obstacle datum handler may include other computer programs/digital assets; for instance, and without limitation, an appraisal software may be integrated configured to provide other functionalities involving utilization of entity data 112 such as estimating a trade-in value of user's vehicle as described below.

With continued reference to FIG. 1, in some embodiments, entity data 112 may include personal data related to a user. For example, and without limitation, entity data 112 may include user's name, gender, date of birth, residency, religion, organ donation, driver history, occupation, family, contact information, emergency contact, and the like. In another embodiments, entity data 112 may include user billing information. For the purposes of this disclosure, "user billing information" is information that is for a user to make a payment or generated by the payment. As a non-limiting example, entity data 112 may include payment method preference, payment history, credit card information, debit card information, and the like. For the purposes of this disclosure, "card information" is information related to a user's card that can make a payment. As a non-limiting example, the card information may include card numbers, card security codes, the user's personal identification number (PIN) for the card, the card's expiration date, and the user's name on the card, and the like.

With continued reference to FIG. 1, in some embodiments, entity data 112 may include an entity profile. For the purposes of this disclosure, a "entity profile" is information related to an entity of a user. As a non-limiting example, entity profile may include make, model, model version, model year, manufacturer, country of manufacturer, body type, color, coating, steering type, wheel type, tire size, tire type, number of wheels, standard seat number, optional seat number, engine, engine capacity, fuel type, fuel tank capacity, average fuel consumption, maximum permissible weight, height, length, width, presence of accessories, title records, theft records, accident records, insurance records, insurance information, interior fabric, and the like. As another non-limiting example, entity profile may include current mileage, time since the last execution of obstacle resolution object 120, history of executions of obstacle resolution object 120, or the like. In a non-limiting example, time since the last execution of obstacle resolution object 120, history of executions of obstacle resolution object 120 may be updated regularly as entity gets new obstacle resolution object 120. As another non-limiting example, entity profile may include an entity identifier. For the purposes of this disclosure, an "entity identifier" is an identifier that is unique for an entity among others. As a non-limiting example, entity identifier may include a universal product code (barcode), radio-frequency identification (RFID,) cryptographic hashes, primary key, a unique sequencing of alpha-numeric symbols, or anything of the like that can be used to identify entity. For example, and without limitation, entity identifier may include a license plate number of a vehicle, entity identification (ID) number, or the like. For example, and without limitation, entity ID number may include vehicle identification number (VIN), or the like. For the purposes of this disclosure, a "universal product code" is a method of representing data in a visual, machine-readable form. In an embodiment, the universal product code may include linear barcode. For the purposes of this disclsoure, "linear barcode," also called "one-dimensional barcode" is a barcode that is made up of lines and spaces of various widths or sizes that create specific patterns. In another embodiment, the universal product code may include matrix barcode. For the purposes of this disclosure, "matrix barcode," also called "two-dimensional barcode" is a barcode that is made up of two dimensional ways to represent information. As a non-limiting example, the matrix barcode may include quick response (QR) code, and the like. Entity identifier may take the form of any identifier that uniquely corresponds to the purposes of apparatus 100; this may be accomplished using methods including but not limited to Globally Unique Identifiers (GUIDs), Universally Unique Identifiers (UUIDs), or by maintaining a data structure, table, or database listing all transmitter identifiers and checking the data structure, table listing, or database to ensure that a new identifier is not a duplicate.

With continued reference to FIG. 1, in some embodiments, entity data 112 may include sensor data. For the purposes of this disclosure, "sensor data" is data from at least a sensor. Sensor 124 disclosed herein is further described below. In some embodiments, sensor data may include image data. For the purposes of this disclosure, "image data" is information representing at least a physical scene, space, and/or entity. "Image data" may be used interchangeably through this disclosure with "image," where image is used as a noun. An image may be optical, such as without limitation where at least an optic is used to generate an image of an object. An image may be material, such as without limitation when film is used to capture an image. An image may be digital, such as without limitation when represented as a bitmap. Alternatively, an image may be comprised of any media capable of representing a physical scene, space, and/or object. Alternatively where "image" is used as a verb, in this disclosure, it refers to generation and/or formation of an image. As a non-limiting example, image data may include an image of user, user's vehicle, a license plate, door, window, handle, trunk, and the like of vehicle, and the like.

With continued reference to FIG. 1, processor 104 is configured to receive entity data 112 from a data collection module 128. For the purposes of this disclosure, a "data collection module" is a component or system designed to collect and gather entity data. In some cases, data collection module 128 may include an integration of various data collection units such as, without limitation, sensors 124, entity devices 132, handler devices 136, data storage devices, and/or the like as described below. In some embodiments, processor 104 may communicate with data collection module 128 through one or more networks or clouds as described in the entirety of this disclosure.

With continued reference to FIG. 1, data collection module 128 includes at least a sensor 124. For the purposes of this disclosure, a "sensor" is a device that produces an output signal for the purpose of sensing a physical phenomenon. In some embodiments, sensor 124 may include a plurality of sensors 124. As a non-limiting example, apparatus 100 may include sensors 124 in a space as shown in FIG. 2. For the purposes of this disclosure, a "space" is any physical space. As a non-limiting example, space may include a dealer shop, maintenance store, repair store, service bay, or the like. In an embodiment, sensor 124 may be fixed on a surface of space. In another embodiment, sensor 124 may be movable. As a non-limiting example, sensor 124 may be movable using an automatic slider, where the automatic slider may allow sensor 124 from side to side, from top to bottom, over an object, from front to back, or any combination thereof. In some embodiments, sensors 124 may be on a ceiling, four sides of space, floor, corners, and the like of space. For another example, and without limitation, sensors 124 may be above, below, in front of, behind, or to the sides of entity. As a non-limiting example, this is so that sensor 124 can detect entity is inside of space. As another non-limiting example, this is so that sensor 124 can detect sensor data as vehicle is inside of space. In some embodiments, space may include a gate. For the purposes of this disclosure, a "gate" is an opening that allows access into or out of a space. As a non-limiting example, the gate may include a door. For example and without limitation, the door may include a sliding door, roll-up door, and the like. In some embodiments, sensors 124 may be on the gate of space. As a non-limiting example, this is so that sensor 124 can detect sensor data as entity is going through the entrance of space. As another non-limiting example, this is so that sensor 124 can detect entity is moving into and/or moving out of space. In some embodiments, any signals or data generated from sensor 124 may be stored in entity database 140. The entity database 140 and sensor 124 disclosed herein are further described in detail below.

With continued reference to FIG. 1, in some embodiments, sensor 124 may include a temperature sensor, force sensor, pressure sensor, moisture sensor, flow sensor, electrical sensor, mechanical sensor, motion sensor, camera, photodetector, and the like. For example and without limitation, sensor 124 may transduce a detected phenomenon, such as without limitation, temperature, voltage, current, pressure, speed, motion, light, moisture, and the like, into a sensed signal. For the purposes of this disclosure, a "motion sensor" is a type of sensor that capture motion of an entity. As a non-limiting example, motion sensor may capture entity moving into a space. As another non-limiting example, motion sensor may capture entity moving out of space. In some embodiments, sensor 124 may output the sensed signal. As a non-limiting example, the sensed signal (or also referred as an electrical signal, output signal, and the like) may include sensor data. Sensor 124 may include any computing device as described in the entirety of this disclosure and configured to convert and/or translate a plurality of signals detected into electrical signals for further analysis and/or manipulation. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Any datum captured by sensor 124 may include circuitry, computing devices, electronic components or a combination thereof that translates into at least an electronic signal configured to be transmitted to another electronic component.

With continued reference to FIG. 1, in some embodiments, sensor 124 may include a sensor suite which may include a plurality of sensors 124 that may detect similar or unique phenomena. For example, in a non-limiting embodiment, sensor suite may include a plurality of motion sensors or a mixture of motion sensors and a camera. The apparatus 100 may include a plurality of sensors 124 in the form of individual sensors 124 or a sensor suite working in tandem or individually. A sensor suite may include a plurality of independent sensors 124, as described in this disclosure, where any number of the described sensors 124 may be used to detect any number of physical or electrical quantities associated with entity. Independent sensors 124 may include separate sensors 124 measuring physical or electrical quantities that may be powered by and/or in communication with circuits independently, where each may signal sensor output to a control circuit such as but not limited to processor 104. In one or more embodiments, sensor 124 may include a sense board, such as sense board. A sense board may have at least a portion of a circuit board that includes one or more sensors 124 configured to, for example, take an image of entity. In one or more embodiments, sensor 124 or a sense board may be communicatively connected to processor 104. In one or more embodiments, a sense board may include one or more circuits and/or circuit elements, including, for example, a printed circuit board component. A sense board may include, without limitation, a control circuit configured to perform and/or direct any actions performed by the sense board and/or any other component and/or element described in this disclosure. The control circuit may include any analog or digital control circuit, including without limitation a combinational and/or synchronous logic circuit, a processor, microprocessor, microcontroller, or the like.

With continued reference to FIG. 1, in some embodiments, sensor 124 may include at least a camera. In a non-limiting example, data collection module 128 may include a camera configured to capture image data (e.g., videos and pictures) related to entity. Image data may include an image of a user's vehicle (or at least a component of the user's vehicle) that needs repairs. Optical sensor may be configured to identify a potential mechanical issues of the user's vehicle pulling up to the service bay and transmit related data to processor 104. In some embodiments, an apparatus 100 may include a plurality of cameras. As used in this disclosure, a "camera" is a device that is configured to sense electromagnetic radiation, such as without limitation visible light, and generate an image representing the electromagnetic radiation. In some cases, camera may include one or more optics. Exemplary non-limiting, the optics may include spherical lenses, aspherical lenses, reflectors, polarizers, filters, windows, aperture stops, and the like. In some cases, camera may include an image sensor. Exemplary non-limiting, the image sensors may include digital image sensors, such as without limitation charge-coupled device (CCD) sensors and complimentary metal-oxide-semiconductor (CMOS) sensors, chemical image sensors, and analog image sensors, such as without limitation film. In some cases, camera may be sensitive within a non-visible range of electromagnetic radiation, such as without limitation infrared. In some embodiments, camera may generate image data.

With continued reference to FIG. 1, an exemplary camera may include an OpenMV Cam H7 from OpenMV, LLC of Atlanta, Georgia, U.S.A. OpenMV Cam includes a small, low power, microcontroller which allows execution of processes. OpenMV Cam comprises an ARM Cortex M7 processor and a 640×480 image sensor operating at a frame rate up to 150 fps. OpenMV Cam may be programmed with Python using a Remote Python/Procedure Call (RPC) library. OpenMV CAM may be used to operate image classification and segmentation models, such as without limitation by way of TensorFlow Lite; detect motion, for example by way of frame differencing algorithms; detect markers, for example blob detection; detect objects, for example face detection; track eyes; detection persons, for example by way of a trained machine learning model; detect camera motion, detect and decode barcodes; capture images; and record video.

With continued reference to FIG. 1, in some embodiments, a camera may include a plurality of cameras, wherein the plurality of cameras may capture two or more perspectives for use in three-dimensional (3D) reconstruction. The camera may include a stereo-camera. As used in this disclosure, a "stereo-camera" is a camera that senses two or more images from two or more vantages. As used in this disclosure, a "vantage" is a location of a camera relative a scene, space and/or object which the camera is configured to sense. In some cases, a stereo-camera may determine depth of an object in a scene as a function of parallax. As used in this disclosure, "parallax" is a difference in perceived location of a corresponding object in two or more images. An exemplary stereo-camera may include TaraXL from e-con Systems, Inc of San Jose, California. The TaraXL may include a USB 3.0 stereo-camera which is optimized for NVIDIA® Jetson AGX Xavier™/Jetson™ TX2 and NVIDIA GPU Cards. The TaraXL's accelerated Software Development Kit (TaraXL SDK) may be capable of doing high quality 3D depth mapping of WVGA at a rate of up to 60 frames per second. The TaraXL may be based on MT9V024 stereo sensor from ON Semiconductor. Additionally, the TaraXL may include a global shutter, houses 6 inertial measurement units (IMUs), and may allow mounting of optics by way of an S-mount lens holder. The TaraXL may operate at depth ranges of about 50 cm to about 300 cm. Persons skilled in the art, upon reviewing the entirety of this disclosure, will be aware of various types of cameras that may be used for the disclosure.

With continued reference to FIG. 1, in some embodiments, sensor 124 may include at least a photodetector. For the purposes of this disclosure, a "photodetector" is any device that is sensitive to light and thereby able to detect light. In some embodiments, photodetector may be implemented in a camera. As a non-limiting example, photodetector may convert the light into electrical signals that can be processed by the camera's electronics to create an image. In some cases, photodetector may be communicative with a computing device such as but not limited to processor 104, such that the sensed signal such as but not limited to image data. In some embodiments, the electrical signal from photodetector may be stored in entity database 140. Entity database 140 disclosed herein is further described below.

With continued reference to FIG. 1, in some cases, photodetector may include a photodiode, a photoresistor, a photosensor, a photovoltaic chip, and the like. In some cases, photodetector may include a Germanium-based photodiode. Photodetector may include, without limitation, Avalanche Photodiodes (APDs), Single Photon Avalanche Diodes (SPADs), Silicon Photomultipliers (SiPMs), Photo-Multiplier Tubes (PMTs), Micro-Channel Plates (MCPs), Micro-Channel Plate Photomultiplier Tubes (MCP-PMTs), Indium gallium arsenide semiconductors (InGaAs), photodiodes, and/or photosensitive or photon-detecting circuit elements, semiconductors and/or transducers. "Avalanche Photo Diodes (APDs)," as used herein, are diodes (e.g., without limitation p-n, p-i-n, and others) reverse biased such that a single photon generated carrier can trigger a short, temporary "avalanche" of photocurrent on the order of milliamps or more caused by electrons being accelerated through a high field region of the diode and impact ionizing covalent bonds in the bulk material, these in turn triggering greater impact ionization of electron-hole pairs. APDs may provide a built-in stage of gain through avalanche multiplication. When the reverse bias is less than the breakdown voltage, the gain of the APD may be approximately linear. For silicon APDs, this gain may be on the order of 10-100. Material of APD may contribute to gains. Germanium APDs may detect infrared out to a wavelength of 1.7 micrometers. InGaAs may detect infrared out to a wavelength of 1.6 micrometers. Mercury Cadmium Telluride (HgCdTe) may detect infrared out to a wavelength of 14 micrometers. An APD reverse biased significantly above the breakdown voltage may be referred to as a Single Photon Avalanche Diode, or SPAD. In this case, the n-p electric field may be sufficiently high to sustain an avalanche of current with a single photon, hence referred to as "Geiger mode." This avalanche current rises rapidly (sub-nanosecond), such that detection of the avalanche current can be used to approximate the arrival time of the incident photon. The SPAD may be pulled below breakdown voltage once triggered in order to reset or quench the avalanche current before another photon may be detected, as while the avalanche current is active carriers from additional photons may have a negligible effect on the current in the diode.

With continued reference to FIG. 1, in some embodiments, photodetector may include a charge-coupled device (CCD), a complementary metal-oxide-semiconductor (CMOS) sensor, and the like. As a non-limiting example, the CCD sensor may include an array of tiny pixels that are sensitive to light. As another non-limiting example, the CMOS sensor may include an array of photodiodes. In both CCD and CMOS sensors, the electrical charge generated by the photodetector may be converted into a voltage signal, which may be then amplified and converted into a digital signal by a camera's analog-to-digital converter (ADC). The digital signal may then be processed by the camera's electronics to create an image.

With continued reference to FIG. 1, in some embodiments, data collection module 128 may include entity device 132. For the purposes of this disclosure, a "entity device" is any device a user uses to input data. As a non-limiting example, a user may manually input entity data 112, including personal data, entity profile, obstacle datum 144, user input, and the like. For the purposes of this disclosure, a "user input" is an input from a user that is related to an entity. As a non-limiting example, entity device 132 may include any laptops, tablets, mobile phones, smart phones, smart watches, desktop computers, kiosks, touch screens, or the like. In some embodiments, entity device 132 may include any display device or data input device that is implemented within an entity. For example, and without limitation, entity device 132 may include an entity display. For the purposes of this disclosure, an "entity display" is a screen or monitor that displays various information and controls of an entity. In some embodiments, user may manually input image data using a camera implemented in entity device 132. In a non-limiting example, user may take a photo (i.e. image data) of entity including obstacle datum 144 using entity device 132 and transmit the photo to processor 104. In another non-limiting example, user may input user's face using a camera implemented in entity device 132. In some embodiments, entity device 132 may include an interface configured to receive inputs from the user. The user interface disclosed herein is further described below. In some embodiments, the user may have a capability to process, store or transmit any information independently. In some embodiments, processor 104 may analyze user input and find a data pattern of user. In some embodiments, entity device 132 may interface with a voice-controlled virtual assistant. For the purposes of this disclosure, a "voice-controlled virtual assistant" is an artificial intelligence software designed to interact with users or obstacle datum handlers through voice commands. As a non-limiting example, the voice-controlled virtual assistant may include ALEXA, SIRI, Google Assistant, CORTANA, BIXBY, XIAOAI, or the like. The voice-controlled virtual assistant can include natural language processing (NLP) and speech recognition technologies as described in this disclosure. In a non-limiting example, processor 104 may obtain user input using the voice-controlled virtual assistant.

With continued reference to FIG. 1, in some embodiments, data collection module 128 may include handler device 136. For the purposes of this disclosure, a "handler device" is any device an obstacle datum handler uses to input data. As a non-limiting example, an obstacle datum handler may input entity data 112 including personal data, entity profile, and the like, obstacle datum 144, obstacle cause datum, obstacle datum handler input, and the like. As a non-limiting example, entity device may include laptops, tablets, mobile phones, smart phones, smart watches, desktop computers, kiosks, touch screens, information systems of vehicle, or things of the like. In some embodiments, obstacle datum handler may manually input image data using a camera implemented in handler device 136. In a non-limiting example, obstacle datum handler may take a photo (i.e. image data) of entity including obstacle datum 144 using handler device 136 and transmit the photo to processor 104. In some embodiments, handler device 136 may include an interface configured to receive inputs from obstacle datum handler. In some embodiments, obstacle datum handler may have a capability to process, store or transmit any information independently. In some embodiments, handler device 136 may interface with a voice-controlled virtual assistant. As a non-limiting example, the voice-controlled virtual assistant may include ALEXA, SIRI, Google Assistant, CORTANA, BIXBY, XIAOAI, or the like. The voice-controlled virtual assistant can include natural language processing (NLP) and speech recognition technologies as described in this disclosure. In a non-limiting example, processor 104 may obtain obstacle datum handler input using the voice-controlled virtual assistant.

With continued reference to FIG. 1, in some embodiments, data collection module 128 may include a chatbot. For the purposes of this disclosure, "chatbot" is an artificial intelligence (AI) program designed to simulate human conversation or interaction through text, voice-based or image-based communication. In some embodiments, entity data 112 may be obtained from a chatbot operating on or communicating with entity device 132. Entity device 132 disclosed herein is further described below. In another non-limiting example, chatbot may be configured to continuously accept user input containing entity data 112 including at least one obstacle datum 144 or obstacle cause datum. Obstacle datum 144 and obstacle cause datum disclosed herein are further described below. Chatbot may be configured to extract one or more obstacle data 144 based on user's input. Chatbot may be programmed to respond to an entity's queries, provide information, or perform specific tasks based on pre-defined rules or machine learning algorithms. In a non-limiting example, chatbot may be programmed to query a user to receive entity data 112. In another non-limiting example, chatbot may be programmed to query a user to receive obstacle datum 144 or obstacle cause datum. In some embodiments, any data received from chatbot may be stored in entity database 140. Chatbot disclosed herein is further described with reference to FIG. 5.

With continued reference to FIG. 1, in some embodiments, processor 104 may be configured to process a digital communication between entity and obstacle datum handler. As used in this disclosure, a "digital communication" refers to an exchange of information or data described herein between different entities within digital environment. A "digital environment," for the purpose of this disclosure, is an integrated communications environment where digital devices communicate and manage data and interactions within the digital environment. As a non-limiting example, digital devices may include any electronic device that uses a digital signal instead of an analog signal for processing and transmitting data such as, without limitation, processor 104, entity device 132, handler device 136, any computing device, and the like. In an embodiment, any processing step described in this disclosure may be performed in digital environment. Apparatus 100 may be connected to the digital environment through a network. Network may include a computer network containing one or more data connections between one or more network nodes. In some embodiments, network may include, without limitation, personal area network (PAN), local area network (LAN), mobile ad hoc network (MANET), metropolitan area network (MAN), wide area network (WAN), cellular network, global area network (GAN), space network, and the like.

With continued reference to FIG. 1, in an embodiment, network may include, participate in, and/or be incorporated in a network topology. A "network topology" as used in this disclosure is an arrangement of elements of a communication network. In some embodiments, network may include, but is not limited to, a star network, tree network, and/or a mesh network. A "mesh network" as used in this disclosure is a local network topology in which the infrastructure nodes connect directly, dynamically, and non-hierarchically to as many other nodes as possible. Network nodes may be configured to communicate in a partial mesh network. A partial mesh network may include a communication system in which some nodes may be connected directly to one another while other nodes may need to connect to at least another node to reach a third node. In some embodiments, network may be configured to communicate in a full mesh network. A full mesh network may include a communication system in which every network node in network may communicate directly to one another. In some embodiments, network may include a layered data network. As used in this disclosure a "layered data network" is a data network with a plurality of substantially independent communication layers with each configured to allow for data transfer over predetermined bandwidths and frequencies. As used in this disclosure a "layer" is a distinct and independent functional and procedural tool of transferring data from one location to another. For example, and without limitation, one layer may transmit communication data at a particular frequency range while another layer may transmit communication data at another frequency range such that there is substantially no crosstalk between the two layers which advantageously provides a redundancy and safeguard in the event of a disruption in the operation of one of the layers. A layer may be an abstraction which is not tangible.

With continued reference to FIG. 1, in an embodiment, digital communication may be carried out between one or more network nodes, wherein one or more network nodes may include one or more wire or wireless connection between a first network node and a second network node. "Network nodes," for the purpose of this disclosure, is nodes as redistribution points in network within digital environment described herein. In some cases, network node may include a communication endpoint. In a non-limiting example, digital communication may include one or more network packet (containing packet header, payload, signature, transferred data, among others) between each network nodes through one or more data connections, wherein the network packet is a unit of data to be exchanged (e.g., information about one or more proximate data structures integrated by handler device 136, including information related to provider objects within the proximate data structures) between handler device 136 and entity device 132 within digital environment.

With continued reference to FIG. 1, in some cases, digital communication may be initiated by entity device 132. In an embodiment, digital communication may include, without limitation, a digital inquiry initiated by entity device 132. Processing digital communication may include receiving, by processor 104, a digital inquiry and generating a digital response as a function of the digital inquiry. A "digital inquiry," for the purpose of this disclosure, refers to a data element describing an action of making a request or seeking information stored in digital environment through digital means using electronic devices such as, without limitation, entity device 132 (i.e., any additional computing device used by entity to access and/or interact with processor 104 or obstacle datum handler). In a non-limiting example, digital inquiry may include a web request wherein the web request is a type of communication protocol for data transmission made by a client e.g., entity described herein. Communication protocol may include, but is not limited to, internet protocol (IP), transmission control protocol (TCP), inter-access point protocol, address resolution protocol (ARP), dynamic host configuration protocol (DHCP), file transfer protocol (FTP), internet control message protocol (ICMP), and the like thereof. In some cases, digital inquiry may include an user interaction with database or obstacle datum handler, wherein the user interaction may include, without limitation, requesting information from one or more database (e.g., product/service details, availability, or pricing), submitting data (e.g., questions, comments, reviews, ratings, and/or the like) to obstacle datum handler, using chatbot to ask questions or receive automated response, interacting with a customer service through a live chat feature, conducting searches on a built-in search engine to find relevant information or resources, and/or the like.

With continued reference to FIG. 1, as used in this disclosure, a "digital response" refers to information or action provided in response to described digital inquiry generated through digital means and transmitted back to the entity initiated described digital inquiry. In some cases, generating digital response may include communicating, by processor 104, digital inquiry with database or handler device 136. Digital response generated based on digital inquiry may include, for example, and without limitation, an email reply containing requested information or addressing query, displaying a GUI (e.g., a webpage) with relevant search results or content matching inquiry through entity device 132 and/or handler device 136, posting a response on entity device 132 to answer a question or provide guidance, among others, in a timely manner.

With continued reference to FIG. 1, in some embodiments, data collection module 128 may include automatic speech recognition. For the purposes of this disclosure, "automatic speech recognition" is a technology that converts spoken language into written text or machine-readable form. In some embodiments, processor 104 may obtain entity data 112 using automatic speech recognition (ASR) and language processing module. Language processing module described herein is further described below. As a non-limiting example, ASR may analyze a record of a call or voice of a user to obtain entity data 112, including personal data, entity profile, obstacle datum 144, obstacle cause datum, and the like. Obstacle datum and obstacle cause datum disclosed herein are further described below. In a non-limiting example, processor 104 may use a record of a call between a user and an obstacle datum handler or voice record of a user describing about an entity, obstacle datum 144 or obstacle cause datum of an entity to aid in recognition of entity data 112. In some embodiments, ASR may include techniques employing language processing to aid speech recognition processes. In some cases, ASR may be used to decode (i.e., recognize) indeterministic phonemes or help in forming a preponderance among probabilistic candidates. In some cases, ASR may include an audio-based automatic speech recognition process and an image-based automatic speech recognition process. ASR may analysis audio according to any method described herein, for instance using a Mel frequency cepstral coefficients (MFCCs) and/or log-Mel spectrogram derived from raw audio samples. In some cases, feature recognition may include any feature recognition process described in this disclosure, for example a variant of a convolutional neural network. In some cases, ASR employs an audio datum to recognize entity data 112. For instance, audio vector may each be concatenated and used to predict speech made by a user, including an owner, driver, passenger, or the like.

With continued reference to FIG. 1, in some embodiments, automatic speech recognition may require training (i.e., enrollment). In some cases, training an automatic speech recognition model may require an individual speaker to read text or isolated vocabulary. In some cases, a solicitation video may include an audio component having an audible verbal content, the contents of which are known a priori by processor 104. Processor 104 may then train an automatic speech recognition model according to training data which includes audible verbal content correlated to known content. In this way, processor 104 may analyze a person's specific voice and train an automatic speech recognition model to the person's speech, resulting in increased accuracy. Alternatively or additionally, in some cases, processor 104 may include an automatic speech recognition model that is speaker-independent. As used in this disclosure, a "speaker independent" automatic speech recognition process does not require training for each individual speaker. Conversely, as used in this disclosure, automatic speech recognition processes that employ individual speaker specific training are "speaker dependent."

With continued reference to FIG. 1, in some embodiments, an automatic speech recognition process may perform voice recognition or speaker identification. As used in this disclosure, "voice recognition" refers to identifying a speaker, from audio content, rather than what the speaker is saying. In some cases, processor 104 may first recognize a speaker of verbal audio content and then automatically recognize speech of the speaker, for example by way of a speaker dependent automatic speech recognition model or process. In some embodiments, an automatic speech recognition process can be used to authenticate or verify an identity of a speaker. In some cases, a speaker may or may not include subject. For example, subject may speak within solicitation video, but others may speak as well.

With continued reference to FIG. 1, in some embodiments, an automatic speech recognition process may include one or all of acoustic modeling, language modeling, and statistically-based speech recognition algorithms. In some cases, an automatic speech recognition process may employ hidden Markov models (HMMs). As discussed in greater detail below, language modeling such as that employed in natural language processing applications like document classification or statistical machine translation, may also be employed by an automatic speech recognition process.

With continued reference to FIG. 1, an exemplary algorithm employed in automatic speech recognition may include or even be based upon hidden Markov models. Hidden Markov models (HMMs) may include statistical models that output a sequence of symbols or quantities. HMMs can be used in speech recognition because a speech signal can be viewed as a piecewise stationary signal or a short-time stationary signal. For example, over a short time scale (e.g., 10 milliseconds), speech can be approximated as a stationary process. Speech (i.e., audible verbal content) can be understood as a Markov model for many stochastic purposes.

With continued reference to FIG. 1, in some embodiments HMMs can be trained automatically and may be relatively simple and computationally feasible to use. In an exemplary automatic speech recognition process, a hidden Markov model may output a sequence of n-dimensional real-valued vectors (with n being a small integer, such as 10), at a rate of about one vector every 10 milliseconds. Vectors may consist of cepstral coefficients. A cepstral coefficient requires using a spectral domain. Cepstral coefficients may be obtained by taking a Fourier transform of a short time window of speech yielding a spectrum, decorrelating the spectrum using a cosine transform, and taking first (i.e., most significant) coefficients. In some cases, an HMM may have in each state a statistical distribution that is a mixture of diagonal covariance Gaussians, yielding a likelihood for each observed vector. In some cases, each word, or phoneme, may have a different output distribution; an HMM for a sequence of words or phonemes may be made by concatenating an HMMs for separate words and phonemes.

With continued reference to FIG. 1, in some embodiments, an automatic speech recognition process may use various combinations of a number of techniques in order to improve results. In some cases, a large-vocabulary automatic speech recognition process may include context dependency for phonemes. For example, in some cases, phonemes with different left and right context may have different realizations as HMM states. In some cases, an automatic speech recognition process may use cepstral normalization to normalize for different speakers and recording conditions. In some cases, an automatic speech recognition process may use vocal tract length normalization (VTLN) for male-female normalization and maximum likelihood linear regression (MLLR) for more general speaker adaptation. In some cases, an automatic speech recognition process may determine so-called delta and delta-delta coefficients to capture speech dynamics and might use heteroscedastic linear discriminant analysis (HLDA). In some cases, an automatic speech recognition process may use splicing and a linear discriminate analysis (LDA)-based projection, which may include heteroscedastic linear discriminant analysis or a global semi-tied covariance transform (also known as maximum likelihood linear transform [MLLT]). In some cases, an automatic speech recognition process may use discriminative training techniques, which may dispense with a purely statistical approach to HMM parameter estimation and instead optimize some classification-related measure of training data; examples may include maximum mutual information (MMI), minimum classification error (MCE), and minimum phone error (MPE).

With continued reference to FIG. 1, in some embodiments, an automatic speech recognition process may be said to decode speech (i.e., audible verbal content). Decoding of speech may occur when an automatic speech recognition system is presented with a new utterance and must compute a most likely sentence. In some cases, speech decoding may include a Viterbi algorithm. A Viterbi algorithm may include a dynamic programming algorithm for obtaining a maximum a posteriori probability estimate of a most likely sequence of hidden states (i.e., Viterbi path) that results in a sequence of observed events. Viterbi algorithms may be employed in context of Markov information sources and hidden Markov models. A Viterbi algorithm may be used to find a best path, for example using a dynamically created combination hidden Markov model, having both acoustic and language model information, using a statically created combination hidden Markov model (e.g., finite state transducer [FST] approach).

With continued reference to FIG. 1, in some embodiments, speech (i.e., audible verbal content) decoding may include considering a set of good candidates and not only a best candidate, when presented with a new utterance. In some cases, a better scoring function (i.e., re-scoring) may be used to rate each of a set of good candidates, allowing selection of a best candidate according to this refined score. In some cases, a set of candidates can be kept either as a list (i.e., N-best list approach) or as a subset of models (i.e., a lattice). In some cases, re-scoring may be performed by optimizing Bayes risk (or an approximation thereof). In some cases, re-scoring may include optimizing for sentence (including keywords) that minimizes an expectancy of a given loss function with regards to all possible transcriptions. For example, re-scoring may allow selection of a sentence that minimizes an average distance to other possible sentences weighed by their estimated probability. In some cases, an employed loss function may include Levenshtein distance, although different distance calculations may be performed, for instance for specific tasks. In some cases, a set of candidates may be pruned to maintain tractability.

With continued reference to FIG. 1, in some embodiments, an automatic speech recognition process may employ dynamic time warping (DTW)-based approaches. Dynamic time warping may include algorithms for measuring similarity between two sequences, which may vary in time or speed. For instance, similarities in walking patterns would be detected, even if in one video the person was walking slowly and if in another he or she were walking more quickly, or even if there were accelerations and deceleration during the course of one observation. DTW has been applied to video, audio, and graphics—indeed, any data that can be turned into a linear representation can be analyzed with DTW. In some cases, DTW may be used by an automatic speech recognition process to cope with different speaking (i.e., audible verbal content) speeds. In some cases, DTW may allow processor 104 to find an optimal match between two given sequences (e.g., time series) with certain restrictions. That is, in some cases, sequences can be "warped" non-linearly to match each other. In some cases, a DTW-based sequence alignment method may be used in context of hidden Markov models.

With continued reference to FIG. 1, in some embodiments, an automatic speech recognition process may include a neural network. Neural network may include any neural network, for example those disclosed with reference to FIGS. 6-8. In some cases, neural networks may be used for automatic speech recognition, including phoneme classification, phoneme classification through multi-objective evolutionary algorithms, isolated word recognition, audiovisual speech recognition, audiovisual speaker recognition and speaker adaptation. In some cases. neural networks employed in automatic speech recognition may make fewer explicit assumptions about feature statistical properties than HMMs and therefore may have several qualities making them attractive recognition models for speech recognition. When used to estimate the probabilities of a speech feature segment, neural networks may allow discriminative training in a natural and efficient manner. In some cases, neural networks may be used to effectively classify audible verbal content over short-time interval, for instance such as individual phonemes and isolated words. In some embodiments, a neural network may be employed by automatic speech recognition processes for pre-processing, feature transformation and/or dimensionality reduction, for example prior to HMM-based recognition. In some embodiments, long short-term memory (LS™) and related recurrent neural networks (RNNs) and Time Delay Neural Networks(TDNN's) may be used for automatic speech recognition, for example over longer time intervals for continuous speech recognition.

With continued reference to FIG. 1, in some embodiments, processor 104 may be configured to obtain entity data 112 using an optical character recognition (OCR). In some embodiments, data collection module 128 may include OCR. In some embodiments, processor 104 may analyze image data of entity data 112 using optical character recognition (OCR). For the purposes of this disclosure, an "optical character recognition" is a technology that enables the recognition and conversion of printed or written text into machine-encoded text. In some cases, the processor 104 may be configured to recognize a keyword using the OCR to find entity data 112. As used in this disclosure, a "keyword" is an element of word or syntax used to identify and/or match elements to each other. As a non-limiting example, keyword may include entity identifier, vehicle profile including vehicle model, or the like. In some cases, processor 104 may transcribe much or even substantially all image data.

With continued reference to FIG. 1, in some embodiments, optical character recognition or optical character reader (OCR) may include automatic conversion of images of written (e.g., typed, handwritten or printed text) into machine-encoded text. In some cases, recognition of a keyword from any data described in this disclosure may include one or more processes, including without limitation optical character recognition (OCR), optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine-learning processes. In some cases, intelligent word recognition (IWR) may recognize written text, one word at a time, for instance by employing machine-learning processes.

With continued reference to FIG. 1, in some cases, OCR may be an "offline" process, which analyses a static document or image frame. In some cases, handwriting movement analysis can be used as input to handwriting recognition. For example, instead of merely using shapes of glyphs and words, this technique may capture motions, such as the order in which segments are drawn, the direction, and the pattern of putting the pen down and lifting it. This additional information may make handwriting recognition more accurate. In some cases, this technology may be referred to as "online" character recognition, dynamic character recognition, real-time character recognition, and intelligent character recognition.

With continued reference to FIG. 1, in some cases, OCR processes may employ pre-processing of entity data 112. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to entity data 112 to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from a background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

With continued reference to FIG. 1, in some embodiments an OCR process may include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," " " "pattern recognition," and/or "image correlation." Matrix matching may rely on an input glyph being correctly isolated from the rest of the image component. Matrix matching may also rely on a stored glyph being in a similar font and at a same scale as input glyph. Matrix matching may work best with typewritten text.

With continued reference to FIG. 1, in some embodiments, an OCR process may include a feature extraction process. In some cases, feature extraction may decompose a glyph into a feature. Exemplary non-limiting features may include corners, edges, lines, closed loops, line direction, line intersections, and the like. In some cases, feature extraction may reduce dimensionality of representation and may make the recognition process computationally more efficient. In some cases, extracted feature may be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) may be used to compare image features with stored glyph features and choose a nearest match. OCR may employ any machine-learning process described in this disclosure, for example machine-learning processes described with reference to FIG. 6. Exemplary non-limiting OCR software may include Cuneiform and Tesseract. Cuneiform may include a multi-language, open-source optical character recognition system originally developed by Cognitive Technologies of Moscow, Russia. Tesseract may include free OCR software originally developed by Hewlett-Packard of Palo Alto, California, United States.

With continued reference to FIG. 1, in some cases, OCR may employ a two-pass approach to character recognition. A first pass may try to recognize a character. Each character that is satisfactory may be passed to an adaptive classifier as training data. The adaptive classifier then may get a chance to recognize characters more accurately as it further analyzes entity data 112. Since the adaptive classifier may have learned something useful a little too late to recognize characters on the first pass, a second pass may be run over the entity data 112. Second pass may include adaptive recognition and use characters recognized with high confidence on the first pass to recognize better remaining characters on the second pass. In some cases, two-pass approach may be advantageous for unusual fonts or low-quality image components where visual verbal content may be distorted. Another exemplary OCR software tool may include OCRopus. OCRopus development is led by German Research Centre for Artificial Intelligence in Kaiserslautern, Germany. In some cases, OCR software may employ neural networks.

With continued reference to FIG. 1, in some cases, OCR may include post-processing. For example, OCR accuracy may be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, in some embodiments, apparatus 100 may include an entity database 140. In some embodiments, data collection module 128 may include entity database 140. As used in this disclosure, "entity database" is a data structure configured to store data associated with entity. As a non-limiting example, entity database 140 may store entity data 112, obstacle datum 144, obstacle cause datum, obstacle group 116, obstacle resolution object 120, obstacle resolution template 148, obstacle resolution data structure 152, data structure template 156, entity specific data structure template 160, template form field 164, and the like. In one or more embodiments, entity database 140 may include inputted or calculated information and datum related to entity. In some embodiments, a datum history may be stored in entity database 140. As a non-limiting example, the datum history may include real-time and/or previous inputted data related to entity. As a non-limiting example, entity database 140 may include instructions from a user, who may be an expert user, a past user in embodiments disclosed herein, or the like, where the instructions may include examples of the data related to entity. Entity database 140 described herein is further described with respect to FIG. 4.

With continued reference to FIG. 1, in some embodiments, processor 104 may be communicatively connected with entity database 140. For example, and without limitation, in some cases, entity database 140 may be local to processor 104. In another example, and without limitation, entity database 140 may be remote to processor 104 and communicative with processor 104 by way of one or more networks. The network may include, but is not limited to, a cloud network, a mesh network, and the like. By way of example, a "cloud-based" system can refer to a system which includes software and/or data which is stored, managed, and/or processed on a network of remote servers hosted in the "cloud," e.g., via the Internet, rather than on local severs or personal computers. The network may use an immutable sequential listing to securely store entity database 140. An "immutable sequential listing," as used in this disclosure, is a data structure that places data entries in a fixed sequential arrangement, such as a temporal sequence of entries and/or blocks thereof, where the sequential arrangement, once established, cannot be altered or reordered. An immutable sequential listing may be, include and/or implement an immutable ledger, where data entries that have been posted to the immutable sequential listing cannot be altered.

With continued reference to FIG. 1, in some embodiments, entity database 140 may include keywords. In a non-limiting example, processor 104 may query entity database 140 for certain information using keyword. In some cases, data collection module 128 may be configured to retrieve entity data 112 by querying entity database 140. In another non-limiting example, entity or obstacle datum handler may query entity database 140 for certain information using keyword. For example, without limitation, keyword may include "vehicle model" in the instance that processor 104 is looking for data related to a specific model of vehicle. In some embodiments, processor 104 may retrieve entity data 112 by querying entity database 140 using "entity identifier" keyword. For example, without limitation, keyword may include "license plate number of entity identifier" in the instance that processor 104 is looking for entity data 112 related to a vehicle with the license plate number, wherein entity data 112 may include related personal data, entity profile, or the like.

With continued reference to FIG. 1, in some embodiments, entity database 140 may be implemented, without limitation, as a relational database, a key-value retrieval database such as a NOSQL database, or any other format or structure for use as a database that a person skilled in the art would recognize as suitable upon review of the entirety of this disclosure. Database may alternatively or additionally be implemented using a distributed data storage protocol and/or data structure, such as a distributed hash table or the like. Database may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

With continued reference to FIG. 1, memory 108 contains instructions configuring processor 104 to determine an obstacle datum 144 as a function of entity data 112. For the purposes of this disclosure, an "obstacle datum" is a data element of entity data containing information or attributes having at least a negative impact on an entity. In some embodiments, entity data 112 may include obstacle datum 144. In an embodiment, obstacle datum may describe a condition that hinders or obstructs the movement, progress, or otherwise functioning of other data elements within entity data. In a non-limiting example, obstacle datum 144 may include information related to a user-identified issue related to user's entity including vehicle, machine, or the like. In a non-limiting example, obstacle datum 144 may include engine malfunction, transmission issue, break system problem, electrical system failure, exterior damage, worn parts with time, battery damage, tire tread depth, undercarriage condition, leaks, damaged tires, and/or the like. For example and without limitation, obstacle datum 144 may include scratches, dents, cracks, paint damages, rusts, and the like. In some embodiments, vehicle may include a plurality of obstacle datum 144. As a non-limiting example, vehicle may include engine malfunction and cracks. In some embodiments, obstacle datum 144 may be stored in entity database 140. In some embodiments, obstacle datum 144 may be retrieved from entity database 140.

With continued reference to FIG. 1, in some embodiments, processor 104 may be configured to analyze image data of entity data 112 to find obstacle datum 144 using a machine vison system. For the purposes of this disclosure, a "machine vision system" is a type of technology that enables a computing device to inspect, evaluate and identify still or moving images. In some embodiments, machine vision system may use image data to make a determination about a scene, space, and/or object. As a non-limiting example, machine vision system may be used to recognize obstacle datum 144 from image data. For example and without limitation, image data may include an image of a vehicle or part of a vehicle and machine vision system may recognize obstacle datum of vehicle. As a non-limiting example, machine vision system may be used to recognize a user's face from image data. For example and without limitation, image data may include an image of a user, such as but not limited to a driver, a passenger, and the like and machine vision system may recognize the face of the user.

With continued reference to FIG. 1, in some cases, machine vision system may be used for world modeling or registration of objects within a space. In some cases, registration may include image processing, such as without limitation object recognition, feature detection, edge/corner detection, and the like. Non-limiting example of feature detection may include scale invariant feature transform (SIFT), Canny edge detection, Shi Tomasi corner detection, and the like. In some cases, a machine vision process may operate image classification and segmentation models, such as without limitation by way of machine vision resource (e.g., OpenMV or TensorFlow Lite). A machine vision process may detect motion, for example by way of frame differencing algorithms. A machine vision process may detect markers, for example blob detection, object detection, face detection, and the like. In some cases, a machine vision process may perform eye tracking (i.e., gaze estimation). In some cases, a machine vision process may perform person detection, for example by way of a trained machine learning model. In some cases, a machine vision process may perform motion detection (e.g., camera motion and/or object motion), for example by way of optical flow detection. In some cases, machine vision process may perform code (e.g., barcode) detection and decoding. In some cases, a machine vision process may additionally perform image capture and/or video recording.

With continued reference to FIG. 1, in some cases, registration may include one or more transformations to orient a camera frame (or an image or video stream) relative a three-dimensional coordinate system; exemplary transformations include without limitation homography transforms and affine transforms. In an embodiment, registration of first frame to a coordinate system may be verified and/or corrected using object identification and/or computer vision, as described above. For instance, and without limitation, an initial registration to two dimensions, represented for instance as registration to the x and y coordinates, may be performed using a two-dimensional projection of points in three dimensions onto a first frame, however. A third dimension of registration, representing depth and/or a z axis, may be detected by comparison of two frames; for instance, where first frame includes a pair of frames captured using a pair of cameras (e.g., stereoscopic camera also referred to in this disclosure as stereo-camera), image recognition and/or edge detection software may be used to detect a pair of stereoscopic views of images of an object; two stereoscopic views may be compared to derive z-axis values of points on object permitting, for instance, derivation of further z-axis points within and/or around the object using interpolation. This may be repeated with multiple objects in field of view, including without limitation environmental features of interest identified by object classifier and/or indicated by an operator. In an embodiment, x and y axes may be chosen to span a plane common to two cameras used for stereoscopic image capturing and/or an xy plane of a first frame; a result, x and y translational components and ø may be pre-populated in translational and rotational matrices, for affine transformation of coordinates of object, also as described above. Initial x and y coordinates and/or guesses at transformational matrices may alternatively or additionally be performed between first frame and second frame, as described above. For each point of a plurality of points on object and/or edge and/or edges of object as described above, x and y coordinates of a first stereoscopic frame may be populated, with an initial estimate of z coordinates based, for instance, on assumptions about object, such as an assumption that ground is substantially parallel to an xy plane as selected above. Z coordinates, and/or x, y, and z coordinates, registered using image capturing and/or object identification processes as described above may then be compared to coordinates predicted using initial guess at transformation matrices; an error function may be computed using by comparing the two sets of points, and new x, y, and/or z coordinates, may be iteratively estimated and compared until the error function drops below a threshold level.

With continued reference to FIG. 1, alternatively or additionally, determining obstacle datum 144 may include classifying obstacle datum 144 to a label of obstacle datum 144 using an image classifier 168; image classifier 168 may be trained using a plurality of images of obstacle datum 144. For the purposes of this disclosure, an "image classifier" is a machine-learning model, such as a mathematical model, neural net, or program generated by a machine learning algorithm known as a "classification algorithm," that sorts image data related inputs into categories or bins of data, outputting obstacle data associated therewith. The image classifier 168 disclosed herein may be consistent with a classifier disclosed with respect to FIG. 6. In some embodiments, image classifier 168 may be trained with image training data correlating image data of entity data 112 to obstacle data 144. For the purposes of this disclosure, "image training data" is training data that is used to train an image classifier 168. The training data disclosed herein is further disclosed with respect to FIG. 6. In some embodiments, image training data may be stored in entity database 140. In some embodiments, image training data may be received from one or more users, entity database 140, external computing devices, and/or previous iterations of processing. As a non-limiting example, image training data may include instructions from a user, who may be an expert user, a past user in embodiments disclosed herein, or the like, which may be stored in memory and/or stored in entity database 140, where the instructions may include labeling of training examples. In an embodiment, the image training data may correlate image data that may be analyzed to find the user's face to the user's face with a label of the user's face. For example and without limitation, the user's face identified from the image of image data using machine vision system may be classified to the label of the user's face, a name of the user, using image classifier 168.

With continued reference to FIG. 1, image classifier 168 may be configured to determine which of a plurality of edge-detected shapes is closest to obstacle datum 144 as determined by training using training data and selecting the determined shape as obstacle datum 144. As a non-limiting example, image classifier 168 may be trained with image training data that correlates the plurality of images of obstacle datum 144 to a label of obstacle datum 144. For example and without limitation, the image training data may correlate images of cracks on a vehicle to a label of a name 'crack.'

With continued reference to FIG. 1, alternatively or additionally, identifying a face of a user may include classifying the face of the user to a label of the user using an image classifier 168; image classifier 168 may be trained using a plurality of images of the user's face. Image classifier 168 may be configured to determine which of a plurality of edge-detected shapes is closest to the user's face as determined by training using training data and selecting the determined shape as the user's face. As a non-limiting example, image classifier 168 may be trained with image training data that correlates the plurality of images of the user's face to a label of the user's face. For example and without limitation, the image training data may correlate a plurality of images of the user's face to a label of the user's name, a unique code representing the user, and the like. Alternatively, identification of the user's face may be performed without using computer vision and/or classification; for instance, identifying the user's face may further include receiving, from the user, an identification of the user's face in the image of image data.

With continued reference to FIG. 1, in some cases, machine vision system may use a classifier, such as any classifier described throughout this disclosure. As a non-limiting example, machine vision system may use image classifier 168. For example and without limitation, machine vision system may use image classifier 168, wherein an input may include image data that is analyzed to find obstacle datum 144 or user's face, and through a classification algorithm, outputs obstacle datum 144 or user's face with a label of obstacle datum 144 or user's face based on image training data. In some embodiments, the use of image classifier may solve technical problems or improve technical processes. In a non-limiting example, the use of image classifier 168 may improve identifying hidden patterns, correlations, or anomalies that may be difficult for humans to detect; for instance, identifying obstacle datum 144 from image data. This may enhance the accuracy and efficiency of decision-making processes. In another non-limiting example, image classifier 168 may enable the automation of tasks that would otherwise require significant manual effort or expertise. By leveraging image classifier 168, apparatus 100 may automatically process, analyze, and interpret large volumes of data, reducing the time and resources required for manual analysis and improving the overall efficiency of the technical process. In another non-limiting example, the use of image classifier 168 may enable analyzing data and making decisions in real-time or near real-time, allowing processor 104 to respond quickly to changing conditions or dynamic environments. In another non-limiting example, image classifier 168 may learn from individual user preferences, behaviors, or feedback (i.e. user input or obstacle datum handler input) to personalize and customize the technical process. For example, and without limitation, image classifier 168 can analyze entity data 112, user entity maneuver datum as described below, user input, obstacle datum handler input, or the like to provide tailored recommendations, optimize settings, or adapt the process to individual needs. This enhances user experience and satisfaction.

With continued reference to FIG. 1, alternatively, determination of obstacle datum 144 may be performed without using computer vision and/or classification; for instance, determining obstacle datum 144 may further include receiving, from a user, an identification of obstacle datum 144 from image data. In some embodiments, processor 104 may receive user input from entity device 132. As a non-limiting example, user may manually identify obstacle datum 144 in image data using entity device 132. For example, and without limitation, user may input a note, check mark, or the like in image data to indicate obstacle datum 144 in image data. For example, and without limitation, user may choose at least an image that includes obstacle datum 144 in a plurality of image data. As another non-limiting example, user may manually input obstacle datum 144 using entity device 132; for instance, inputting obstacle datum 144 by typing, selecting, or the like. User interface that may allow user to input obstacle datum 144 is disclosed further in detail below. In some embodiments, processor 104 may receive obstacle datum 144 that is identified within entity's own system. In a non-limiting example, processor 104 may be communicatively connected to an entity and may receive entity data 112 or obstacle datum 144.

With continued reference to FIG. 1, for another instance, determining obstacle datum 144 may further include receiving, from an obstacle datum handler, an identification of obstacle datum 144 from image data. In a non-limiting example, processor 104 may receive an obstacle datum handler input from obstacle datum handler or handler device 136 for image data of entity data 112. For the purposes of this disclsoure, an "obstacle datum handler input" is an input from an obstacle datum handler that is related to entity. As a non-limiting example, obstacle datum handler input may include identification of obstacle datum 144 from image data. In a non-limiting example, processor 104 may transmit image data to handler device 136 and obstacle datum handler may review the image data, identify obstacle datum 144 from image data and input an obstacle datum handler input using handler device 136. For example, and without limitation, obstacle datum handler may input a note, check mark, or the like in image data to indicate obstacle datum 144 in image data. For example, and without limitation, obstacle datum handler may choose at least an image that includes obstacle datum 144 in a plurality of image data. User interface that may allow obstacle datum handler to input obstacle datum 144 is disclosed further in detail below.

With continued reference to FIG. 1, in some embodiments, processor 104 may obtain obstacle datum 144 from chatbot, AVR or digital communication as described above. In some embodiments, processor 104 may determine obstacle datum 144 using a language processing module. As a non-limiting example, processor 104 may analyze data from chatbot, ASR or digital communication using language processing module to find obstacle datum 144. For example, and without limitation, data from chatbot, ASR or digital communication may include textual data; for instance, textual data may include user's explanation about user's entity, obstacle datum 144 or obstacle cause datum. In a non-limiting example, textual data may include a document. Language processing module may extract obstacle datum 144 or obstacle cause datum from textual data.

With continued reference to FIG. 1, in come embodiments, processor 104 may use a language processing module to find a keyword. The language processing module may be configured to extract, from textual data, one or more words. As a non-limiting example, keyword may include obstacle datum 144 or obstacle cause datum. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

With continued reference to FIG. 1, language processing module may operate to produce a language processing model. Language processing model may include a program automatically generated by processor 104 and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

With continued reference to FIG. 1, language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs, as used herein, are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

With continued reference to FIG. 1, generating the language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

With continued reference to FIG. 1, language processing module may use a corpus of documents to generate associations between language elements in a language processing module, and diagnostic engine may then use such associations to analyze words extracted from one or more documents and determine that the one or more documents indicate significance of a category. In an embodiment, language module and/or processor 104 may perform this analysis using a selected set of significant documents, such as documents identified by one or more experts as representing good information; experts may identify or enter such documents via graphical user interface or may communicate identities of significant documents according to any other suitable method of electronic communication, or by providing such identity to other persons who may enter such identifications into processor 104. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

With continued reference to FIG. 1, in some embodiments, memory 108 may contain instructions configuring processor 104 to determine obstacle cause datum as a function of entity data 112. For the purposes of this disclosure, "obstacle cause datum" is a data element of entity data containing information of a cause that results in at least a negative impact on an entity. In some embodiments, entity data 112 may include obstacle cause datum. In an embodiment, obstacle cause datum may include circumstances that results in obstacle datum 144 of entity. As a non-limiting example, obstacle cause datum may include accidents, misuse of entity by user, normal wear and tear, aftermarket parts, or the like. In another embodiment, obstacle cause datum may include manufacturing defects, material defects, design defects, workmanship issues, premature component wear, non-conformity to specifications, standards, or the like outlined by manufacturer, or the like.

With continued reference to FIG. 1, in some embodiments, obstacle cause datum may be stored in entity database 140. In some embodiments, obstacle cause datum may be retrieved from entity database 140. In some embodiments, obstacle cause datum may be obtained from chatbot, ASR and/or digital communication. In some embodiments, processor 104 may determine obstacle cause datum using a language processing module as described above. In some embodiments, processor 104 may determine obstacle cause datum for obstacle datum 144 using a cause classifier. As used in the current disclosure, a "cause classifier" is a classifier that is configured to generate an obstacle cause datum. The cause classifier may be consistent with the classifier described below in FIG. 6. Inputs to the cause classifier may include obstacle datum 144, textual data from chatbot, ASR or digital communication, examples of obstacle cause datum, and the like. Outputs to the cause classifier may include obstacle cause datum tailored to obstacle datum 144. Cause classification training data that trains cause classifier may include a plurality of data entries containing a plurality of inputs that are correlated to a plurality of outputs for training a processor by a machine-learning process. In an embodiment, cause classification training data may include obstacle datum 144 and keywords from textual data correlated to examples of obstacle cause datum. Cause classification training data may be received entity database 140. In an embodiment, cause classification training data may be iteratively updated as a function of the input and output results of past cause classifier or any other classifier mentioned throughout this disclosure. The classifier may use, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifier, and the like.

With continued reference to FIG. 1, in some embodiments, processor 104 may determine obstacle cause datum using a machine learning process. A "machine learning process," as used in this disclosure, is a process that automatedly uses a body of data known as "training data" and/or a "training set" (described further below in this disclosure) to generate an algorithm that will be performed by a processor/module to produce outputs given data provided as inputs; this is in contrast to a non-machine learning software program where the commands to be executed are determined in advance by a user and written in a programming language. Machine-learning process may utilize supervised, unsupervised, lazy-learning processes and/or neural networks, described further below. In some embodiments, the machine learning process may include at least a processor 104 to generate a cause machine learning model, wherein generating the cause machine learning model may include training the cause machine learning model using cause training data, and wherein the cause training data may include a plurality of obstacle datum 144 correlated to obstacle cause datum. Plurality of obstacle datum 144 may include a plurality of most suitable obstacle datum 144 for plurality of obstacle cause datum; for instance, for given obstacle datum 144, including a scratch, a most suitable obstacle cause datum may include accidents. For another example, for given obstacle datum 144, including an engine malfunction, a most suitable obstacle cause datum may include manufacturing defects, or the like. Cause training data may come from entity database 140 or be provided by a user, wherein the user may include a past user or expert user. As a non-limiting example, cause training data may include instructions from the user stored in entity database 140, where the instructions may include labeling examples. In some embodiments, cause machine learning model may obtain cause training data for generating cause machine learning model by querying a communicatively connected entity database 140 that includes past inputs and outputs; for instance, without limitation, cause training data may include a plurality of previous obstacle datum 144 as input correlated to a plurality of previous identified obstacle cause datum as output. In some embodiments, correlations may indicate causative and/or predictive links between data, which may be modeled as relationships, such as mathematical relationships, by machine-learning models, as described in further detail below. In a non-limiting example, at least a processor 104 may determine a most suitable obstacle cause datum for a given obstacle datum 144 through cause machine learning model using machine learning process. Processor 104 may then determine obstacle cause datum; for instance, processor 104 may select obstacle cause datum with a maximum similarity (or otherwise minimum dissimilarity) to the most suitable obstacle cause datum determined by cause machine learning model. Similarity may be calculated by comparing using one or more distance functions.

With continued reference to FIG. 1, in some embodiments, processor 104 may receive obstacle cause datum from entity device 132. As a non-limiting example, user may manually input obstacle cause datum using entity device 132 as described in this disclosure. In a non-limiting example, user input may include obstacle cause datum. In some embodiments, processor 104 may receive obstacle cause datum from handler device 136. As a non-limiting example, obstacle datum handler may manually input obstacle cause datum using handler device 136 as described in this disclosure. In a non-limiting example, obstacle datum handler input may include obstacle cause datum.

With continued reference to FIG. 1, memory 108 contains instructions configuring processor 104 to classify entity data 112 into one or more obstacle groups 116 as a function of obstacle datum 144 of entity data 112. For the purposes of this disclosure, an "obstacle group" is a set of associative set of entity data. As a non-limiting example, each obstacle group 116 may include different type of obstacle datum 144 of entity and entity data 112 related to the entity. For example, and without limitation, obstacle group 116 may include scratches, dents, cracks, paint damages, rusts group, and the like. For example, and without limitation, obstacle group 116 may include engine malfunction, transmission issue, break system problem, electrical system failure, exterior damage group, and the like. In some embodiments, each obstacle group may include different type of obstacle datum 144 and associative obstacle cause datum. In some embodiments, obstacle group 116 may be stored in entity database 140. In some embodiments, obstacle group 116 may be retrieved from entity database 140. In some embodiments, obstacle group 116 may be manually determined by a user, wherein the user may include expert user or past user.

With continued reference to FIG. 1, in some embodiments, processor 104 may be configured to classify entity data 112 into obstacle group 116 using an obstacle classifier 172. For the purposes of this disclosure, an "obstacle classifier" is a machine-learning model, such as a mathematical model, neural net, or program generated by a machine learning algorithm known as a "classification algorithm," that sorts entity data and obstacle data related inputs into categories or bins of data, outputting obstacle group associated therewith. The obstacle classifier disclosed herein may be consistent with a classifier disclosed with respect to FIG. 6. In some embodiments, obstacle classifier may be trained with obstacle training data correlating image data of entity data 112 and obstacle datum 144 to obstacle group 116. As a non-limiting example, obstacle training data may correlate engine malfunction of a vehicle and entity data 112 related to the vehicle to engine malfunction group of obstacle group. For the purposes of this disclosure, "obstacle training data" is training data that is used to train an obstacle classifier. The training data disclosed herein is further disclosed with respect to FIG. 6. In some embodiments, obstacle training data may be stored in entity database 140. In some embodiments, obstacle training data may be received from one or more users, entity database 140, external computing devices, and/or previous iterations of processing. As a non-limiting example, obstacle training data may include instructions from a user, who may be an expert user, a past user in embodiments disclosed herein, or the like, which may be stored in memory and/or stored in entity database 140, where the instructions may include labeling of training examples.

With continued reference to FIG. 1, processor 104 may be configured to generate a classifier (such as but not limited to image classifier 168, obstacle classifier 172, or the like) using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as $P(A/B)=P(B/A) P(A)=P(B)$, where $P(A/B)$ is the probability of hypothesis A given data B also known as posterior probability; $P(B/A)$ is the probability of data B given that the hypothesis A was true; $P(A)$ is the probability of hypothesis A being true regardless of data also known as prior probability of A; and $P(B)$ is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, processor 104 may be configured to generate classifier (such as but not limited to image classifier 168, obstacle classifier 172, or the like) using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database 140, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm:

$$l = \sqrt{\sum_{i=0}^{n} a_i^2},$$

where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With continued reference to FIG. 1, in some embodiments, processor 104 may be configured to classify entity data 112 and obstacle datum 144 into obstacle group 116 using an obstacle lookup table. For the purposes of this disclosure, an "obstacle lookup table" is a lookup table that classifies entity data and obstacle datum into one or more obstacle groups. In some embodiments, processor 104 may lookup given entity data 112 and obstacle datum 144 and find a corresponding obstacle group 116 using obstacle lookup table. As a non-limiting example, obstacle lookup table may correlate engine malfunction of a vehicle and entity data 112 related to the vehicle to engine malfunction group of obstacle group. A "lookup table," for the purposes of this disclosure, is an array of data that maps input values to output values. Lookup table may be used to replace a runtime computation with an array indexing operation. In an embodiment, lookup table may include interpolation. For the purposes of this disclosure, an "interpolation" refers to a process for estimating values that lie between known data. As a non-limiting example, lookup table may include an output value for each of input values. When lookup table does not define the input values, then the lookup table may estimate the output values based on the nearby table values. In another embodiment, lookup table may include an extrapolation. For the purposes of this disclosure, an "extrapolation" refers to a process for estimating values that lie beyond the range of known data. As a non-limiting example, lookup table may linearly extrapolate the nearest data to estimate an output value for an input beyond the data.

With continued reference to FIG. 1, memory 108 contains instructions configuring processor 104 to determine at least an obstacle resolution object 120 as a function of one or more obstacle groups 116. For the purposes of this disclosure, an "obstacle resolution object" is a set of instructions encapsulated within a data block that targets eliminating at least an obstacle datum of entity data. In an embodiment, obstacle resolution object 120 may be tailored to rectify one or more obstacle datum 144. As a non-limiting example, obstacle resolution object 120 may include guidance or instructions for entity maintenance, entity repair, routine maintenance service, mechanical repairs, body repair, tire service, entity component replacement, specialty service, service delivery, customer support, reconditioning, and the like. In a non-limiting example, obstacle resolution object 120 associated with vehicle maintenance related obstacle group 116 may include a specific repair plan. In another non-limiting example, obstacle resolution object 120 may include a video that illustrates specific instructions for obstacle resolution object. In some embodiments, obstacle resolution object 120 may include specific technical skills an obstacle datum handler must have; for instance, certification, skills, education, or the like. In some embodiments, obstacle resolution object 120 may include the estimated duration of the execution of obstacle resolution object 120. In some embodiments, obstacle resolution object 120 may be consistent with obstacle resolution template 148 described below. In some embodiments, obstacle resolution object 120 may be stored in entity database 140. In some embodiments, obstacle resolution object 120 may be retrieved from entity database 140.

With continued reference to FIG. 1, in some cases, obstacle resolution object 120 may include a distinct set of data and/or operations that may be applied to entity data 112 in order to disassociate obstacle datum 144 with entity data 112. Processor 104 may organize a plurality of obstacle resolution objects according to a plurality of obstacle groups 116; for example, data store may include a plurality of schemas (i.e., tables) representing a plurality of obstacle groups 116, wherein each schema may include a plurality of entries, and wherein each entry may include one or more obstacle resolution objects 120.

With continued reference to FIG. 1, determining obstacle resolution object 120 includes retrieving an obstacle resolution template 148 as a function of one or more obstacle groups 116 and determining obstacle resolution object 120 as a function of the obstacle resolution template 148. For the purposes of this disclosure, an "obstacle resolution template" is a list of obstacle resolution objects predetermined for obstacle datum. As a non-limiting example, obstacle resolution template 148 may include repair manuals for manufacturer. For example, and without limitation, obstacle resolution template 148 may include service repair manuals (SRMs), service repair information (SRI), entity owner's manual, or the like. For example, and without limitation, obstacle resolution template 148 may include recommendation of original equipment manufacturer (OEM) parts for repairs or replacements. In some embodiments, obstacle resolution template 148 may include different predetermined obstacle resolution objects 120 for different entities. As a non-limiting example, obstacle resolution template 148 for entities from different manufacturers may include different obstacle resolution objects 120. As another non-limiting example, obstacle resolution template 148 for entities made in different times may include different obstacle resolution objects 120. In an embodiment, obstacle resolution template 148 may include instructions for identifying and diagnosing obstacle datum 144 in entities. In another embodiment, obstacle resolution template 148 may include detailed procedures and guidelines for repairing or replacing specific component or system in entities. In another embodiment, obstacle resolution template 148 may include information on technical specifications; for instance, fluid capacities, tightening torques, electrical values, or other measurements specific to entities. In another embodiment, obstacle resolution template 148 may include specific technical skills an obstacle datum handler must have; for instance, certification, skills, education, or the like. In another embodiment, obstacle resolution template 148 may include recommended maintenance schedule to ensure upkeep of entities. In another embodiment, obstacle resolution template 148 may include safety precautions and warnings to be followed while executing obstacle resolution object 120. In another embodiment, obstacle resolution template 148 may include special tools, equipment or software required for execution of obstacle resolution object 120. In some embodiments, obstacle resolution template 148 may be consistent with obstacle resolution objects 120. In some embodiments, obstacle resolution template 148 may be stored in entity database 140. In some embodiments, obstacle resolution template 148 may be retrieved from entity database 140. In some embodiments, obstacle datum handler may manually input obstacle resolution template 148 using handler device 136. In some embodiments, processor 104 may be configured to obtain obstacle resolution template 148 using language processing module and/or OCR as described above. As a non-limiting example, processor 104 may receive manuals as described in this disclosure using OCR and may identify obstacle resolution template 148 within the manuals using language processing module.

With continued reference to FIG. 1, processor 104 is configured to retrieve an obstacle resolution template 148 as a function of one or more obstacle groups 116. As a non-limiting example, as each obstacle group 116 of one or more obstacle groups 116 can include entity identifier of entity data 112 and obstacle resolution template 148 can include obstacle resolution objects 120 for entities that include entity identifier, processor 104 may query obstacle resolution template 148 that includes entity identifier that matches with entity identifier of obstacle group 116. A "query," as used in this disclosure, is a search function that returns data. As another non-limiting example, processor 104 may query obstacle resolution object 120 using entity profile of entity data 112, such as but not limited to entity's name, name of manufacturer, model year, model version, manufacturer country, or the like. In a non-limiting example, processor 104 may determine obstacle resolution object 120 by querying information of other entities that includes similar entity profile and history of obstacle resolution object 120 executed for the entities. Processor 104, continuing the non-limiting example, may determine components that is necessary for obstacle resolution object 120 based on the returning result (I.e. obstacle resolution object 120 that was executed with entities in the past). As a non-limiting example, component that is necessary for obstacle resolution object 120 may include component identifier, quantity, or the like. Further continuing the non-limiting example, after determining obstacle resolution object 120 which includes components necessary for obstacle resolution object 120, based on the returning result, processor 104 may determine a component availability. For the purposes of this disclosure, a "component availability" is a presence of components in an inventory of obstacle datum handler. For the purposes of this disclosure, an "inventory" is the collection of components of a plurality of entities. As a non-limiting example, inventory may include a plurality of components, component identifier for components, quantity of components, lifecycle of components, including phase-in period to phase-out period, or the like. For the purposes of this disclosure, a "component identifier" is an identifier that is unique for a component of an entity among others. In some embodiments, component identifier may be consistent with entity identifier. In some embodiments, information related to inventory may be stored in entity database 140 and may be retrieved from entity database 140. In a non-limiting example, processor 104 may query component identifier in inventory to check component availability. As a non-limiting example, component availability may include an available status and an unavailable status. For example, and without limitation, when processor 104 queries component identifier in an inventory and finds the component that includes the component identifier and necessary quantity, component availability may include available status. For example, and without limitation, when processor 104 queries component identifier in an inventory and does not find the component that includes the component identifier and necessary quantity, component availability may include unavailable status. In some embodiments, when processor 104 determines that component availability for components for obstacle resolution object 120 includes unavailable status, processor 104 may generate entity alert. In some embodiments, when processor 104 determines that component availability for components for obstacle resolution object 120 includes unavailable status, processor 104 may find available components from different obstacle datum handler and transmit a request for delivering the components.

With continued reference to FIG. 1, in some embodiments, generating a query may include generating a web crawler function. A query may be configured to search for one or more keywords, key phrases, and the like. A keyword may be used by a query to filter potential results from a query. As a non-limiting example, keyword may include entity profile, entity identifier, or the like as described above. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, processor 104 may generate a web crawler to scrape external resolution template or external obstacle resolution object 120 from a plurality of manufacturer's websites, search engines, or the like. The web crawler may be seeded and/or trained with a reputable website to begin the search. A web crawler may be generated by a processor 104. In some embodiments, the web crawler may be trained with information received from an obstacle datum handler through a user interface. In some embodiments, web crawler may be configured to generate a web query. A web query may include search criteria received from obstacle datum handler. For example, obstacle datum handler may submit a plurality of websites for web crawler to search obstacle resolution object or obstacle resolution template statistics. Additionally, web crawler function may be configured to search for and/or detect one or more data patterns. A "data pattern" as used in this disclosure is any repeating forms of information. A data pattern may include repeating obstacle resolution objects 120, obstacle resolution template 148, and the like. In some embodiments, web crawler may be configured to determine the relevancy of a data pattern. Relevancy may be determined by a relevancy score. A relevancy score may be automatically generated by processor 104, received from a machine learning model, and/or received from obstacle datum handler. In some embodiments, a relevancy score may include a range of numerical values that may correspond to a relevancy strength of data received from a web crawler function. As a non-limiting example, a web crawler function may search the Internet for obstacle resolution object 120 or obstacle resolution template 148.

With continued reference to FIG. 1, in some embodiments, processor 104 may be configured to determine obstacle resolution object 120 as a function of entity data 112. In some embodiments, processor 104 may determine obstacle resolution object 120 as a function of entity profile of entity data 112; for instance, entity profile including current milage, model, age, repair history, or the like. As a non-limiting example, processor 104 may query entity profile of an entity to entity database 140 which includes previous obstacle resolution objects 120 that has been executed for similar entities. In some embodiments, processor 104 may generate web crawler to find obstacle datum 144 that frequently occurs in entities that share similar entity profile. In some embodiments, processor 104 may generate web crawler to find obstacle resolution object 120 that is frequently executed for obstacle datum 144. In a non-limiting example, processor 104 may generate entity alert to notify user for potential obstacle datum 144 that might occur based on obstacle datum 144 found using web crawler. In a non-limiting example, processor 104 may generate entity alert to notify obstacle datum handler for potential execution of obstacle resolution object 120 to prepare in advance. In a non-limiting example, processor 104 may determine obstacle resolution object as a function of the result from web crawler.

With continued reference to FIG. 1, in some embodiments, processor 104 may determine obstacle resolution object 120 by ranking the plurality of obstacle resolution objects and selecting the highest-ranked obstacle resolution object 120. In some cases, plurality of obstacle resolution objects may be ranked based on a degree of relevance to obstacle datum 144, success rate of obstacle resolution object 120 for rectifying obstacle datum 144, difficulty of executing obstacle resolution object 120, and/or the like. In some embodiments, processor 104 may retrieve data related to success rate of obstacle resolution object 120 for rectifying obstacle datum 144 from entity database 140 and rank obstacle resolution object 120 as a function of the data. In some embodiments, processor 104 may retrieve data related to difficulty for executing obstacle resolution object 120 from entity database 140 and rank obstacle resolution object 120 as a function of the data.

With continued reference to FIG. 1, in some embodiments, obstacle resolution object 120 may be determined by obstacle datum handler. As a non-limiting example, obstacle datum handler may input an obstacle datum handler input using handler device 136, where the obstacle datum handler input may include obstacle resolution object 120 for obstacle datum 144. In a non-limiting example, processor 104 may transmit obstacle datum 144 or image data to handler device 136, obstacle datum handler may review obstacle datum 144 or image data and input proper obstacle resolution object 120 using handler device 136.

With continued reference to FIG. 1, in some embodiments, processor 104 may analyze a plurality of obstacle resolution objects 120 and obstacle datum 144 using language processing module and compare the keywords, where an obstacle resolution object 120 of the plurality of obstacle resolution objects 120 that includes keywords that matches with obstacle datum 144 the most may be determined as obstacle resolution object 120. In some embodiments, processor 104 may analyze a plurality of obstacle resolution objects 120 and obstacle datum 144 using language processing module and find obstacle resolution object 120 of the plurality of obstacle resolution objects 120 that is most relevant to obstacle datum 144.

With continued reference to FIG. 1, in some embodiments, processor 104 may determine obstacle resolution object 120 using a resolution machine learning model 176. For the purposes of this disclosure, a "resolution machine learning model" is a machine learning model that determines an obstacle resolution object. The resolution machine learning model disclosed herein may be consistent with a machine learning model disclosed with respect to FIG. 6. The resolution machine learning model may be trained with resolution training data. For the purposes of this disclosure, "resolution training data" is training data that is used to train a resolution machine learning model. The training data disclosed herein is further disclosed with respect to FIG. 6. In some embodiments, resolution machine learning model 176 may be trained with resolution training data correlating an obstacle group data set to obstacle resolution objects 120. As a non-limiting example, resolution training data may correlate obstacle datum 144 and related entity data 112 to obstacle resolution objects. As a non-limiting example, resolution training data may correlate engine malfunction group to obstacle resolution object 120 that is related to repairing engine malfunction. In some embodiments, obstacle training data may be stored in entity database 140. In some embodiments, resolution training data may be received from one or more users, entity database 140, external computing devices, and/or previous iterations of processing. As a non-limiting example, resolution group training data may include instructions from a user, who may be an expert user, a past user in embodiments disclosed herein, or the like, which may be stored in memory and/or stored in entity database 140, where the instructions may include labeling of training examples.

With continued reference to FIG. 1, in some embodiments, the use of image classifier may solve technical problems or improve technical processes. In a non-limiting example, the use of resolution machine learning model 176 may improve identifying hidden patterns, correlations, or anomalies that may be difficult for humans to detect; for instance, identifying obstacle resolution object 120 used for similar entities, identifying obstacle resolution object 120 related to entity, or the like. This may enhance the accuracy and efficiency of decision-making processes. In another non-limiting example, resolution machine learning model 176 may enable the automation of tasks that would otherwise require significant manual effort or expertise. By leveraging resolution machine learning model 176, apparatus 100 may automatically process, analyze, and interpret large volumes of data, reducing the time and resources required for manual analysis and improving the overall efficiency of the technical process. In another non-limiting example, resolution machine learning model 176 may learn from historical data and generate predictive models that forecast future outcomes or trends predict events, identify potential failures or risks (i.e. obstacle datum 144), optimize resource allocation, anticipate customer behavior or determine optimal solutions (i.e. obstacle resolution object 120). This proactive approach may enable better planning, resource management, and decision-making. In another non-limiting example, the use of resolution machine learning model 176 may enable analyzing data and making decisions in real-time or near real-time, allowing processor 104 to respond quickly to changing conditions or dynamic environments. In another non-limiting example, resolution machine learning model 176 may learn from individual user preferences, behaviors, or feedback (i.e. user input or obstacle datum handler input) to personalize and customize the technical process. For example, and without limitation, resolution machine learning model 176 can analyze entity data 112, user input, obstacle datum handler input, or the like to provide tailored recommendations (i.e. obstacle resolution object 120), optimize settings, or adapt the process to individual needs. This enhances user experience and satisfaction. These may be consistent with any machine learning model described in this disclosure.

With continued reference to FIG. 1, processor 104 may receive a machine-learning model from a remote device that utilizes one or more machine learning processes. As used in this disclosure "remote device" is an external device to processor 104. For example, and without limitation, a remote device may include a computing device, external device, processor, and the like thereof. Remote device may perform machine-learning process using resolution training data to determine obstacle resolution object 120 and transmit the output to processor 104. Remote device may transmit a signal, bit, datum, or parameter to processor 104 that at least relates to obstacle resolution object 120. Additionally or alternatively, the remote device may provide an updated machine-learning model. For example, and without limitation, an updated machine-learning model may be comprised of a firmware update, a software update, a machine-learning process correction, and the like thereof. As a non-limiting example a software update may incorporate a new function that relates to a modified obstacle resolution object 120. Additionally or alternatively, the updated machine learning model may be transmitted to the remote device, wherein the remote device may replace resolution machine-learning model with the updated machine-learning model and determine obstacle resolution object 120 as a function of the updated machine-learning model. The updated machine-learning model may be transmitted by the remote device and received by processor 104 as a software update, firmware update, or corrected cognitive machine-learning model. For example, and without limitation, resolution machine-learning model may utilize a random forest machine-learning process, wherein the updated machine-learning model may incorporate a gradient boosting machine-learning process.

With continued reference to FIG. 1, in some embodiments, processor 104 may determine obstacle resolution object 120 using a resolution lookup table. For the purposes of this disclosure, a "resolution lookup table" is a lookup table that determines obstacle resolution object. In some embodiments, resolution lookup table may be consistent with any lookup table described in the entirety of this disclosure. In some embodiments, processor 104 may lookup given obstacle group 116 and find a corresponding obstacle resolution object 120 using resolution lookup table. As a non-limiting example, resolution lookup table may correlate obstacle datum 144 and related entity data 112 to obstacle resolution objects. As a non-limiting example, resolution lookup table may correlate engine malfunction group to obstacle resolution object 120 related to engine malfunction.

With continued reference to FIG. 1, memory 108 contains instructions configuring processor 104 to generate an obstacle resolution data structure 152 as a function of obstacle resolution object 120 and obstacle group 116. For the purposes of this disclosure, an "obstacle resolution data structure" is a structured organization of data related to at least an obstacle resolution object. In some embodiments, obstacle resolution data structure 152 may provide a summarization, representation, or otherwise abstraction of the execution of obstacle resolution object 120. In a non-limiting example, obstacle resolution data structure 152 may include a comprehensive report on the execution of obstacle resolution objects 120. In another non-limiting example, obstacle resolution data structure 152 may include a list of obstacle datum 144 that can be handled by obstacle datum handler using obstacle resolution objects 120. In another non-limiting example, obstacle resolution data structure 152 may include a list of obstacle resolution objects 120 and detailed step-by-step guides of how the obstacle resolution objects 120 can be executed for entity as well as estimated timeline for the execution. In another non-limiting example, obstacle resolution data structure 152 may include obstacle datum 144 and associated entity profile, personal data, sensor data, obstacle cause datum, obstacle resolution object 120, or the like. In another non-limiting example, obstacle resolution data structure 152 may include a report of how obstacle resolution object 120 was executed. In a non-limiting example, obstacle resolution data structure 152 may be used as a claim for insurance company or manufacturer. In some embodiments, obstacle resolution data structure 152 may be used to educate a user related to maintenance of entity based on user entity maneuver datum and/or entity profile. As a non-limiting example, processor 104 may generate obstacle resolution object 120 that is tailored to entity profile of user's entity or maneuver of user using entity. In some embodiments, obstacle resolution data structure 152 may include a list of obstacle resolution objects 120 an entity has gotten. In some embodiments, obstacle resolution data structure 152 may be used as an appraisal for trade-in of entity. For the purposes of this disclosure, "trade-in" is the process of exchanging an entity that is used, for credit or a reduction in price when purchasing a new entity.

With continued reference to FIG. 1, in some embodiments, obstacle resolution data structure 152 may include a form of text, graph, trend line, chart, audio, animation, image, video, and the like. In some embodiments, obstacle resolution data structure 152 may include an obstacle image sequence. For the purposes of this disclosure, an "obstacle image sequence" is a visual medium that encompasses a series of moving images related to obstacle datum. As a non-limiting example, obstacle image sequence may include a plurality of videos of obstacle resolution objects 120. For example, and without limitation, obstacle resolution data structure 152 may include a list of obstacle datum 144 of one or more obstacle groups 116 and associated obstacle resolution objects 120 that could be done for entity. For example, and without limitation, obstacle resolution data structure 152 may include obstacle image sequence that includes a series of videos that includes step-by-step guides of how the repair may be done for entity. In some embodiments, obstacle resolution data structure 152 may include text, images, tables, charts, graphs, or other elements. In some embodiments, obstacle resolution data structure 152 may include various format. As a non-limiting example, obstacle resolution data structure 152 may include PDF, DOC, XLS, HTML, PNC, JPEG, BMP, TIFF, MP4, or the like. In an embodiment, obstacle resolution data structure 152 may include a hard copy form. In another embodiment, obstacle resolution data structure 152 may include an electronic copy form. In some embodiments, obstacle resolution data structure 152 may be stored in entity database 140. In an embodiment, obstacle resolution data structure 152 may be retrieved from entity database 140. In another embodiment, obstacle resolution data structure 152 may be received from a handler device 136. In some embodiments, obstacle resolution data structure 152 may be retrieved from an immutable sequence listing. In some embodiments, obstacle resolution data structure 152 may be retrieved from a cloud storage.

With continued reference to FIG. 1, generating obstacle resolution data structure 152 includes retrieving a plurality of data structure templates 156. For the purposes of this disclosure, a "data structure template" is a pre-designed structure or framework of an obstacle resolution data structure. In some embodiments, data structure template may include a plurality of data structure templates, wherein each data structure template includes different template form fields 164. In a non-limiting example, each data structure template may correspond to requirements for obstacle resolution data structure 152 from different manufacturers of entity. As a non-limiting example, first manufacturer may require obstacle form field and obstacle cause form field while second manufacturer may require obstacle form field, obstacle cause form field and obstacle resolution form field. The template form field disclosed herein is further described below. In some embodiments, data structure template 156 may be consistent with obstacle resolution data structure 152 except template form fields 164 of data structure template 156 are not filled which is described further in detail below. In some embodiments, data structure template 156 may be stored in entity database 140. In some embodiments, data structure template 156 may be retrieved from entity database 140. In some embodiments, obstacle datum handler may manually input data structure template 156 using handler device 136. In some embodiments, data structure template 156 may be retrieved using a web crawler described above. As a non-limiting example, processor 104 may generate a web crawler to scrape data structure template from manufacture's website, obstacle datum handler's website, insurance company's website, or the like. As a non-limiting example, data structure template 156 may be updated as a function of any updates from manufacturer's website.

With continued reference to FIG. 1, generating obstacle resolution data structure 152 includes determining an entity specific data structure template 156 of data structure templates 156 as a function of entity data 112. For the purposes of this disclosure, an "entity specific data structure template" is a data structure template that is specifically chosen for a user or user's entity. In some embodiments, entity specific data structure template 156 may be consistent with data structure template 156 except the entity specific data structure template 156 as a function of entity data 112. In some embodiments, processor 104 may determine entity specific data structure template 156 as a function of entity profile of entity data 112, wherein entity profile may include the name of entity's manufacturer. In a non-limiting example, each data structure template 156 of a plurality of data structure templates 156 may include different name of manufacturers, then processor 104 may match the name of entity's manufacturer in entity data 112 in obstacle group 116 with the name of manufacturer in the plurality of data structure templates 156. Continuing the non-limiting example, processor 104 may determine one data structure template 156 of the plurality of data structure template 156 that matches with the entity data 112 as entity specific data structure template 156. In some embodiments, processor 104 may transmit entity specific data structure template 156 to entity device 132 or handler device 136 so that user or obstacle datum handler can view, add information or review entity specific data structure template 156.

With continued reference to FIG. 1, in some embodiments, entity specific data structure template 156 may be manually determined by obstacle datum handler. As a non-limiting example, obstacle datum handler may manually determine entity specific data structure template 156 for a user or user's entity using handler device 136. In some embodiments, processor 104 may automatically determine entity specific data structure template 156 using an entity specific template machine learning model 180. For the purposes of this disclosure, an "entity specific template machine learning model" is a machine learning model that determines an entity specific template. The entity specific template machine learning model disclosed herein may be consistent with a machine learning model disclosed with respect to FIG. 6. The entity specific template machine learning model may be trained with entity specific template training data. For the purposes of this disclosure, "entity specific template training data" is training data that is used to train an entity specific template machine learning model. The training data disclosed herein is further disclosed with respect to FIG. 6. In some embodiments, entity specific template machine learning model 180 may be trained with entity specific template training data that correlates entity data sets to entity specific data structure templates 156. In some embodiments, user specific training data may correlate entity profile of entity data 112 to entity specific data structure templates 160. As a non-limiting example, entity specific template training data may correlate a 'name of manufacturer' of entity to entity specific data structure template 156 associated with the manufacturer. In some embodiments, entity specific template training data may be received from obstacle datum handler, entity database 140, external computing devices, and/or previous iterations of processing. As a non-limiting example, entity specific template training data may include instructions from a user, who is an expert personnel or past personnel, stored in the entity database 140, where the instructions may include labeling examples.

With continued reference to FIG. 1, in some embodiments, processor 104 may be configured to determine entity specific data structure template 156 using an entity specific template lookup table. For the purposes of this disclosure, an "entity specific template lookup table" is a lookup table that may determine an entity specific template. The entity specific template lookup table may be consistent with any lookup table disclosed above. In some embodiments, processor 104 may 'lookup' given entity data 112 to entity specific data structure template 156 using entity specific template lookup table. As a non-limiting example, entity specific template lookup table may correlate entity profile of entity data 112 to entity specific data structure templates 160. As a non-limiting example, entity specific template lookup table may correlate a 'name of manufacturer' of entity to entity specific data structure template 156 associated with the manufacturer.

With continued reference to FIG. 1, generating obstacle resolution data structure 152 includes identifying a template form field 164 of entity specific data structure template 156. For the purposes of this disclosure, a "template form field" is a specific area within a data structure template, obstacle resolution data structure or user specific data structure template that is designated for the input of specific types of information. As a non-limiting example, template form field 164 may include text fields, checkboxes, and the like. In an embodiment, template form field 164 may include personal data form field, wherein personal data associated with an entity and its obstacle datum can be put in the personal data form field. As a non-limiting example, personal data form field may include form field for user's name, date of birth, driver history, contact information, or the like. In another embodiment, template form field 164 may include entity profile form field, wherein entity profile associated with an entity and its obstacle datum can be put in the entity profile form field. As a non-limiting example, entity profile form field may include form field for entity identifier, model version, model year, or the like. In another embodiment, template form field 164 may include image data form field, wherein image data can be put in the image data form field. As a non-limiting example, image data form field may include form field for image data related to obstacle datum 144. In another embodiment, template form field 164 may include obstacle form field, wherein obstacle datum 144 can be put in the obstacle form field. In another embodiment, template form field 164 may include obstacle cause form field, wherein obstacle cause datum can be put in the obstacle cause form field. In another embodiment, template form field 164 may include obstacle resolution form field, wherein obstacle resolution object 120 can be put in the obstacle resolution form field. In some embodiments, template form field 164 may include a signature form field, wherein a user and/or obstacle datum handler's signature can be put on the signature form field. Persons skilled in the art, upon reviewing the entirety of this disclosure, may appreciate various template form fields 164 that can be used for an apparatus 100.

With continued reference to FIG. 1, in some embodiments, obstacle datum handler may generate template form field 164 anywhere in obstacle resolution data structure 152, data structure template 156 or entity specific data structure template 156. The entity specific data structure template 156 disclosed herein is further described below. As a non-limiting example, obstacle datum handler may manually create template form field 164 in obstacle resolution data structure 152, data structure template 156 or entity specific data structure template 156. In another embodiment, processor 104 may automatically create template form field 164 in t obstacle resolution data structure 152, data structure template 156 or entity specific data structure template 156 (automatic template form field creation system). Automatic template form field creation system may convert a non-interactive obstacle resolution data structure 152, data structure template 156 or entity specific data structure template 156 into an interactive obstacle resolution data structure 152, data structure template 156 or entity specific data structure template 156 with template form field 164. Automatic template form field creation system may include auto field detection that analyzes the structure and content of obstacle resolution data structure 152, data structure template 156 or entity specific data structure template 156 and identifies areas of the obstacle resolution data structure 152, data structure template 156 or entity specific data structure template 156 where template form fields 164 can be added. In a non-limiting example, when automatic template form field creation system identifies potential template form fields 164, obstacle datum handler can then review the identified template form fields 164 and choose which ones to add as template form field 164 in obstacle resolution data structure 152, data structure template 156 or entity specific data structure template 156, or revise, add, delete the template form fields 164 in obstacle resolution data structure 152, data structure template 156 or entity specific data structure template 156. In another non-limiting example, automatic template form field creation system may not require input from obstacle datum handler. In a non-limiting example, automatic template form field creation system may be implemented using Adobe Acrobat DC, Adobe Acrobat Reader DC, JotForm, Type Form, Google Forms, Wufoo, Formstack, or the like.

With continued reference to FIG. 1, generating obstacle resolution data structure 152 includes generating obstacle resolution data structure 152 as a function of template form field 164 of entity specific data structure template 156, obstacle resolution object 120 and obstacle group 116. In some embodiments, obstacle resolution data structure 152 may include template form field 164 of entity specific data structure template 156 filled with obstacle datum 144 and/or associated entity data 112 in obstacle group 116 and obstacle resolution object 120. As a non-limiting example, obstacle resolution data structure 152 may include entity specific data structure template 156 that includes personal data form field filled with personal data in obstacle group 116, entity profile form field filled with entity profile in obstacle group 116, obstacle form field filled with obstacle datum 144 in obstacle group 116, obstacle cause form field filled with obstacle cause datum in obstacle group 116, obstacle resolution form field filled with obstacle resolution object 120 associated with obstacle datum 144, or the like.

With continued reference to FIG. 1, in an embodiment, template form field 164 of user specific data structure template 156 may be manually filled by obstacle datum handler. In another embodiment, template form field 164 of user specific data structure template 156 may be automatically filled. As a non-limiting example, processor 104 may automatically fill template form field 164 with obstacle datum 144 and entity data 112 in obstacle group 116 and/or obstacle resolution object 120. In some embodiments, processor 104 may transmit obstacle resolution data structure 152 to entity device 132 or handler device 136 so that user or obstacle datum handler can view, add information, review obstacle resolution data structure 152.

With continued reference to FIG. 1, in some embodiments, processor 104 may automatically fill template form field 164 of user specific data structure template 156 using template form field machine learning model 184. For the purposes of this disclosure, a "template form field machine learning model" is a machine learning model that fills at least a template form field of a user specific data structure template. Template form field machine learning model 184 disclosed herein may be consistent with a machine learning model disclosed with respect to FIG. 6. Template form field machine learning model 184 may be trained with template form field training data. For the purposes of this disclosure, "template form field training data" is training data that is used to train template form field machine learning model 184. The training data disclosed herein is further disclosed with respect to FIG. 6. In some embodiments, template form field machine learning model 184 may be trained with template form field training data that correlates entity data sets to template form field 164 of user specific data structure template 156. As a non-limiting example, template form field training data may correlate a user's name of personal data in entity data 112 to personal data form field of template form field 164 for the user's name. As another non-limiting example, template form field training data may correlate obstacle datum 144 to obstacle form field of template form field 164. In some embodiments, template form field training data may be received from a user, entity database 140, external computing devices, and/or previous iterations of processing. As a non-limiting example, template form field 164 training data may include instructions from a user, including an expert user or past user, stored in entity database 140, where the instructions may include labeling examples. In some embodiments, template form field machine learning model 184 may be implemented with data mapping process. For the purposes of this disclosure, "data mapping" is the process of defining the relationships between data elements in different entities. In some embodiments, data mapping may include mapping fields, defining the data types and formats to be used, and identifying any transformations or conversions that are necessary.

With continued reference to FIG. 1, in some embodiments, processor 104 may fill template form field 164 of user specific data structure template 156 using template form field lookup table. Template form field lookup table disclosed herein may be consistent with a lookup table disclosed above. In some embodiments, processor 104 may 'lookup' entity data 112 to template form field 164 of user specific data structure template 156 using template form field lookup table. As a non-limiting example, template form field lookup table may correlate a user's name of personal data in entity data 112 to personal data form field of template form field 164 for the user's name. As another non-limiting example, template form field lookup table may correlate obstacle datum 144 to obstacle form field of template form field 164.

With continued reference to FIG. 1, in some embodiments, processor 104 may be configured for data verification. For the purposes of this disclosure, a "data verification" is a process of ensuring that any information of an obstacle resolution data structure or data transmitted from a data collection module is being "verified" complies with certain constraints. In some cases, data verification may include ensuring that data is complete, for example that all required data types are present, readable, uncorrupted, and/or otherwise useful for processor 104. In some cases, some or all verification processes may be performed by processor 104. In some cases, at least a machine-learning process, for example a machine-learning model, may be used to verify. Processor 104 may use any machine-learning process described in this disclosure for this or any other function. In some embodiments, at least one of validation and/or verification includes without limitation one or more of supervisory validation, machine-learning processes, graph-based validation, geometry-based validation, and rules-based validation. In some embodiments, data verification may include data cleaning. For the purposes of this disclosure, "data cleaning" is the process of identifying and correcting or removing errors and inconsistencies in data. In some embodiments, data cleaning may include analyzing entity data 112 or obstacle resolution object 120 to identify any missing or incomplete values, outliers, or inconsistencies. As a non-limiting example, processor 104 may include predefined validation rules that check for common data errors or inconsistencies, such as formatting errors, invalid values, or out-of-range values. As another non-limiting example, processor 104 may include statistical analysis that may detect outliers, unusual patterns or trends, or inconsistencies in the data. In some cases, processor 104 may flag the missing data and prompt a user or obstacle datum handler to input the necessary information. In some embodiments, processor 104 may generate entity alert for the inconsistency, invalid values, out-of-range values, or the like. In other cases, processor 104 may infer the missing data based on other available information or use statistical techniques to estimate the missing values. As a non-limiting example, the statistical techniques may include mean imputation, regression imputations, k-nearest neighbor imputation, expectation-maximization (EM) algorithm, or the like. In some cases, processor 104 may exclude the data with missing values from analysis altogether to generate obstacle resolution object 120. In some embodiments, data cleaning may include removing duplicates, correcting spelling mistakes and formatting of entity data 112 or obstacle resolution object 120 in a consistent manner. In some embodiments, data cleaning may include checking entity data 112 or obstacle resolution object 120 for accuracy and consistency, such as checking that all values fall within a specified range. In some embodiments, apparatus 100 may interface with an API. As"pro a non-limiting example, the API may include third-party customer relationship management (CRM) platforms. For example, and without limitation, the third-party CRM platforms may include Action step, Salesforce, Microsoft Dynamics 365, or the like.

With continued reference to FIG. 1, in some embodiments, obstacle resolution data structure 152 may further include a handler timetable data structure. For the purposes of this disclosure, a "handler timetable data structure" is a structured organization of data related to a schedule of an obstacle datum handler and a user for the execution of at least an obstacle resolution object 120. In some embodiments, handler timetable data structure may include a plurality of time slots. For the purposes of this disclosure, a "time slot" is a specific interval of time within a timetable. In some embodiments, time slot may include a fixed date, time, duration, and the like. In some embodiments, handler timetable data structure may be stored in entity database 140. In some embodiments, handler timetable data structure may be retrieved from entity database 140.

With continued reference to FIG. 1, in some embodiments, generating handler timetable data structure may include retrieving handler data. For the purposes of this disclosure, "handler data" is information related to a plurality of object datum handlers. In some embodiments, handler data may include a handler constraint. For the purposes of this disclosure, a "handler constraint" is information related to each of a plurality of obstacle datum handlers. In some embodiments, handler constraint may give the qualification for obstacle datum handlers to execute obstacle resolution object 120. As a non-limiting example, handler constraint may include a name, gender, contact information, related organization, or the like. For the purposes of this disclosure, an "organization" is a facility or infrastructure that is related to an entity. For example, and without limitation, related organization may include dealership, service department, service center, repair center, or the like that obstacle datum handler works for. As another non-limiting example, handler constraint may include service experience, service area, referral, review, service fee, specialty, education history, certification, skill, skill level, or the like. For example, and without limitation, skill level may include beginner, intermediate, advanced, expert, or the like. For example, and without limitation, service experience may include less than 1 year, between 1-2 years, 2-3 years, 3-5 years, 6-10 years, more than 10 years, or the like. For example, and without limitation, review may include a numerical value in a set range of 5, 10, or any range thereof. Review, in a non-limiting example, may include 4.4 in a set range of 5. Review of handler constraint, in another non-limiting example, may include 2 in a set range of 10. In another non-limiting example, review may include a string that includes one or more words.

With continued reference to FIG. 1, in some embodiments, handler data may include organization information. For the purposes of this disclosure, "organization information" is information related to an organization where a plurality of obstacle datum handlers work or provide their service. As a non-limiting example, organization information may include name, location, capacity, a number of service bay, types of tools or equipment an organization possess, types of obstacle resolution objects 120 an organization can execute, or the like. In some embodiments, organization information may be updated in real-time as obstacle datum handler or obstacle datum handler's time slot of an organization can be chosen for another user or entity to execute obstacle resolution object 120 which reduce a number of capacity or number of service bay available in particular time.

With continued reference to FIG. 1, in some embodiments, handler data may include handler time information. For the purposes of this disclosure, "handler time information" is information related to a plurality of obstacle datum handlers available time to execute at least an obstacle resolution object for a user or user's entity. In an embodiment, handler time information may include obstacle datum handler's available times of a day, week, month, year, or the like. In some embodiments, handler time information may be consistent with time slot of handler timetable data structure. In some embodiments, handler time information may be updated in real-time as obstacle datum handler or obstacle datum handler's time slot can be chosen for another user or entity to execute obstacle resolution object 120.

With continued reference to FIG. 1, in some embodiments, handler data may be stored in entity database 140. In some embodiments, handler data may be retrieved from entity database 140. In some embodiments, obstacle datum handler may manually input handler data using handler device 136. In some embodiments, processor 104 may retrieve obstacle datum handler from an application residing on entity device 132. In some embodiments, processor 104 may obtain handler data using a timetable application programming interface (API). As used herein, an "application programming interface" is a set of functions that allow applications to access data and interact with external software components, operating systems, or microdevices, such as another web application or computing device. In some embodiments, processor 104 may be configured to call timetable APIs for handler data. As a non-limiting example, a timetable API may include Google Calendar API, Microsoft Graph API, Apple Calendar API, Calendly API, Timely API, or the like. In some embodiments, processor 104 may generate a web crawler to scrape handler data from obstacle datum handler's website, timetable API, or the like as described in this disclosure.

With continued reference to FIG. 1, in some embodiments, generating handler timetable data structure may include retrieving a user preference. In some embodiments, entity data 112 may further include a user preference. For the purposes of this disclosure, a "user preference" is an attribute of an obstacle datum handler or related organization to which a user has more personal inclination towards over other attributes of the obstacle datum handler or related organization. As a non-limiting example, user preference may include preferred time slot, handler constraint, location of organization, and the like. For example, and without limitation, user preference may include preferred obstacle datum handler's review, time slot during which obstacle resolution object 120 can be executed for the user's entity, skill level, service experience, certification, or the like. In some embodiments, user preference may include preferred type of alternate entity. In some embodiments, user may rank preferred time slot during which obstacle resolution object 120 can be executed for the user's entity. In some embodiments, user preference may include resolution urgency datum. For the purposes of this disclosure, "resolution urgency datum" is a data element of user preference containing information or attributes having a level of immediacy with which an obstacle resolution object needs to be executed. As a non-limiting example, resolution urgency datum may include high urgency, medium urgency, low urgency, or the like. In some embodiments, user may manually input resolution urgency datum. In some embodiments, obstacle datum handler may manually input resolution urgency datum. In some embodiments, processor 104 may automatically determine resolution urgency datum as a function of obstacle datum 144 or user entity maneuver datum. In a non-limiting example, processor 104 may automatically determine resolution urgency datum using a machine learning model trained with training data that correlates obstacle datum 144 or user entity maneuver datum to resolution urgency datum. As a non-limiting example, processor 104 may determine high urgency when obstacle datum 144 or user entity maneuver datum can make critical obstruction of an entity in a short period of time and low urgency when obstacle datum 144 or user entity maneuver datum does not make critical obstruction of an entity in a short period of time. In some embodiments, processor 104 may receive user preference of entity data 112 from entity device 132, timetable API and applications residing on entity device 132, and the like as described above.

With continued reference to FIG. 1, in some embodiments, handler timetable data structure may be generated as a function of handler data, entity data 112 and obstacle resolution object 120. In an embodiment, processor 104 may generate handler timetable data structure as a function of user preference, organization information and handler time information. As a non-limiting example, processor 104 may determine an obstacle datum handler that includes handler time information and organization information related to the obstacle datum handler aligns with preferred time slot of user preference. For example, and without limitation, if an obstacle datum handler's handler time information includes Monday to Thursday from 9 am to 3 pm, organization information includes a capacity of 1 out of 5 and user preference includes user's preferred time slot of Wednesday 1 pm, then processor 104 may determine the obstacle datum handler to execute obstacle resolution object 120 for the user.

With continued reference to FIG. 1, in another embodiment, processor 104 may generate handler timetable data structure as a function of user preference, obstacle resolution object 120 and handler constraint. As a non-limiting example, processor 104 may determine an obstacle datum handler that includes handler constraint and organization information related to the obstacle datum handler aligns with preferred handler constraint of user preference and obstacle resolution object 120. For example, and without limitation, if obstacle resolution object 120 includes tire service, a user's user preference includes 2 years or more service experience, organization information includes a capacity of 1 out of 5, and an obstacle datum handler includes 5 years of service experience and can provide tire service, then processor 104 may determine the obstacle datum handler to execute obstacle resolution object 120 for the user.

With continued reference to FIG. 1, in another embodiments, processor 104 may determine an obstacle datum handler as a function of resolution urgency datum, user preference, organization information and handler time information. As a non-limiting example, processor 104 may determine an obstacle datum handler that includes handler time information and organization information related to the obstacle datum handler aligns with the earliest preferred time slot of user preference when resolution urgency datum is high urgency. For example, and without limitation, if a first obstacle datum handler's handler time information includes Monday to Wednesday from 10 am to 3 pm, a second obstacle datum handler's handler time information includes Thursday to Friday from 9 am to 3 pm, organization information for both obstacle datum handlers includes a capacity of 1 out of 5, user preference includes user's preferred time slot of Wednesday 9 am, 1 μm, 3 pm and Friday 5 μm and resolution urgency datum includes high urgency, then processor 104 may determine the first obstacle datum handler for Wednesday 1 pm time slot to execute obstacle resolution object 120 for the user.

With continued reference to FIG. 1, in some embodiments, user may manually determine obstacle datum handler to execute obstacle resolution object 120 using entity device 132. In some embodiments, obstacle datum handler may manually determine obstacle resolution object 120, time slot or entity for obstacle resolution object execution. In some embodiments, processor 104 may generate handler timetable data structure using a timetable machine learning model that is trained with timetable training data that correlates handler data, user preference and obstacle resolution object 120 to handler timetable data structures. As a non-limiting example, timetable training data may correlate handler time information handler constraint, organization information and user preference related to time slot, handler constraint and resolution urgency datum to handler timetable data structure. Processor 104 may use any machine-learning process described in this disclosure for this or any other function. In some embodiments, timetable training data may be stored in entity database 140. In some embodiments, timetable training data may be received from one or more users, entity database 140, external computing devices, and/or previous iterations of processing. As a non-limiting example, timetable training data may include instructions from a user, who may be an expert user, a past user in embodiments disclosed herein, or the like, which may be stored in memory and/or stored in entity database 140, where the instructions may include labeling of training examples.

With continued reference to FIG. 1, in some embodiments, memory 108 may contain instructions further configuring processor 104 to determine a pro-resolution datum of obstacle resolution object 120. For the purposes of this disclosure, a "pro-resolution datum" is a data element that encompasses information or attributes pertaining to the outcomes that can be obtained by the implementation of an obstacle resolution object for an obstacle datum. In an embodiment, pro-resolution datum may include fee for executing one or more obstacle resolution objects 120 for obstacle datum 144. As a non-limiting example, each obstacle resolution object 120 of a plurality of obstacle resolution object 120 may include a different fee for executing obstacle resolution object and pro-resolution datum may include the cumulative sum of the fees for obstacle resolution objects 120 that can be or are executed for obstacle datum 144. For example, and without limitation, fee may include cost of labor (i.e. labor of obstacle datum handler), parts and equipment used for obstacle resolution object 120, or the like. As a non-limiting example, when first obstacle resolution object 120 for obstacle datum 144 includes a first fee and second obstacle resolution object 120 for obstacle datum 144 includes a second fee, then pro-resolution datum may include the cumulative sum of the first fee and the second fee. In another embodiment, pro-resolution datum may include a note related to an execution process of obstacle resolution object 120. As a non-limiting example, pro-resolution datum may include if every obstacle resolution object 120 suggested by processor 104 for obstacle datum 144 has been followed by obstacle datum handler. As another non-limiting example, pro-resolution datum may include any note or information related to execution of obstacle resolution object 120 made for obstacle datum 144, including duration of execution, number of obstacle datum handlers, information of obstacle datum handlers, additional steps or tools used as obstacle resolution object 120 for obstacle datum 144, any damage or issue occurred during execution of obstacle resolution object 120, or the like. For example, and without limitation, obstacle datum handler may provide real-time or near real-time feedback related to execution of one or more obstacle resolution objects 120 (e.g., diagnostic and/or service estimate/update). In some embodiments, pro-resolution datum may be stored in immutable sequence listing. In some embodiments, pro-resolution datum may be retrieved from immutable sequence listing. In some embodiments, obstacle datum handler may manually input pro-resolution datum using handler device 136. In some embodiments, pro-resolution datum may be stored in entity database 140. In some embodiments, pro-resolution datum may be retrieved from entity database 140.

With continued reference to FIG. 1, in some embodiments, processor 104 may be configured to generate obstacle resolution data structure 152 as a function of pro-resolution datum. In a non-limiting example, obstacle resolution data structure 152 may include a report of how obstacle resolution object 120 was executed. In another non-limiting example, obstacle resolution data structure 152 may include a report of how much is the execution of obstacle resolution object 120. As a non-limiting example, obstacle resolution data structure 152 or user specific data structure template 156 may include pro-resolution form field, wherein pro-resolution datum can be put in the pro-resolution form field. For example, and without limitation, pro-resolution form field may include fee for executing each obstacle resolution object 120 or cumulative sum of fees for executing obstacle resolution object 120. For example, and without limitation, pro-resolution form field may include information related to execution of obstacle resolution object 120. In some embodiments, obstacle datum handler may manually input pro-resolution datum into pro-resolution form field. In some embodiments, processor 104 may automatically input pro-resolution datum into pro-resolution form field using a template form field machine learning model 184 trained with template form field training data that correlates pro-resolution datum into pro-resolution form field.

With continued reference to FIG. 1, in some embodiments, processor 104 may be configured to receive a user entity maneuver datum. In some embodiments, entity data 112 may include a user entity maneuver datum. In some embodiments, sensor data may include user entity maneuver datum. For the purposes of this disclosure, a "user entity maneuver datum" is a data element of entity data containing information or attributes related to an action of a user using or controlling an entity. In a non-limiting example, user entity maneuver datum may include data related to actions of user driving a vehicle, controlling a machinery, using home appliance or medical equipment, or the like. In some embodiments, user entity maneuver datum may be stored in entity database 140. In some embodiments, user entity maneuver datum may be retrieved from entity database 140. In some embodiments, user or obstacle datum handler may manually input user entity maneuver datum.

With continued reference to FIG. 1, in some embodiments, user entity maneuver datum may include motion data. In some embodiments, sensor data may include motion datum. For the purposes of this disclosure, "motion datum" is information related to the action or process of entity moving or being moved. As a non-limiting example, motion datum may include the movement or operation of machinery, home appliance, medical equipment, or the like of entity. For example, motion datum may include frequency of linear motion, rotational motion, oscillating motion, reciprocating motion, vibratory motion, or the like. In some embodiments, user entity maneuver datum may include throttle datum. "Throttle datum," for the purposes of this disclosure, is datum regarding the operation of an entity's throttle. A throttle regulates how much air can go into an engine, based on an operator input through a gas pedal. As more air flows into the engine, more fuel gets injected, allowing for more power. A throttle valve may be controlled by a cable or by an electric motor. In some embodiments, throttle percentage datum may be obtained by a throttle position sensor (TPS). "Throttle percentage," for the purposes of this disclosure, is a percentage of a position of the throttle. As a non-limiting example, the throttle percentage may be 5% at idle. A "throttle position sensor (TPS)," for the purposes of this disclosure, is a sensor located in the throttle body to monitor the throttle position of a vehicle. In some embodiments, sensor 124 may include TPS. In some embodiments, the throttle datum may include the throttle percentage that is being applied as a function of time over a course of a transport. As a non-limiting example, the throttle datum may show average throttle percentage of 52% as 4 hours of a transport. In some embodiments, user entity maneuver datum may include steering wheel datum. "Steering wheel datum," for the purposes of this disclosure, is datum regarding the operation of an entity's steering wheel. In some embodiments, the steering wheel datum may include an angle of the steering wheel as a function of time of a course of a transport. As a non-limiting example, the steering wheel datum may show 92 degrees for an angle of the steering wheel at a time of 4 pm during a transport. In some embodiments, user entity maneuver datum may include speed datum. "Speed datum," for the purposes of this disclosure, is datum related to speed of an entity's movement or operation. As a non-limiting example, the speed datum of a transport ship may be 20 knots (23 miles per hour). In some embodiments, user entity maneuver datum may include distance datum. "Distance datum," for the purposes of this disclosure, is datum related to a distance of an entity's movement. As a non-limiting example, the distance datum of vehicle may be 500 miles. In some embodiments, user entity maneuver datum may include brake datum. "Brake datum," for the purposes of this disclosure, is regarding the slowing or stopping the movement of an entity. In some embodiments, the brake datum may include frequencies of pressuring a brake of a vehicle. As a non-limiting example, the brake datum of vehicle may include 168 times pressing a brake during a transport from Ronks, Pennsylvania to Mount Joy, Pennsylvania. In some embodiments, the brake datum may include time spent on pressing a brake. As a non-limiting example, the brake datum of vehicle may include 11 seconds of pressing a brake. In some embodiments, the brake datum may include strength of actuation of a brake. As a non-limiting example, the brake datum of vehicle may include 80 lbs. of force while pressing a brake pedal hard. As another limiting example, the brake datum of vehicle may include 10 lbs. of force while pressing a brake pedal soft. In some embodiments, brake datum may include a percentage of the actuation of a brake pedal. For example, brake datum may include datum regarding that the brake in a vehicle was depressed 52%. In some embodiments, user entity maneuver datum may include acceleration datum. "Acceleration datum," for the purposes of this disclosure, is datum related to a rate at which an entity can increase its speed. As a non-limiting example, the acceleration datum of a motorcycle may be 10 $m/s^2$ acceleration rate at 2 o'clock.

With continued reference to FIG. 1, in some embodiments, processor 104 may receive user entity maneuver datum from sensor 124. In a non-limiting embodiment, sensor 124 may include a technique for measuring distances or slant range from an observer including sensor 124 to a target which may include a plurality of outside parameters. An "outside parameter," for the purposes of this disclosure, refers to environmental factors or physical factors that may be further captured by a sensor. Outside parameter may include, but is not limited to, air density, air speed, true airspeed, relative airspeed, current patterns, temperature, humidity level, and weather conditions, among others. Outside parameter may include velocity and/or speed in a plurality of ranges and direction such as vertical speed, horizontal speed, changes in angle or rates of change in angles like pitch rate, roll rate, yaw rate, or a combination thereof, among others. Outside parameter may further include physical factors of the components of entity itself, including, but not limited to, remaining fuel or battery. Outside parameter may include at least an environmental parameter. Environment parameter may include, without limitation, time, pressure, temperature, air density, altitude, gravity, humidity level, speed, debris, among others. Environmental parameters may be stored in any suitable datastore consistent with this disclosure. Technique may include the use of active range finding methods which may include, but not limited to, light detection and ranging (LIDAR), radar, sonar, ultrasonic range finding, and the like. LIDAR systems may include, but are not limited to, a laser, at least a phased array, at least a microelectromechanical machine, at least a scanner and/or optic, a photodetector, global positioning system (GPS), and the like.

With continued reference to FIG. 1, in some embodiments, sensor 124 may be communicatively connected to entity. As a non-limiting example, sensor 124 may be connected to steering wheels, tires, pipes, suspensions, shaft, and the like of entity. In some embodiments, sensor 124 may be located within entity or entity device 132. Sensor 124 may also be located on the interior or exterior of entity. In some embodiments, processor 104 may receive sensor data or user entity maneuver datum from sensor 124 using wireless communication, such as, as non-limiting examples, Wi-Fi, Bluetooth, 3G, 4G, LTE, 5G, cellular data, cellular networks, NFC, radio, and the like. In some embodiments, sensor 124 may be a contact or a non-contact sensor. In some embodiments, sensor 124 may generate a sensor signal (also referred to in this disclosure as a "signal") related to detections. Signals may include electrical, electromagnetic, visual, audio, radio waves, or another undisclosed signal type alone or in combination. Any data or signal herein may include an electrical signal. Electrical signals may include analog signals, digital signals, periodic or aperiodic signal, step signals, unit impulse signal, unit ramp signal, unit parabolic signal, signum function, exponential signal, rectangular signal, triangular signal, sinusoidal signal, sinc function, or pulse width modulated signal. Sensor 124 may include circuitry, computing devices, electronic components or a combination thereof that translates sensor detections into at least an electronic signal configured to be transmitted to another electronic component, such as processor 104. Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e. quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e. a stochastic process), utilizing statistical properties. For instance, in some embodiments, the signal may be modeled with a probability distribution indicating noise, which then may be used to reduce noise in a processed signal. In some embodiments, sensor data or user entity maneuver datum may be transmitted at regular intervals. As a non-limiting example, steering wheel data may be transmitted every 5 minutes, 20 minutes, 1 hour, 2 hours, and the like. In some embodiments, sensor data or user entity maneuver datum may be transmitted at a conclusion of operation of entity. In some embodiments, sensor data or user entity maneuver datum may be transmitted continuously during the operation.

With continued reference to FIG. 1, in some embodiments, memory 108 may further contain instructions configuring processor 104 to determine a maneuver obstacle datum as a function of user entity maneuver datum. For the purposes of this disclosure, a "maneuver obstacle datum" is a data element of obstacle datum containing information or attributes having at least a negative impact on an entity that can be caused due to a user's maneuver of an entity. In a non-limiting example, maneuver obstacle datum may include predictive damage or hinderance that might occur to entity after a certain amount or length of time of an action of a user using or controlling the entity (i.e. user entity maneuver datum). In some embodiments, maneuver obstacle datum may be consistent with obstacle datum 144 described above. As a non-limiting example, maneuver obstacle datum may include engine malfunction, transmission issue, break system problem, electrical system failure, exterior damage, worn parts, battery damage, fluid contamination or deficiency, clog, inaccurate calibration, loose connection between parts, and the like. In some embodiments, maneuver obstacle datum may include a plurality of maneuver obstacle datum. For example, and without limitation, maneuver obstacle datum of entity may include worn parts, clog, fluid contamination, or the like. In some embodiments, obstacle datum 144 may be stored in entity database 140. In some embodiments, obstacle datum 144 may be retrieved from entity database 140. In some embodiments, obstacle datum handler may manually determine maneuver obstacle datum after reviewing user entity maneuver datum. In a non-limiting example, processor 104 may transmit and display user entity maneuver datum to handler device 136, then obstacle datum handler may input an obstacle datum handler input determining maneuver obstacle datum.

With continued reference to FIG. 1, in some embodiments, processor 104 may automatically determine maneuver obstacle datum using a maneuver obstacle machine learning model. For the purposes of this disclosure, a "maneuver obstacle machine learning model" is a machine learning model that determines a maneuver obstacle datum. The maneuver obstacle machine learning model disclosed herein may be consistent with a machine learning model disclosed with respect to FIG. 6. The maneuver obstacle machine learning model may be trained with maneuver obstacle training data. For the purposes of this disclosure, "maneuver obstacle training data" is training data that is used to train a maneuver obstacle machine learning model. The training data disclosed herein is further disclosed with respect to FIG. 6. In some embodiments, maneuver obstacle machine learning model may be trained with maneuver obstacle training data correlating a user entity maneuver datum set to maneuver obstacle datums. As a non-limiting example, maneuver obstacle training data may correlate motion datum, for instance frequency of linear motion, and brake datum, for instance frequency of pressuring a brake, to maneuver obstacle datum, for instance worn parts that make linear motion, break system problem, or the like. verify. Processor 104 may use any machine-learning process described in this disclosure for this or any other function. In some embodiments, obstacle training data may be stored in entity database 140. In some embodiments, maneuver obstacle training data may be received from one or more users, entity database 140, external computing devices, and/or previous iterations of processing. As a non-limiting example, maneuver obstacle group training data may include instructions from a user, who may be an expert user, a past user, or the like, which may be stored in memory and/or stored in entity database 140, where the instructions may include labeling of training examples.

With continued reference to FIG. 1, in some embodiments, processor 104 may determine maneuver obstacle datum using a resolution lookup table. For the purposes of this disclosure, a "maneuver obstacle lookup table" is a lookup table that determines maneuver obstacle datum. In some embodiments, maneuver obstacle lookup table may be consistent with any lookup table described in the entirety of this disclosure. In some embodiments, processor 104 may lookup given user entity maneuver datum and find a corresponding maneuver obstacle datum using maneuver obstacle lookup table. As a non-limiting example, maneuver obstacle lookup table may correlate motion datum, for instance frequency of linear motion, and brake datum, for instance frequency of pressuring a brake, to maneuver obstacle datum, for instance worn parts that make linear motion, break system problem, or the like.

With continued reference to FIG. 1, processor 104 may determine obstacle resolution object 120 using a Monte Carlo simulation. "Monte Carlo simulation" may refer to a "Monte Carlo method," "Monte Carlo experiment," and/or executing a "Monte Carlo algorithm." A Monte Carlo simulation may be a mathematical technique that may generate variables, numerical values, and the like, for modeling risk, uncertainty, etc. of a certain system using a stochastic simulation process. Monte Carlo simulations may encompass a range of algorithms and mathematical analysis techniques such as Markov Model Monte Carlo (MMMC) simulations, Mckean-Vlasov processes, Monte Carlo localization, among other probabilistic heuristics. As used herein, a Monte Carlo simulation may generate random obstacle resolution object 120, wherein each obstacle resolution template 148 may represent a sufficiently good solution to an optimization problem, wherein the solution is obstacle resolution object 120 represented by a numerical value, 2D polar coordinate, vector, matrix, or the like, that represents obstacle resolution object 120. Each generated obstacle resolution object 120 may be associated with entity data 112, obstacle datum 144, obstacle cause datum, user entity maneuver datum, or the like. And thus, each obstacle resolution object 120 may have values of obstacle resolution object 120 to perform a randomly generate obstacle resolution object 120. Each obstacle resolution object 120 may then have associated with it a "value of obstacle resolution object" variable, wherein the value of obstacle resolution object 120 is a numerical value that represents the obstacle resolution object 120 for obstacle datum 144. Obstacle resolution object 120 can be plotted and/or mapped as a function of their value of obstacle resolution object 120 and a machine-learning process may select obstacle resolution object 120 based on some criterion, for instance the obstacle resolution object 120 with the most minimized value of obstacle resolution object 120, and select those obstacle resolution object 120 as inputs to subsequent calculations.

A Monte Carlo simulation may be a class of computation algorithms used by a machine-learning process that may rely on repeated stochastic sampling to obtain numerical results, for instance generating random spatial locations within a confined space on a map, wherein each spatial location can have a numerical parameter describing it. Monte Carlo simulations may be performed with dynamic systems that may be coupled with an analysis method, for instance an unknown obstacle resolution object 120 relative to entity data 112, obstacle datum 144, obstacle cause datum, user entity maneuver datum, or the like, wherein the entity data 112, obstacle datum 144, obstacle cause datum, user entity maneuver datum, or the like is determine by sampling within the simulation. In non-limiting illustrative examples, a machine-learning process, such as but not limited to a supervised machine-learning process, may accept generated candidate solutions from a Monte Carlo simulation, as described above, and calculate refined obstacle resolution object 120 to the candidate obstacle resolution object 120, wherein the predicted paths may contain numerical results from the simulated obstacle resolution object 120. The Monte Carlo simulation may generate many candidate template obstacle resolution object 120, where a machine-learning process/model may narrow the number of obstacle resolution object 120 based on entity data 112, obstacle datum 144, obstacle cause datum, user entity maneuver datum, or the like from a plurality of obstacle resolution objects 120. Such a machine-learning process may iteratively generate selected obstacle resolution object 120 based on a criterion, for instance and without limitation entity data 112, obstacle datum 144, obstacle cause datum, user entity maneuver datum, or the like, wherein when it is time for obstacle resolution object 120 to be used for purposes of generating obstacle resolution data structure 152, a machine-learning process may retrieve obstacle resolution object 120.

With continued reference to FIG. 1, in a non-limiting example of generating "good" obstacle resolution object 120 using Monte Carlo simulator, obstacle datum 144 may include launching a new obstacle resolution object 120 and "good" obstacle resolution object 120 may include obstacle resolution object 120 that can rectify obstacle datum 144. Monte Carlo simulator may run a plurality of simulations, with each simulation using a different set of random inputs based on the estimated probability distributions of each variable. For example, and without limitation, the resulted simulation may include a 70% chance that obstacle resolution object 120 is the "good" obstacle resolution object 120, but may also include a 20% chance that the product will result in the "bad" obstacle resolution object 120.

With continued reference to FIG. 1, in some embodiments, processor 104 may include a machine learning model to improve accuracy of determining optimal decision making parameters. In some embodiments, the machine learning model may be consistent with any machine learning model described in the entirety of this disclosure. In some embodiments, the machine learning model may determine initial set of parameters, where the set of parameter may be initially determined. In some embodiments, the initial set of parameters may be modified using random noise, where the random noise may be added to the parameters to simulate real-world variability. In some embodiments, a range of parameter values may be selected to ensure a broad exploration of the parameter space. In some embodiments, machine learning model may be rerun with the modified parameters to generate a new set of outcomes. In some embodiments, the machine learning model may compare the model result against second set of training data to determine parameter for better accuracy for decision making of apparatus 100. The noise that is introduced may be obtained by modeling a time series of data and finding the expected noise from that data. In some embodiments, the machine learning model may be implemented in Monte Carlo simulator.

With continued reference to FIG. 1, in some embodiments, memory 108 may further contain instructions configuring processor 104 to determine obstacle resolution object 120 as a function of maneuver obstacle datum. In some embodiments, obstacle resolution object 120 may include preventative repair or replacement that targets eliminating maneuver obstacle datum. As a non-limiting example, obstacle resolution object 120 may include lubrication, cleaning, component replacement, filter replacement, calibration, belt or chain replacement, tightening connections, software or firmware update, fluid change, timing belt replacement, brake pad replacement, tire rotation, tire replacement, battery replacement, or the like. Obstacle resolution object 120 is further described in detail above. In some embodiments, processor 104 may determine obstacle resolution object 120 as a function of maneuver obstacle datum using obstacle resolution template 148, obstacle datum handler input, language processing module, resolution machine learning model, resolution lookup table, or the like as described above.

With continued reference to FIG. 1, in some embodiments, memory 108 may further contain instructions configuring processor 104 to receive a user input as a function of obstacle resolution data structure 152. In some embodiments, processor 104 may transmit obstacle resolution data structure 152 and generate user interface to display obstacle resolution data structure 152 and any related data including entity data 112, obstacle datum 144, obstacle resolution object 120, or the like. In some embodiments, processor 104 may generate user interface to display information related to entity owner's manual of obstacle resolution template 148. In a non-limiting example, information from entity owner's manual may be display on entity device when user query specific information related to entity using a keyword. For the purposes of this disclosure, a "user interface" is a means by which a user or obstacle datum handler and a computer system interact; for example through the use of input devices and software. A user interface may include a graphical user interface (GUI), command line interface (CLI), menu-driven user interface, touch user interface, voice user interface (VUI), form-based user interface, any combination thereof and the like. In some embodiments, user interface may operate on and/or be communicatively connected to a decentralized platform, metaverse, and/or a decentralized exchange platform associated with the user. For example, a user may interact with user interface in virtual reality or augmented reality, In a non-limiting example, obstacle datum handler may communicate with user using handler device 136 and entity device 132 that implements virtual reality or augmented reality. For example, and without limitation, obstacle datum handler may explain about obstacle resolution data structure 152 or obstacle resolution object 120 using virtual reality or augmented reality implemented in entity device 132 or handler device 136. In some embodiments, a user may interact with the use interface using a computing device distinct from and communicatively connected to processor 104. For example, a smart phone, smart tablet, or laptop operated by user. In an embodiment, user interface may include a graphical user interface. A "graphical user interface," as used herein, is a graphical form of user interface that allows users or obstacle datum handlers to interact with electronic devices. In some embodiments, GUI may include icons, menus, other visual indicators or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pull-down menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access.

With continued reference to FIG. 1, GUI may include one or more event handlers. An "event handler" as used in this disclosure is a callback routine that operates asynchronously once an event takes place. Event handlers may include, without limitation, one or more programs to perform one or more actions based on user input, such as generating pop-up windows, submitting forms, changing background colors of a webpage, and the like. Event handlers may be programmed for specific user input, such as, but not limited to, mouse clicks, mouse hovering, touchscreen input, keystrokes, and the like. For instance and without limitation, an event handler may be programmed to generate a pop-up window if a user double clicks on a specific icon. User input may include manipulation of computer icons, such as, but not limited to, clicking, selecting, dragging and dropping, scrolling, and the like. In some embodiments, user input may include an entry of characters and/or symbols in a user input field. A "user input field" as used in this disclosure is a portion of a graphical user interface configured to receive data from an individual. A user input field may include, but is not limited to, text boxes numerical fields, search fields, filtering fields, and the like. In some embodiments, user input may include touch input. Touch input may include, but is not limited to, single taps, double taps, triple taps, long presses, swiping gestures, and the like. One of ordinary skill in the art will appreciate the various ways a user may interact with GUI. In some embodiments, GUI may update data in real time. "Real time" as used in this disclosure is a present time.

With continued reference to FIG. 1, in an embodiment, user input may include an approval. For the purposes of this disclosure, an "approval" is the act of accepting an obstacle resolution data structure. In some embodiments, if processor 104 receives approval of user input, then the processor 104 may generate handler timetable data structure of obstacle resolution object 120. In a non-limiting example, when user accepts (i.e. approval of user input) obstacle resolution data structure 152 that includes obstacle resolution object 120, processor 104 may generate handler timetable data structure so that obstacle datum handler can execute obstacle resolution object 120. In some embodiments, if processor 104 receives approval of user input, then the processor 104 may process pro-resolution datum, wherein pro-resolution datum includes the cumulative sum of fees for executing obstacle resolution object 120. As a non-limiting example, processing pro-resolution datum may include generating obstacle resolution data structure 152 that includes pro-resolution form field. As another non-limiting example, processing pro-resolution datum may include receiving payment for the cumulative sum of fees for executing obstacle resolution object 120 from user. For example, and without limitation, data related to processing pro-resolution datum may be stored in immutable sequential listing and/or retrieved from immutable sequential listing. For example, and without limitation, processing pro-resolution datum may include implementing payment processing platform. For the purposes of this disclosure, a "payment processing platform" is a software or service that facilitates payment transactions between businesses and their customers. In some embodiments, payment processing platform may facilitate payment transactions between obstacle datum handler and user. In some embodiments, processor 104 may transmit pro-resolution datum and/or entity data 112 including personal data and entity profile to payment processing platform. In a non-limiting example, payment processing platform may process pro-resolution datum and/or entity data 112 and transmit resulting data to processor 104 or entity device 132. In some cases, payment processing platform may be a cloud system component; for instance, and without limitation, payment processing platform may include a set of Application Programming Interfaces (APIs) configured for processing online payment. APIs may include a third-party (3rd party) payment processing APIs. As another non-limiting example, payment processing platform may include insurance related APIs. As another non-limiting example, payment processing platform may include PayPal, Stripe, Square, Authorize. Net, Venmo, Affirm, Zero Plan, or the like. For instance, and without limitation, payment processing platform may include bank transfers. In some embodiments, processor 104 or third-party (3rd party) payment processing APIs may generate deferred payment plans, giving user the option to finance the cumulative fee over time rather than paying upfront. In some embodiments, processor 104 may generate personalized payment options for the upcoming obstacle resolution object 120 as a function of payment history and previous obstacle resolution object 120. As a non-limiting example, when user made a payment using credit card transactions, processor 104 may generate a credit card transaction option for personalized payment option. As another non-limiting example, when user made a payment by financing the fee over time with bank transfer, processor 104 may generate a financing the fee over time with bank transfer option for personalized payment option. In some embodiments, processor 104 may display history of how pro-resolution datum was processed to entity device 132; for instance, processor 104 may display payment schedule, interest rate, total repayment amount, tax, detailed fee breakdown, insurance coverage, or the like. In some embodiments, user or obstacle datum handler may manually generate the personalized payment option. In some embodiments, processor 104 may generate the personalized payment option using machine learning process that analyze previous repair and payment history and generate personalized payment options for the upcoming service. In some embodiments, processor 104 may automate claim process with insurance company or manufacturer related to obstacle resolution object 120 or obstacle resolution data structure 152 and provide a real-time updates on the status of the claim process by implementing third-party APIs.

With continued reference to FIG. 1, in some embodiments, user input may include a rejection. For the purposes of this disclosure, a "rejection" is the act of disagreeing with an obstacle resolution data structure. In some embodiments, if processor 104 receives rejection from user, then the processor 104 may determine another obstacle resolution object 120 for user. In some embodiments, if processor 104 receives rejection from user, then the processor 104 may generate a rejection resolution datum. For the purposes of this disclosure, a "rejection resolution datum" is a data element that encompasses information or attributes pertaining to reducing the rate of receiving rejection from a user. In some embodiments, rejection resolution datum may be stored in entity database 140 and/or retrieved from entity database 140. In a non-limiting example, when user inputs rejection, user may additionally input the reason for rejection. In some embodiments, user input may be stored in entity database 140. In some embodiments, user input may be retrieved from entity database 140. In a non-limiting example, processor 104 may analyze in which categories of obstacle resolution data structure 152 or obstacle resolution object 120 a plurality of users transmitted rejections, then generate rejection resolution datum as a function of the analysis. In some embodiments, obstacle datum handler may manually classify obstacle resolution object 120 into one or more resolution object groups using handler device 136. In some cases, processor 104 may classify obstacle resolution object 120 into one or more resolution object groups; for instance, classifying automatically using a resolution object classifier trained with resolution object group training data that correlates obstacle resolution objects 120 to one or more resolution object groups or classifying using obstacle datum handler input. For the purposes of this disclosure, a "resolution object group" is a set of associative obstacle resolution objects. As a non-limiting example, each resolution object group may include different types of obstacle resolution objects 120; for instance, including routine maintenance service, mechanical repairs, body repair, tire service, specialty service group, and/or the like. For example, and without limitation, resolution object group training data may correlate tire alignment to tire service group. As the number of rejections for obstacle resolution object 120 in each resolution object group, in a non-limiting example, exceeds a predetermined threshold in a certain period of time, then processor 104 may generate rejection resolution datum. As a non-limiting example, predetermined threshold may be manually determined by obstacle datum handler. In some embodiments, predetermined threshold may be stored in entity database 140 and retrieved from entity database 140. In some embodiments, resolution object group may be stored in entity database 140 and retrieved from entity database 140. In some embodiments, resolution object group training data may be stored in entity database 140. In some embodiments, resolution object group training data may be received from one or more users, entity database 140, external computing devices, and/or previous iterations of processing. As a non-limiting example, resolution object group training data may include instructions from a user, who may be an expert user, a past user in embodiments disclosed herein, or the like, which may be stored in memory and/or stored in entity database 140, where the instructions may include labeling of training examples.

With continued reference to FIG. 1, in some embodiments, rejection resolution datum may include an alternative solution. For the purposes of this disclosure, an "alternative solution" is the act of providing an alternate obstacle resolution object. As a non-limiting example, alternative solution may be consistent with obstacle resolution object 120. In some embodiments, obstacle resolution template 148 may include an alternative list. For the purposes of this disclosure, an "alternative list" is a list of alternate obstacle resolution objects that can be used instead of various obstacle resolution objects. As a non-limiting example, alternative list of obstacle resolution template 148 may include alternative obstacle resolution objects 120 that have similar efficacy or function but may be more cost-effective or have a lower risk of failure. For example, and without limitation, when a user rejects first obstacle resolution object, processor 104 may determine alternative solution to the first obstacle resolution object, second obstacle resolution object, and transmit to entity device 132. In some embodiments, obstacle datum handler may manually determine alternative solution. In some embodiments, processor 104 may generate alternative solution using a machine learning model that is trained with training data that correlates rejections of obstacle resolution objects and alternative list to alternative solutions. As a non-limiting example, training data may correlate rejection to first obstacle resolution object to alternative solution of second obstacle resolution object.

With continued reference to FIG. 1, in some embodiments, rejection resolution datum may further include service discount. For the purposes of this disclosure, "service discount" is a reduction in the price or cost of an obstacle resolution object. In some embodiments, service discount may include percentage discounts, flat-rate discounts, buy-one-get-one-free offers, referral discounts, loyalty rewards, and the like. In some embodiments, service discount may be applied to a single service or a package of services. In some embodiments, service discount may be offered for a limited time or on an ongoing basis. In some embodiments, service discount may be generated as a function of obsolescence of components as described below. In a non-limiting example, processor 104 may generate service discount for users who has rejected obstacle resolution object 120 that includes components that are in obsolescence period. Then, furthermore, processor 104 may generate service discount for any users for obstacle resolution object 120 that includes components that are in obsolescence period. In an embodiment, obstacle datum handler may manually input service discount and provide service discount to a user. In some embodiments, processor 104 may generate service discount using a discount machine learning model. The discount machine learning model may be trained with discount training data. The discount machine learning model and the discount training data may be consistent with any machine learning model and training data in the entirety of this disclosure. In some embodiments, discount training data may correlate rejection for obstacle resolution object 120 to service discount. verify. Processor 104 may use any machine-learning process described in this disclosure for this or any other function. In some embodiments, discount training data may be received from one or more users, entity database 140, external computing devices, and/or previous iterations of processing. As a non-limiting example, the discount training data may include instructions from a user, who may be an expert user, a past user in embodiments disclosed herein, or the like, which may be stored in memory and/or stored in the entity database 140, where the instructions may include labeling of training examples. In some embodiments, processor 104 may determine service discount as a function of rejections and obstacle resolution object 120 or resolution object group, as which service discount may be a hard-coded value. In some embodiments, processor 104 may look up service discount using rejections and obstacle resolution object 120 or resolution object group in a lookup table. In other embodiments, processor 104 may determine service discount without any input from another system or device or looking up service discount in a lookup table or the entity database 140. As a non-limiting example, when rejection is 0, service discount may include a hard-coded value for the 0 rejection, such as but not limited to 0%. As a non-limiting example, when the number of rejection is 20 in resolution object group, service discount may include a hard-coded value for the 20 rejections, such as but not limited to 10%. In some embodiments, rejection resolution datum may include any promotional deal other than service account disclosed herein.

With continued reference to FIG. 1, in some embodiments, rejection resolution datum may further include an importance emphasis. For the purposes of this disclosure, an "importance emphasis" is the act of emphasizing the importance of executing an obstacle resolution object for entity. As a non-limiting example, importance emphasis may include additional information related to obstacle resolution object 120 that is rejected by a user. For example, and without limitation, importance emphasis may include additional information of importance of executing obstacle resolution object 120 that was rejected by a user; for instance, including safety hazard, or the like. For example, and without limitation, importance emphasis may include a cost comparison between a cost (i.e. fee of pro-resolution datum) of executing obstacle resolution object 120 and an estimated cost that a user might have to pay if the user decided not to execute obstacle resolution object 120; for instance, in case obstacle datum 144 or condition of entity gets worse due to not executing obstacle resolution object 120 on time. As a non-limiting example, in this case, obstacle resolution object 120 may include preventive maintenance of entity that might help avoid a costly repair in the future. In some embodiments, generating importance emphasis may include facilitating communication between obstacle datum handler and user. In some embodiments, importance emphasis may be determined manually by obstacle datum handler. In some embodiments, processor 104 may generate importance emphasis using a machine learning model that is trained with training data that correlates rejection of obstacle resolution object 120 to importance emphasis. In some embodiments, training data may be stored in entity database 140. In some embodiments, training data may be received from one or more users, entity database 140, external computing devices, and/or previous iterations of processing. As a non-limiting example, training data may include instructions from a user, who may be an expert user, a past user in embodiments disclosed herein, or the like, which may be stored in memory and/or stored in entity database 140, where the instructions may include labeling of training examples.

With continued reference to FIG. 1, in some embodiments, memory 108 may contain instructions configuring processor 104 to generate an alternate entity datum. For the purposes of this disclosure, an "alternate entity datum" is a data element that encompasses information or attributes pertaining to providing an alternate entity to a user. For the purposes of this disclosure, an "alternate entity" is an entity that can be used by a user instead of the user's entity while it is getting an obstacle resolution object executed. As a non-limiting example, alternate entity may be similar with a user's entity in execution of obstacle resolution object 120. For example, and without limitation, alternate entity may include similar efficacy, function or entity profile as user's entity. In some embodiments, alternate entity datum may be stored in entity database 140. In some embodiments, alternate entity datum may be retrieved from entity database 140.

With continued reference to FIG. 1, in some embodiments, processor 104 may generate alternate entity datum as a function of an alternate entity request datum. For the purposes of this disclosure, an "alternate entity request datum" is a data element that encompasses information pertaining to a user's desire to use alternate entity. As a non-limiting example, user may manually input alternate entity request datum using user interface in entity device 132. In a non-limiting example, when a user inputs an approval for obstacle resolution object 120 or obstacle resolution data structure 152, processor 104 may prompt if the user wants to use alternate entity while the user's entity is getting obstacle resolution object 120. In some embodiments, processor 104 may determine alternate entity for user as a function of entity profile of entity data 112, obstacle resolution object 120 and alternate entity list. For the purposes of this disclosure, "alternate entity list" is an inventory that includes information of alternate entities. As a non-limiting example, alternate entity list may include the number of alternate entities, entity profile of each alternate entities, availabilities of each alternate entities, or the like. For example, and without limitation, availabilities may include date and time that alternate entities can be used by a user. In some embodiments, alternate entity list may be stored in entity database 140. In some embodiments, alternate entity list may be retrieved from entity database 140. In some embodiments, alternate entity list may be updated in real-time as alternate entities in alternate entity list can be chosen for another users, which may affect availabilities of alternate entities in alternate entity list.

With continued reference to FIG. 1, in some embodiments, processor 104 may determine alternate entity for user when entity profile of entity data 112 and entity profile of an alternate entity in alternate entity list matches and when availabilities of the alternate entity and duration of obstacle resolution object 120 matches. For example, and without limitation, processor 104 may determine alternate entity when manufacturer and model version of alternate entity in alternate entity list matches with manufacturer and model version of user's entity. For example, and without limitation, processor 104 may determine alternate entity when the estimated duration of the execution of obstacle resolution object 120 is within availabilities of alternate entity. In some embodiments, processor 104 may determine alternate entity as a function of user preference, availabilities of alternate entity in alternate entity list and obstacle resolution object 120. As a non-limiting example, processor may determine alternate entity when the estimated duration of the execution of obstacle resolution object 120 is within user's preferred type of alternate entity in alternate entity list's availability.

With continued reference to FIG. 1, in some embodiments, obstacle datum handler may manually determine alternate entity for user. In some embodiments, user may manually determine alternate entity as their preference. In some embodiments, processor 104 may automatically determine alternate entity for user and generate alternate entity datum using a machine learning model that is trained with training data that correlates alternate entity list, entity profile and obstacle resolution object 120 to alternate entity datum. As a non-limiting example, training data may correlate entity profile in alternate entity list, availability in alternate entity list, estimated duration of obstacle resolution object 120 and entity profile of entity data 112 to alternate entity datum. Machine learning model disclosed herein may be consistent with any machine learning model described in this disclosure. In some embodiments, training data may be stored in entity database 140. In some embodiments, training data may be received from one or more users, entity database 140, external computing devices, and/or previous iterations of processing. As a non-limiting example, group training data may include instructions from a user, who may be an expert user, a past user in embodiments disclosed herein, or the like, which may be stored in memory and/or stored in entity database 140, where the instructions may include labeling of training examples. In some embodiments, processor 104 may determine alternate entity for user and generate alternate entity datum using a lookup table that correlates alternate entity list, entity profile and obstacle resolution object 120 to alternate entity datum. As a non-limiting example, lookup table may correlate entity profile in alternate entity list, availability in alternate entity list, estimated duration of obstacle resolution object 120 and entity profile of entity data 112 to alternate entity datum. Lookup table disclosed herein may be consistent with any lookup table described in this disclosure.

With continued reference to FIG. 1, in some embodiments, memory 108 may contain instructions configuring processor 104 to generate a transportation datum. For the purposes of this disclosure, a "transportation datum" is a data element that encompasses information or attributes pertaining to providing a transportation to a user. For the purposes of this disclosure, a "transportation" is a method to move a user from one location to another. As a non-limiting example, transportation may include bringing a user who left their entity to obstacle datum handler back to obstacle datum handler to pick up the entity. In some embodiments, processor 104 may generate transportation datum as the execution of obstacle resolution object 120 is done. In some embodiments, processor 104 may generate transportation datum by implementing a ride-sharing platforms. For the purposes of this disclosure, a "ride-sharing platform" is a software or service that facilitate connecting passengers in need of transportation with drivers who are willing to provide rides using their own vehicles. As a non-limiting example, ride-sharing platform may include APIs including UBER, LYFT, OLA, GRAB, or the like. In some embodiments, processor 104 may transmit information related to transportation datum to entity device 132; for instance, including driver information of transportation, estimated time of arrival, live tracking of route, or the like.

With continued reference to FIG. 1, in some embodiments, memory 108 may contain instructions configuring processor 104 to generate an entity alert. For the purposes of this disclosure, an "entity alert" is an indication to inform a user or obstacle datum handler related to an obstacle resolution data structure or related information. In some embodiments, processor 104 may provide entity alert to user or obstacle datum handler on entity device 132 or handler device 136. In some embodiments, entity alert may include audio, text, image, vibration, and the like. In some embodiments, entity alert may include a text message, email, notification sound, phone call, notification banner, application notification, or the like. In some embodiments, entity alert may be generated at specific time intervals and frequencies. interval. In some embodiments, entity alert may include a reminder. For the purposes of this disclosure, a "reminder" is a notification for prompting a user or obstacle datum handler to remember something. As a non-limiting example, reminder may include prompting user related to time slot designated for obstacle resolution object execution. As another non-limiting example, reminder may include prompting obstacle datum handler to review obstacle resolution data structure 152. As another non-limiting example, reminder may include prompting obstacle datum handler to contact user for a follow-up, reminder, or the like. In some embodiments, processor 104 may be configured to generate entity alert when obstacle datum 144, obstacle cause datum, obstacle resolution object 120, obstacle resolution data structure 152, handler timetable data structure, rejection resolution datum or alternate entity datum is generated or determined; for instance notifying user or obstacle datum hander about the generation or determination. In some embodiments, when execution of obstacle resolution object 120 for entity is done, processor 104 may generate entity alert to remind a user to pick up the entity or return alternate entity. In some embodiments, processor 104 may generate entity alert to remind a user related to transportation datum. In some embodiments, entity alert may inform user or obstacle datum handler to contact user or obstacle datum handler. In some embodiments, entity alert may inform user or obstacle datum handler that there is missing entity data 112. In some embodiments, entity alert may inform user that obstacle resolution object 120 is executed and entity is ready to be picked up by the user. In some embodiments, processor 104 may generate entity alert to notify obstacle datum handler information related to components required to execute obstacle resolution object 120 to prepare the components ahead. In some embodiments, processor 104 may generate entity alert to inform obstacle datum handler related to component availability including available status and/or unavailable status. In a non-limiting example, processor 104 may generate entity alert to notify obstacle datum handler to order components that is in unavailable status. In some embodiments, processor 104 may generate entity alert as a function of entity data 112. As a non-limiting example, processor 104 may generate entity alert to notify a user about information related to a service discount or any offer that is related to user's personal data or entity profile. As another non-limiting example, processor 104 may generate entity alert as a function of time since the last execution of obstacle resolution object 120 to remind a user to get another obstacle resolution object 120. As another non-limiting example, processor 104 may generate entity alert to notify a user that obstacle datum handler is looking for the user's entity to buy. In a non-limiting example, obstacle datum handler may manually generate entity alert using handler device 136. As another non-limiting example, processor 104 may generate entity alert to remind a user about obstacle resolution data structure 152, wherein the obstacle resolution data structure 152 includes preventative repair or replacement of obstacle resolution object 120. For example, and without limitation, entity alert may inform a user that their entity is likely to reach the end of their useful life in the upcoming months and prompt them to schedule an inspection. In some embodiments, processor 104 may generate entity alert to notify obstacle datum handler that components in inventory is about to obsolete as it reaches close to their lifecycle (i.e. phase-in period, phase-out period, or the like). In a non-limiting example, processor 104 may identify components in inventory that reaches the beginning of its obsolescence period. Then, processor 104 may generate entity alert for obstacle datum handler or processor 104 may generate entity alert that includes service discount for user who has entity that includes components that includes the same entity identifier. In some embodiments, processor 104 may generate entity alert when a user does not come to time slot designated for the user. As a non-limiting example, processor 104 may generate entity alert to remind a user about the missed time slot. As another non-limiting example, processor 104 may generate entity alert to remind a user to determine another time slot for execution of obstacle resolution object 120. In some embodiments, processor 104 may generate entity alert as a function of pro-resolution datum, wherein the pro-resolution datum includes a note from obstacle datum handler related to a process of execution of obstacle resolution object 120. For example, and without limitation, processor 104 may generate entity alert for user in real-time or near real-time to notify which step of obstacle resolution object 120 an obstacle datum handler is executing for the user's entity. In a non-limiting example, entity alert may include obstacle datum handler starting execution of obstacle resolution object 120, the finalization of the components used for execution of obstacle resolution object 120, the arrival of ordered components, and the completion of the execution of obstacle resolution object 120. In some embodiments, entity alert may include importance emphasis. As a non-limiting example, processor 104 may generate entity alert that includes explanation of the benefits and importance of rejected obstacle resolution object 120 or relevant information such as the potential consequences of ignoring the issue and transmit to entity device 132. In some embodiments, processor 104 may generate entity alert as a function of resolution urgency datum. As a non-limiting example, processor 104 may generate entity alert at more frequent time interval when resolution urgency datum includes high urgency; while processor 104 may generate entity alert at less frequent time interval when resolution urgency datum includes low urgency. In some embodiments, user may manually determine time intervals and frequency of entity alert generation using entity device 132. In some embodiments, entity alert may be stored in entity database 140. In some embodiments, entity alert may be retrieved from entity database 140.

With continued reference to FIG. 1, in some embodiments, apparatus 100 may include a scanning device. For the purposes of this disclosure, a "scanning device" is a device for scanning a user identifier. For the purposes of this disclosure, a "user identifier" is a unique identifier that is unique for a user among others. In some embodiments, user identifier may be consistent with entity identifier. In some embodiments, when user identifier is scanned using a scanning device, entity data 112 including personal data, entity profile, or the like may be retrieved and the retrieved entity data 112 may be transmitted to processor 104. In some embodiments, data collection module may include scanning device. In some embodiments, scanning device may include an illumination system, at least a sensor 124, and a decoder. Sensor 124 in the scanning device may detect the reflected light from the illumination system and may generate an analog signal that is sent to the decoder. The decoder may interpret that signal, validate the unique identifier using the check digit, and convert it into text. This converted text may be delivered by the scanning device to a computing device holding a database of any information of a load. As a non-limiting example, the scanning device may include a pen-type reader, laser scanner, camera-based reader, CCD reader, omni-directional barcode scanner, and the like. For example without limitation, the scanning device may include a mobile device with an inbuild camera such as without limitation, a phone, a tablet, a laptop, and the like. In some embodiments, the scanning device may include wired or wireless communication. In some embodiments, scanning device may include a touch screen that can receive user input of manually inputting user identifier.

With continued reference to FIG. 1, in some embodiments, a scanning device may include a radio frequency identification (RFID) reader. For the purposes of this disclosure, a "radio frequency identification reader" is a device that emits radio waves and receives data transmitted by an RFID tag. In some embodiments, the RFID reader may be connected to a computer device or processor 104 that can process the data received from the RFID tag. For the purposes of this disclosure, "radio frequency identification tag" is a small electronic device that contains a unique code and can be attached to or embedded in an object or person. The unique code disclosed herein is further described below. The RFID tag may also be referred as an RFID transponder. In some embodiments, the RFID tag may include a passive RFID tag or active RFID tag. For the purposes of this disclosure, a "passive RFID tag" is an RFID tag that does not have its own power source and relies on the energy from an RFID reader to transmit its data. For the purposes of this disclosure, an "active RFID tag" is an RFID tag that has its own power source and can transmit its data without relying on an RFID reader's energy. In some embodiments, the RFID tag may be implemented on a vehicle. In some embodiments, the RFID tag may be implemented on entity device 132 as described below. When an RFID tag comes into the range of the RFID reader, the RIFD tag may receive the radio waves emitted by the RFID reader and may use the energy from the waves to transmit its unique code back to the RFID reader. The RFID reader then may capture the unique code and may send it to the computer device and/or processor 104, which can use it for various purposes such as tracking maintenance process, monitoring the movement of entity or user, verifying the identity of users and/or entity, or the like. For example and without limitation, a vehicle may have the RFID transponder on a bumper of vehicle, which can transmit data, such as but not limited to user identifier, to the RFID reader on a gate of a space when vehicle is close enough to the RFID reader, in other words, when vehicle arrives in front of the gate of space.

With continued reference to FIG. 1, in some embodiments, processor 104 may authenticate user or obstacle datum handler using an authentication module. Authentication module may include any suitable software and/or hardware as described in the entirety of this disclosure. Authentication module may include a login portal for user or obstacle datum handler to submit authentication credentials. In some embodiments, authentication credential may be consistent with user identifier. Authentication module and/or processor 104 may be configured to receive the authentication credential associated with user or obstacle datum handler from entity device 132 or handler device 136, compare the authentication credential to an authorized authentication credential stored within an authentication database, and bypass authentication for entity device 132 and/or handler device 136 based on the comparison of the authentication credential from entity device 132 and/or handler device 136 to the authorized authentication credential stored within the entity database. In some embodiments, processor 104 may receive authentication credential from scanning device. A "authentication credential" as described in the entirety of this disclosure, is a datum representing an identity, attribute, code, and/or characteristic specific to a user or obstacle datum handler and/or entity device and/or handler device. For example, and without limitation, the authentication credential may include a username and password unique to user or obstacle datum handler and/or entity device 132 or handler device 136. The username and password may include any alpha-numeric character, letter case, and/or special character. As a further example and without limitation, the authentication credential may include a digital certificate, such as a public key infrastructure (PKI) certificate.

With continued reference to FIG. 1, in a non-limiting embodiment, authentication module may manipulate any information of the entirety of this disclosure to be displayed to a user with varying authority or accessibility as described above. Authentication module may incorporate priority classifiers used to classify low, average, and high classification of authorized user or obstacle datum handler. User or obstacle datum handler with lower priority classifications detected by authentication module may allow a limited amount of information (limited accessibility) to be displayed to entity device 132 or handler device 136 for viewing by the user or obstacle datum handler with lower priority classification. In a non-limiting embodiment, authentication module may detect user or obstacle datum handler with high priority classifications and transmit a robust information with full accessibility. Persons of ordinary skill in the art, after viewing the entirety of this disclosure, would appreciate the various amount of information allowed to be viewed for different levels of authority. In a non-limiting embodiment, authentication module may be used as a security measure for information. A person of ordinary skill in the art, after viewing the entirety of this disclosure, would appreciate the function of an authentication module in the context of secure data exchange.

With continued reference to FIG. 1, in some embodiments, processor 104 may be configured to encrypt and decrypt entity data 112. Processor 104 may include an implementation of one or more aspect of a cryptographic system. In a non-limiting example, processor 104 may encrypt entity data 112 to protect sensitive information from unauthorized access and ensure data privacy. In a non-limiting example, processor 104 may decrypt encrypted entity data during any processing step described in this disclosure. In a non-limiting example, processor 104 may use a secret key to convert plaintext entity data into ciphertext, wherein the same secret key may also be used to decrypt the ciphertext back into plaintext. In some cases, secret key may include a public key, a private key, and/or any mathematically related keys. Other exemplary embodiments of encrypting and decrypting entity data may include one or more utilization of hash functions, SSL/TLS encryptions, and/or the like. In another non-limiting example, encrypted entity data may be retrieved from the data store described above, or otherwise from an immutable sequential listing. In some cases, entity data may be located and extracted from the block chain in an encoded format. Computing device may be configured to decode such entity data from its specific format such as using cryptographic keys or algorithms.

With continued reference to FIG. 1, in some embodiments, apparatus 100 may utilize a fuzzy logic system and/or fuzzy logic comparison to determine resolution urgency datum. Apparatus 100 may compare one or more elements of obstacle datum 144 to resolution urgency datum. For instance and without limitation, apparatus 100 may, using fuzzy logic, determine an output of "high urgency." Fuzzy logic may be as described below with reference to FIG. 10.

With continued reference to FIG. 1, in some embodiments, apparatus 100 may utilize an immutable sequential listing to store, verify, and/or process data. Apparatus 100 may store entity data 112, obstacle resolution data structure 152, and/or other data in an immutable sequential listing. Apparatus 100 may generate a smart contract between two or more parties. A smart contract may be generated for a transaction of one or more real estate properties. An immutable sequential listing may be, include and/or implement an immutable ledger, where data entries that have been posted to the immutable sequential listing cannot be altered. Immutable sequential listings and smart contracts may be as described below with reference to FIG. 9.

Figure 2A:
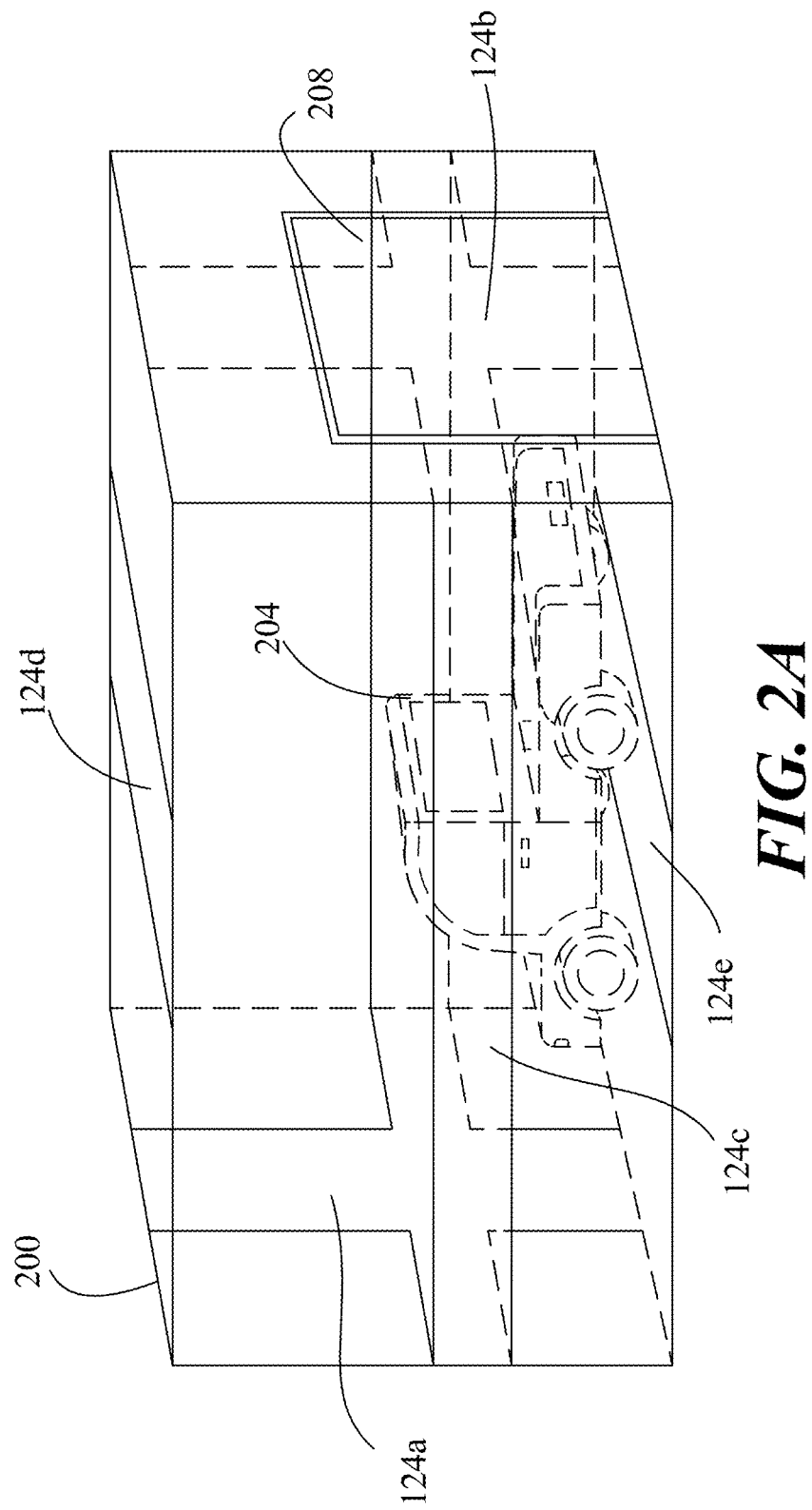
FIGS. 2A-B illustrate an exemplary embodiment of a space for data aggregation and analysis.
Figure 2B:
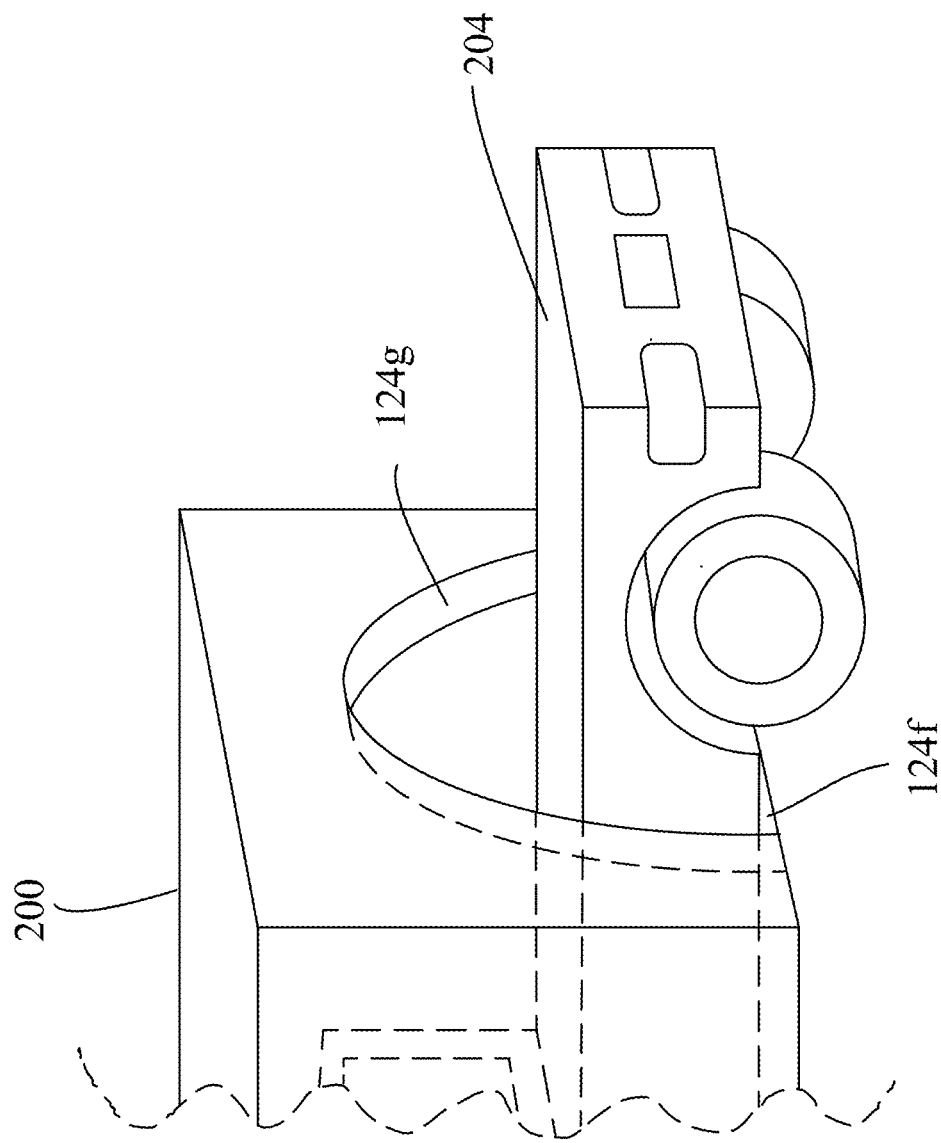

Referring now to FIG. 2A-B, illustrations of exemplary embodiments of a space 200 for vehicle profiling are shown. In some embodiments, space 200 may include a dealership, service center, repair center, and any facility thereof for executing obstacle resolution object 120. In some embodiments, space 200 may include entity. As a non-limiting example, entity may include a vehicle 204 as illustrated in FIGS. 2A and 2B. In some embodiments, vehicle 204 may include any types of car, truck, bus, motorcycle, bicycle, watercraft, aircraft, and the like. In some embodiments, space 200 may include an entrance 208. For the purposes of this disclosure, an "entrance" is an opening that allows access to a place. As a non-limiting example, entrance 208 may include a door as shown in FIG. 2A. For example and without limitation, the door may include a sliding door, roll-up door, and the like. As another non-limiting example, the entrance 208 may not include any door as shown in FIG. 2B. In some embodiments, space 200 may include at least a sensor 124a-g. As shown in FIG. 2A, in some embodiments, space 200 may include sensor 124a-d on each sides of walls of space 200. In a non-limiting example, space 200 may include sensor 124a-g attached to a rail that can move back and forth to obtain sensor data; for instance, image data. In another non-limiting example, space 200 may include sensor 124a-g that cover at least a portion of each wall of space 200. In some embodiments, space 200 may include sensor 124e on the entrance 208. As a non-limiting example, sensor 124a may be in front of entity. As another non-limiting example, sensor 124b may be behind entity. As another non-limiting example, sensor 124c may be on a side of entity. As another non-limiting example, sensor 124d may be on top of entity. As another non-limiting example, sensor 124e may be below entity. This is so, that sensor 124a-d may detect sensor data of entity data 112 as entity is in space 200. In some embodiments, sensor 124f-g may be at entrance 208 of space 200 as illustrated in FIG. 2B. As a non-limiting example, sensor 124f-g may be on left, right, top, bottom of the entrance 208. This is so, that sensor 124f-g may detect sensor data of entity data 112 as entity such as but not limited to vehicle 204 moves into and/or moves out of space 200.

Figure 3:
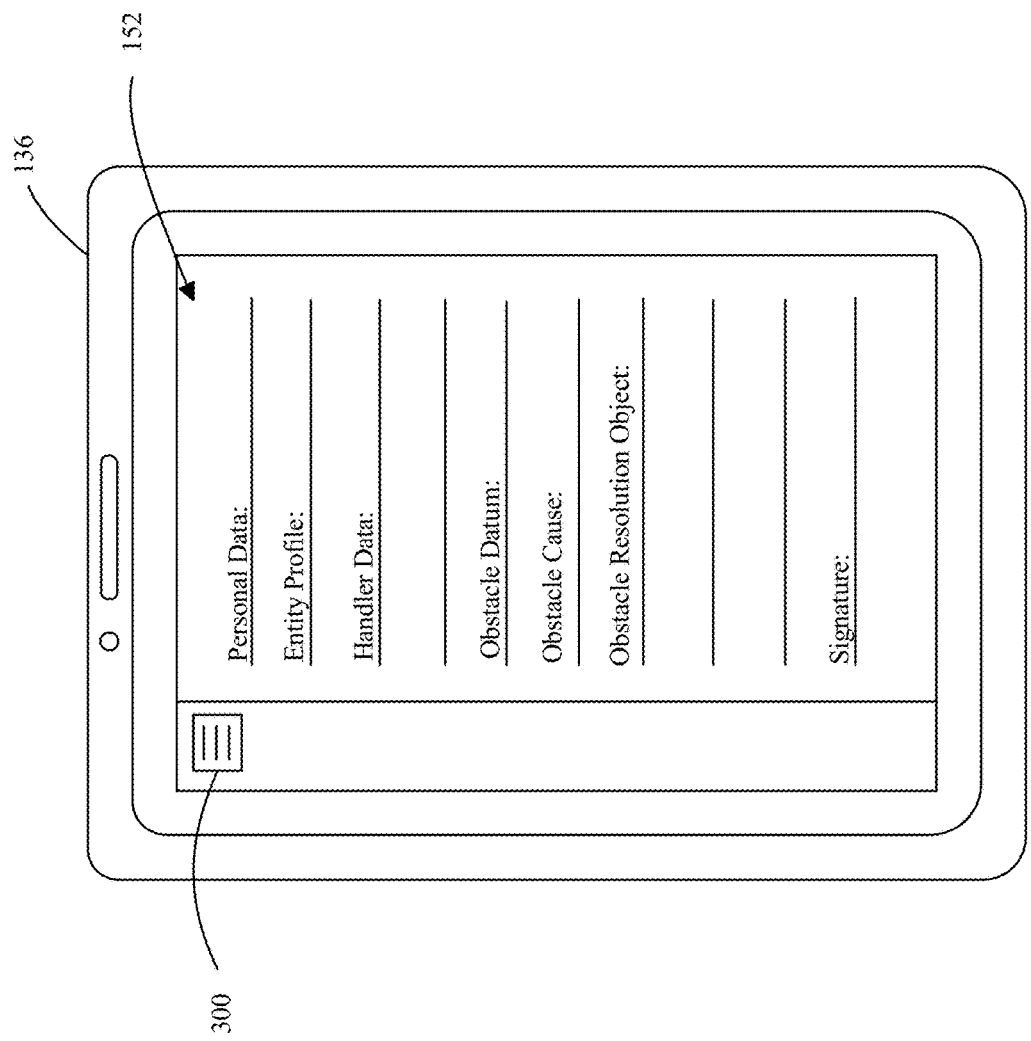
FIG. 3 illustrates an exemplary obstacle resolution data structure.

Referring now to FIG. 3, an exemplary obstacle resolution data structure 152 displayed on handler device 136 is illustrated. In some embodiments, processor 104 may transmit entity data 112, obstacle datum 144, obstacle cause datum, obstacle group 116, obstacle resolution object 120, obstacle resolution data structure 152, handler timetable data structure, pro-resolution datum, user entity maneuver datum, rejection resolution datum, alternate entity datum, transportation datum, entity alert, obstacle resolution template 148, data structure template 156, or any related data as described above with respect to FIG. 1 to entity device 132 or handler device 136 and display them using user interface. As a non-limiting example, entity device 132 or handler device 136 may include any laptops, tablets, mobile phones, smart phones, smart watches, desktop computers, kiosks, touch screens, or the like. In some embodiments, processor 104 may interact with user or obstacle datum handler using entity device 132 or handler device 136 using user interface. In some embodiments, user interface may include a menu bar 300. Menu bar 300 may include a list of choices (i.e. menu) and may allow users or obstacle datum handlers to select one from them. Menu may be displayed horizontally across the screen such as pull-down menu. When any option is clicked in menu bar 300, then the pull-down menu may appear. Menu may include a context menu that appears only when user or obstacle datum handler performs a specific action. An example of this is pressing the right mouse button. When this is done, a menu may appear under the cursor. As a non-limiting example, processor 104 may receive user input or obstacle datum handler input from entity device 132 or handler device 136. In some embodiments, obstacle resolution data structure 152 may include entity data 112, obstacle datum 144, obstacle cause datum, obstacle group 116, obstacle resolution object 120, obstacle resolution data structure 152, handler timetable data structure, pro-resolution datum, user entity maneuver datum, rejection resolution datum, alternate entity datum, transportation datum, entity alert, obstacle resolution template 148, data structure template 156, or any related data as described above with respect to FIG. 1.

Figure 4:
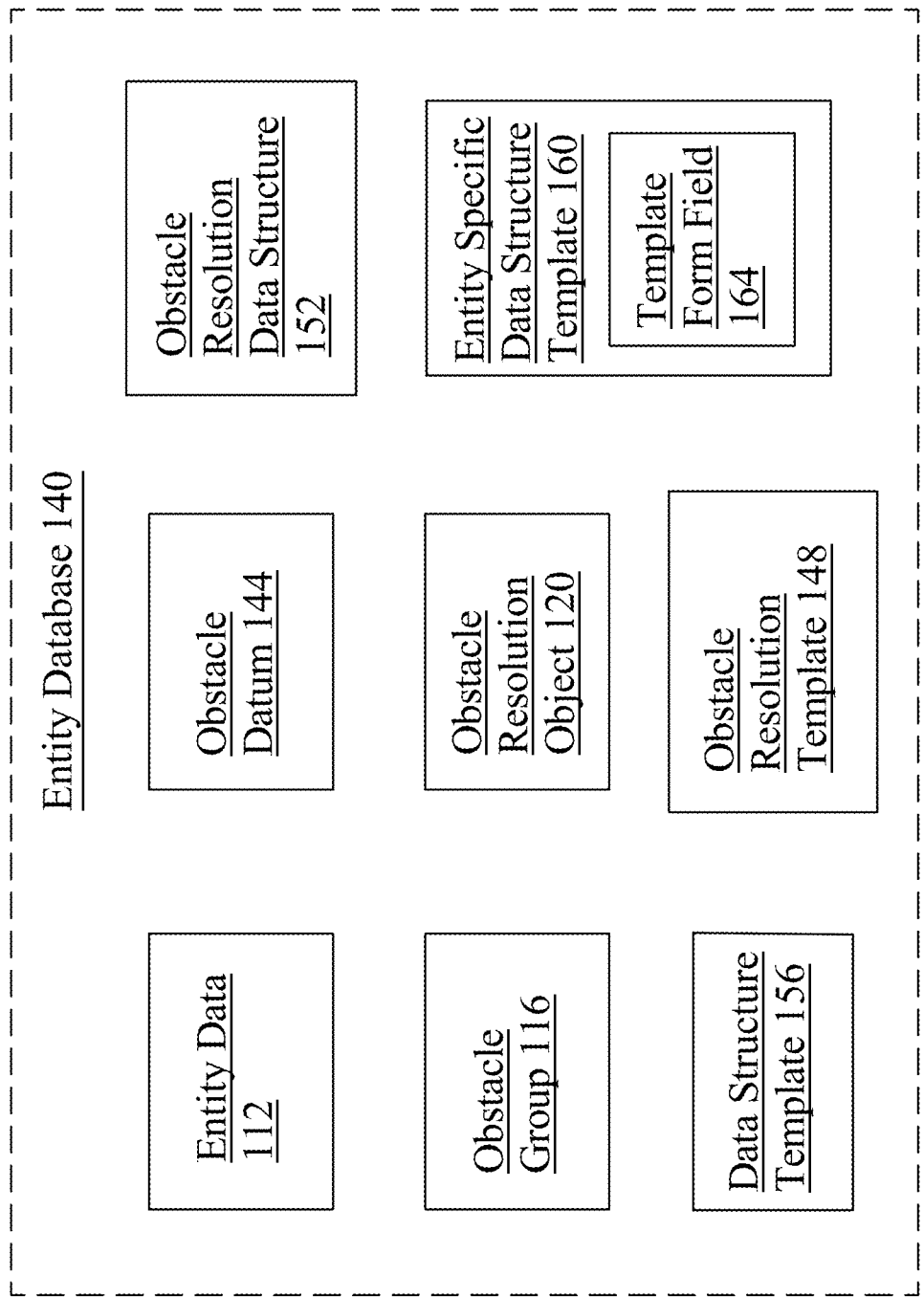
FIG. 4 illustrates a block diagram of an exemplary entity database.

Referring now to FIG. 4, a block diagram of an exemplary entity database 140 is illustrated. In some embodiments, entity database 140 is further described in detail with respect to FIG. 1. In some embodiments, entity database 140 may include entity data 112 and related data. As a non-limiting example, entity database 140 may include obstacle datum 144, obstacle cause datum, personal data, entity profile, sensor data, image data, motion data, user preference, user entity maneuver datum, or the like. As another non-limiting example, entity database 140 may include any data from data collection module 128. For example, and without limitation, entity database 140 may include data from sensor 124, including motion sensor, camera, or the like, entity device 132, handler device 136, chatbot, digital communication, ASR, language processing module, OCR, query, or the like. As another non-limiting example, entity database 140 may include data related to obstacle datum 144 including data from machine vision system, image training data, user input, obstacle datum handler input, chatbot, ASR, digital communication, language processing module, any training data, or the like. As another non-limiting example, entity database 140 may include data related to obstacle cause datum including cause training data, any training data, chatbot, ASR, digital communication, language processing module, user input, obstacle handler input, any training data, or the like.

With continued reference to FIG. 4, in some embodiments, entity database 140 may include obstacle group 116 and related data. As a non-limiting example, entity database 140 may include obstacle training data, any training data, or the like.

With continued reference to FIG. 4, in some embodiments, entity database 140 may include obstacle resolution object 120 and related data. As a non-limiting example, entity database 140 may include pro-resolution datum, obstacle resolution template 148, alternative list, alternative solution, or the like. As another non-limiting example, entity database 140 may include data from language processing module, obstacle datum handler input, resolution training data, Monte Carlo Simulation, any training data, or the like.

With continued reference to FIG. 4, in some embodiments, entity database 140 may include obstacle resolution data structure 152 and related data. As a non-limiting example, entity database 140 may include obstacle image sequence, handler timetable data structure, data structure template 156, entity specific data structure template 160, entity specific template training data, template form field 164, form field training data, timetable training data, rejection resolution datum, alternate entity datum, transportation datum, entity alert, or the like. As another non-limiting example, entity database 140 may include data from obstacle datum handler input, user input, automatic template form field creation system, web crawler, any training data, or the like.

Figure 5:
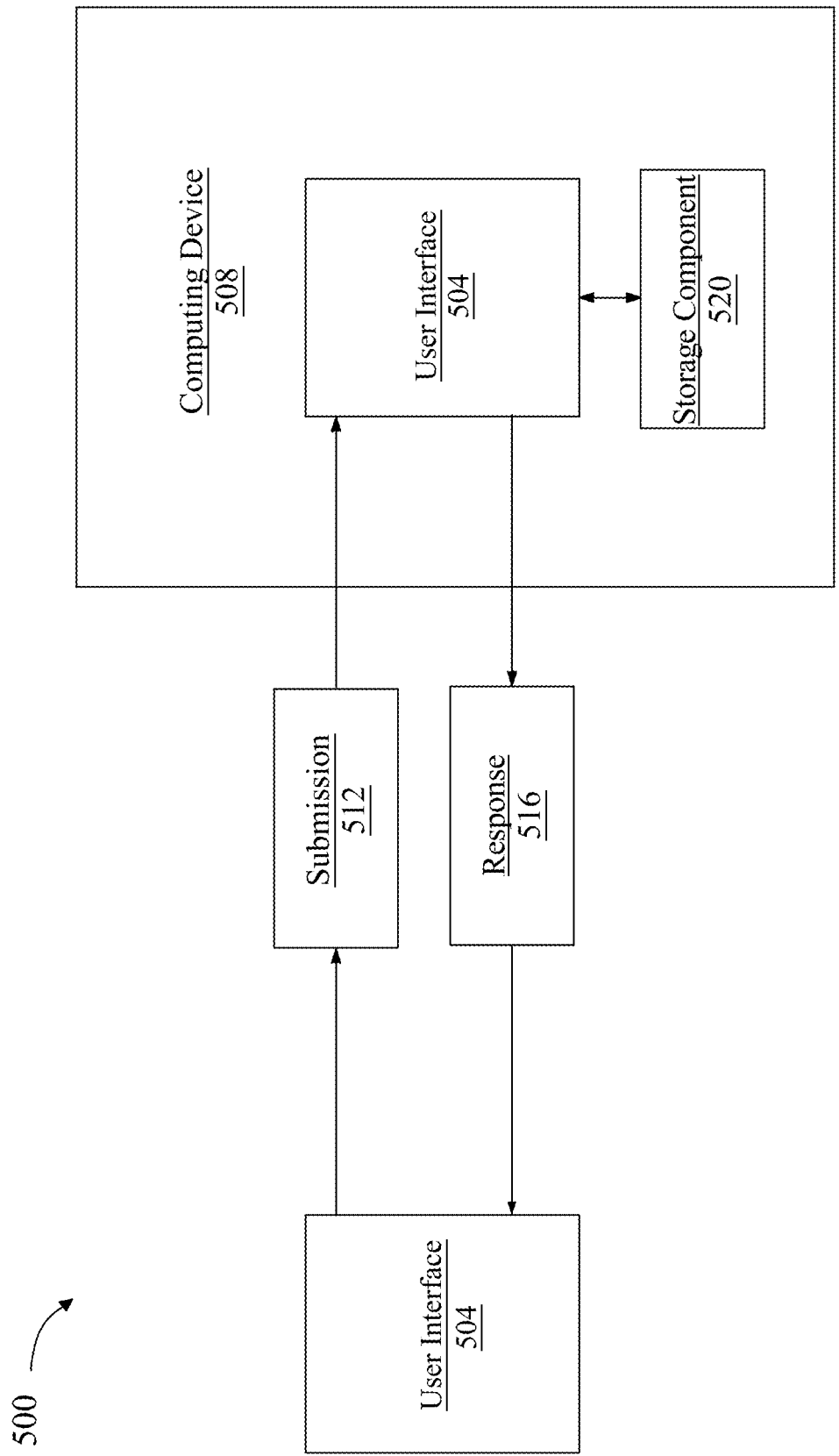
FIG. 5 illustrates a systemic diagram of an exemplary chatbot system.

Referring to FIG. 5, a chatbot system 500 is schematically illustrated. According to some embodiments, a user interface 504 may be communicative with a computing device 508 that is configured to operate a chatbot. In some cases, user interface 504 may be local to computing device 508. Alternatively or additionally, in some cases, user interface 504 may remote to computing device 508 and communicative with the computing device 508, by way of one or more networks, such as without limitation the internet. Alternatively or additionally, user interface 504 may communicate with user device 508 using telephonic devices and networks, such as without limitation fax machines, short message service (SMS), or multimedia message service (MMS). Commonly, user interface 504 communicates with computing device 508 using text-based communication, for example without limitation using a character encoding protocol, such as American Standard for Information Interchange (ASCII). Typically, a user interface 504 conversationally interfaces a chatbot, by way of at least a submission 512, from the user interface 508 to the chatbot, and a response 516, from the chatbot to the user interface 504. In many cases, one or both submission 512 and response 516 are text-based communication. Alternatively or additionally, in some cases, one or both of submission 512 and response 516 are audio-based communication.

Continuing in reference to FIG. 5, a submission 512 once received by computing device 508 operating a chatbot, may be processed by a processor. In some embodiments, processor processes a submission 512 using one or more keyword recognition, pattern matching, and natural language processing. In some embodiments, processor employs real-time learning with evolutionary algorithms. In some cases, processor may retrieve a pre-prepared response from at least a storage component 520, based upon submission 512. Alternatively or additionally, in some embodiments, processor communicates a response 516 without first receiving a submission 512, thereby initiating conversation. In some cases, processor communicates an inquiry to user interface 504; and the processor is configured to process an answer to the inquiry in a following submission 512 from the user interface 504. In some cases, an answer to an inquiry present within a submission 512 from a user device 504 may be used by computing device 508 as an input to another function.

With continued reference to FIG. 5, A chatbot may be configured to provide a user with a plurality of options as an input into the chatbot. Chatbot entries may include multiple choice, short answer response, true or false responses, and the like. A user may decide on what type of chatbot entries are appropriate. In some embodiments, the chatbot may be configured to allow the user to input a freeform response into the chatbot. The chatbot may then use a decision tree, database, or other data structure to respond to the users entry into the chatbot as a function of a chatbot input. As used in the current disclosure, "Chatbot input" is any response that a user or obstacle datum handler inputs in to a chatbot as a response to a prompt or question.

With continuing reference to FIG. 5, computing device 508 may be configured to the respond to a chatbot input using a decision tree. A "decision tree," as used in this disclosure, is a data structure that represents and combines one or more determinations or other computations based on and/or concerning data provided thereto, as well as earlier such determinations or calculations, as nodes of a tree data structure where inputs of some nodes are connected to outputs of others. Decision tree may have at least a root node, or node that receives data input to the decision tree, corresponding to at least a user or obstacle datum handler input into a chatbot. Decision tree has at least a terminal node, which may alternatively or additionally be referred to herein as a "leaf node," corresponding to at least an exit indication; in other words, decision and/or determinations produced by decision tree may be output at the at least a terminal node. Decision tree may include one or more internal nodes, defined as nodes connecting outputs of root nodes to inputs of terminal nodes. Computing device 508 may generate two or more decision trees, which may overlap; for instance, a root node of one tree may connect to and/or receive output from one or more terminal nodes of another tree, intermediate nodes of one tree may be shared with another tree, or the like.

With continued reference to FIG. 5, computing device 508 may build decision tree by following relational identification; for example, relational indication may specify that a first rule module receives an input from at least a second rule module and generates an output to at least a third rule module, and so forth, which may indicate to computing device 508 an in which such rule modules will be placed in decision tree. Building decision tree may include recursively performing mapping of execution results output by one tree and/or subtree to root nodes of another tree and/or subtree, for instance by using such execution results as execution parameters of a subtree. In this manner, computing device 508 may generate connections and/or combinations of one or more trees to one another to define overlaps and/or combinations into larger trees and/or combinations thereof. Such connections and/or combinations may be displayed by visual interface to user, for instance in first view, to enable viewing, editing, selection, and/or deletion by user; connections and/or combinations generated thereby may be highlighted, for instance using a different color, a label, and/or other form of emphasis aiding in identification by a user. In some embodiments, subtrees, previously constructed trees, and/or entire data structures may be represented and/or converted to rule modules, with graphical models representing them, and which may then be used in further iterations or steps of generation of decision tree and/or data structure. Alternatively or additionally subtrees, previously constructed trees, and/or entire data structures may be converted to APIs to interface with further iterations or steps of methods as described in this disclosure. As a further example, such subtrees, previously constructed trees, and/or entire data structures may become remote resources to which further iterations or steps of data structures and/or decision trees may transmit data and from which further iterations or steps of generation of data structure receive data, for instance as part of a decision in a given decision tree node.

Continuing to refer to FIG. 5, decision tree may incorporate one or more manually entered or otherwise provided decision criteria. Decision tree may incorporate one or more decision criteria using an application programmer interface (API). Decision tree may establish a link to a remote decision module, device, system, or the like. Decision tree may perform one or more database lookups and/or look-up table lookups. Decision tree may include at least a decision calculation module, which may be imported via an API, by incorporation of a program module in source code, executable, or other form, and/or linked to a given node by establishing a communication interface with one or more exterior processes, programs, systems, remote devices, or the like; for instance, where a user operating system has a previously existent calculation and/or decision engine configured to make a decision corresponding to a given node, for instance and without limitation using one or more elements of domain knowledge, by receiving an input and producing an output representing a decision, a node may be configured to provide data to the input and receive the output representing the decision, based upon which the node may perform its decision.

Figure 6:
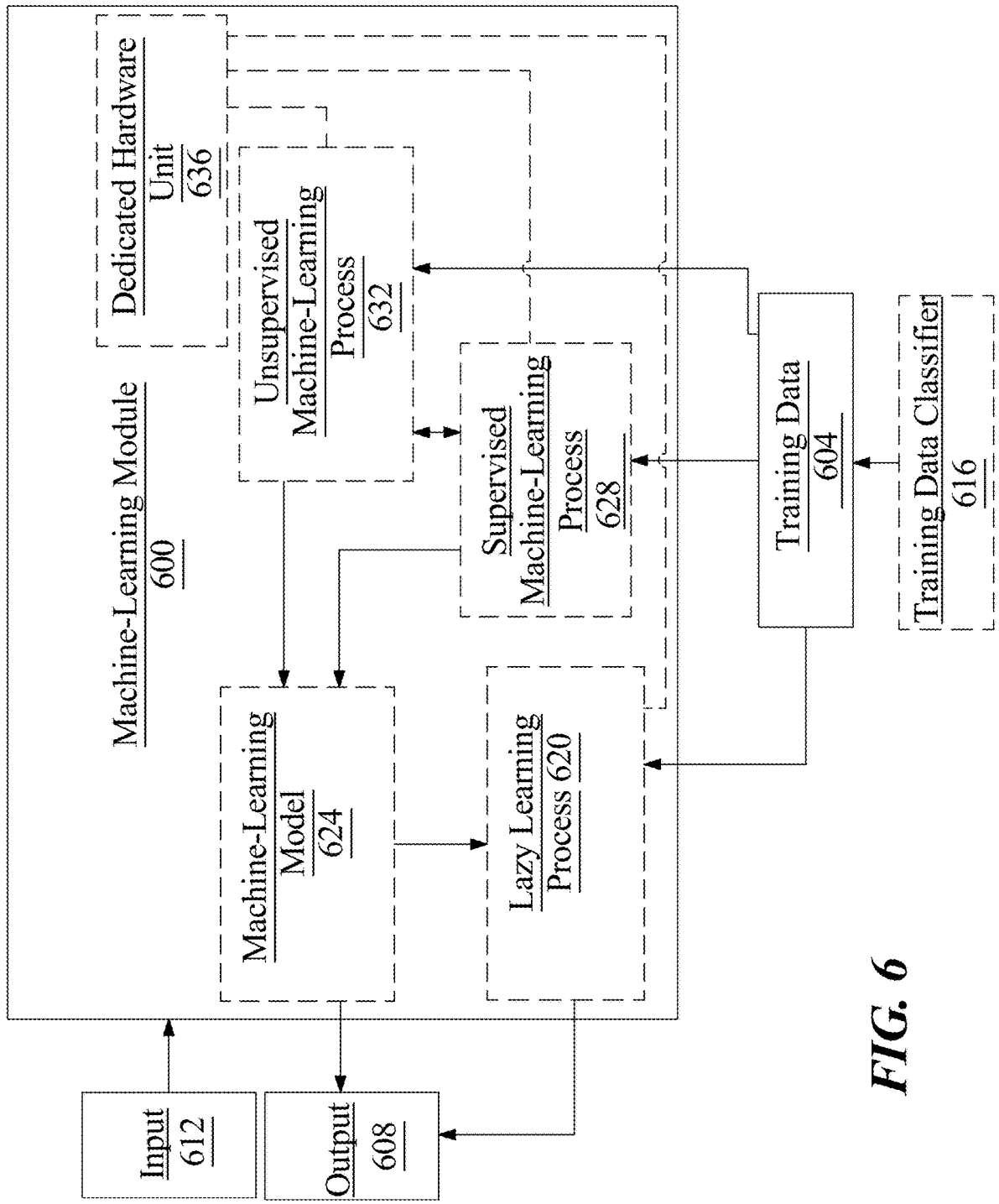
FIG. 6 illustrates a block diagram of exemplary embodiment of a machine learning module.

Referring now to FIG. 6, an exemplary embodiment of a machine-learning module 600 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 604 to generate an algorithm instantiated in hardware or software logic, data structures, and/or functions that will be performed by a computing device/module to produce outputs 608 given data provided as inputs 612; this is in contrast to a non-machine learning software program where the commands to be executed are determined in advance by a user and written in a programming language.

With continued reference to FIG. 6, "training data," as used herein, is data containing correlations that a machine-learning process may use to model relationships between two or more categories of data elements. For instance, and without limitation, training data 604 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 604 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 604 according to various correlations; correlations may indicate causative and/or predictive links between categories of data elements, which may be modeled as relationships such as mathematical relationships by machine-learning processes as described in further detail below. Training data 604 may be formatted and/or organized by categories of data elements, for instance by associating data elements with one or more descriptors corresponding to categories of data elements. As a non-limiting example, training data 604 may include data entered in standardized forms by persons or processes, such that entry of a given data element in a given field in a form may be mapped to one or more descriptors of categories. Elements in training data 604 may be linked to descriptors of categories by tags, tokens, or other data elements; for instance, and without limitation, training data 604 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 6, training data 604 may include one or more elements that are not categorized; that is, training data 604 may not be formatted or contain descriptors for some elements of data. Machine-learning algorithms and/or other processes may sort training data 604 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 604 to be made applicable for two or more distinct machine-learning algorithms as described in further detail below. Training data 604 used by machine-learning module 600 may correlate any input data as described in this disclosure to any output data as described in this disclosure. As a non-limiting illustrative example, inputs may include entity data 112, obstacle datum 144, obstacle group 116, obstacle resolution object 120, obstacle resolution template 148, data structure template 156, user entity maneuver datum, obstacle cause datum, pro-resolution datum, or the like. As a non-limiting example, outputs may include obstacle resolution object 120, obstacle resolution data structure 152, or the like.

Further referring to FIG. 6, training data may be filtered, sorted, and/or selected using one or more supervised and/or unsupervised machine-learning processes and/or models as described in further detail below; such models may include without limitation a training data classifier 616. Training data classifier 616 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 600 may generate a classifier using a classification algorithm, defined as a processes whereby a computing device and/or any module and/or component operating thereon derives a classifier from training data 604. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 616 may classify elements of training data to different types of entity. For example, and without limitation, training data classifier 616 may classify elements of training data to different model, manufacture, body type, color, coating, model version, model year, country of manufacturer, fuel type, engine, size of entity, current mileage, time since the last execution of obstacle resolution object 120, history of executions of obstacle resolution object 120, or the like.

With further reference to FIG. 6, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

With continued reference to FIG. 6, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may be identified as having poor quality data, where "poor quality" is defined as having a signal to noise ratio below a threshold value.

As a non-limiting example, and with further reference to FIG. 6, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 6, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 6, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Anti-aliasing and/or anti-imaging filters, and/or low-pass filters, may be used to clean up side-effects of compression.

With continued reference to FIG. 6, machine-learning module 600 may be configured to perform a lazy-learning process 620 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 604. Heuristic may include selecting some number of highest-ranking associations and/or training data 604 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 6, machine-learning processes as described in this disclosure may be used to generate machine-learning models 624. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 624 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 624 may be generated by creating an artificial neural network, such as a convolutional neural network comprising an input layer of nodes, one or more intermediate layers, and an output layer of nodes. Connections between nodes may be created via the process of "training" the network, in which elements from a training data 604 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

With continued reference to FIG. 6, machine-learning algorithms may include at least a supervised machine-learning process 628. At least a supervised machine-learning process 628, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include entity data 112, obstacle datum 144, and the like as described above as inputs, obstacle resolution object 120, and the like as outputs as described above, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 604. Persons skilled in the art, upon reviewing the entirety of this disclosure, will be aware of various possible variations of at least a supervised machine-learning process 628 that may be used to determine relation between inputs and outputs. Supervised machine-learning processes may include classification algorithms as defined above.

With further reference to FIG. 6, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms.

Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

With continued reference to FIG. 6, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 6, machine learning processes may include at least an unsupervised machine-learning processes 632. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

With continued reference to FIG. 6, machine-learning module 600 may be designed and configured to create a machine-learning model 624 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 6, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

With continued reference to FIG. 6, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including two complements or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 6, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

With continued reference to FIG. 6, retraining and/or additional training may be performed using any process for training described above, using any currently or previously deployed version of a machine-learning model and/or algorithm as a starting point. Training data for retraining may be collected, preconditioned, sorted, classified, sanitized or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 6, one or more processes or algorithms described above may be performed by at least a dedicated hardware unit 632. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model. A dedicated hardware unit 632 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 632 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 632 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 7:
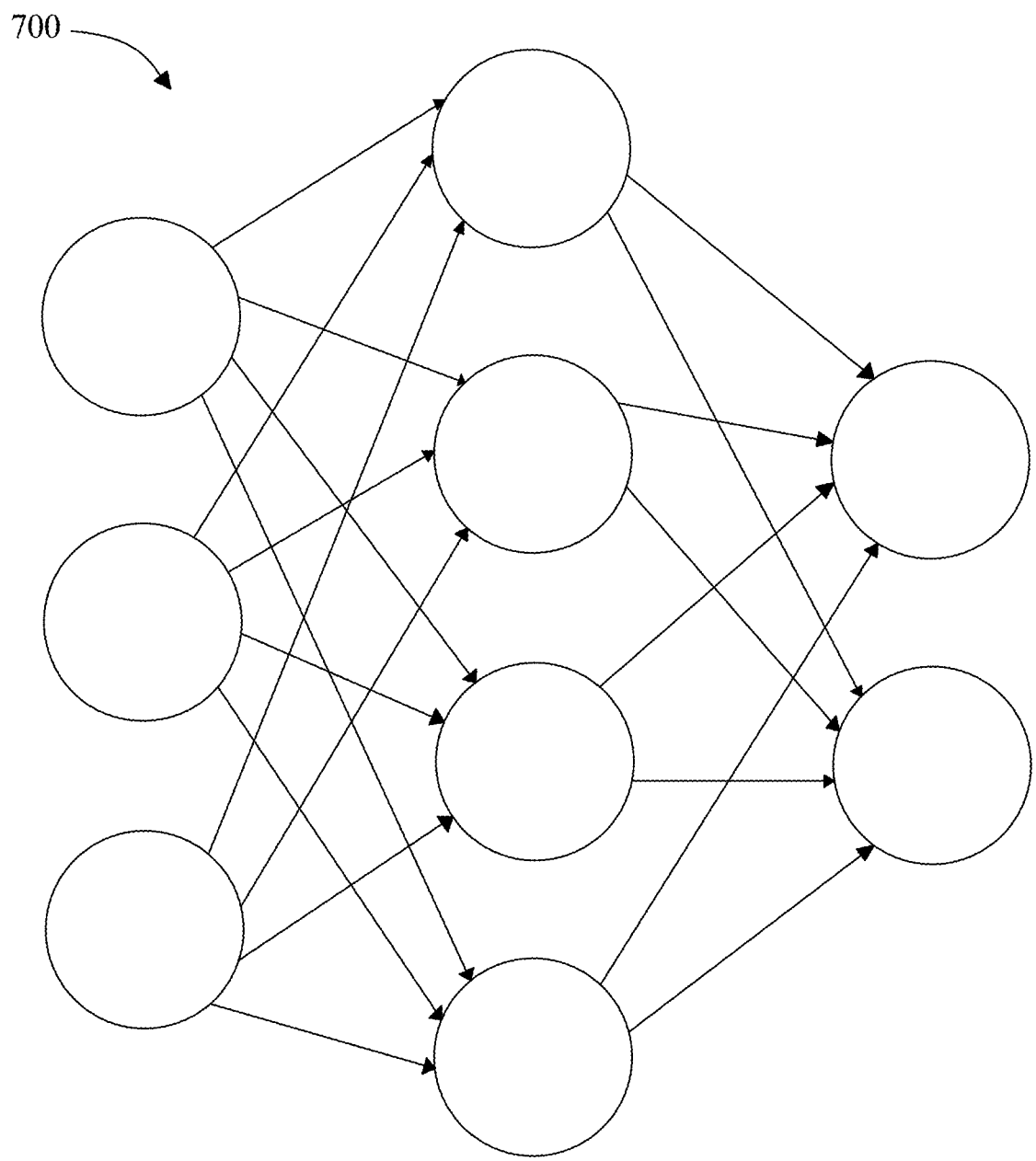
FIG. 7 illustrates a diagram of an exemplary nodal network.

Referring now to FIG. 7, an exemplary embodiment of neural network 700 is illustrated. A neural network 700 also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 704, one or more intermediate layers 708, and an output layer of nodes 712. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network, or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 8:
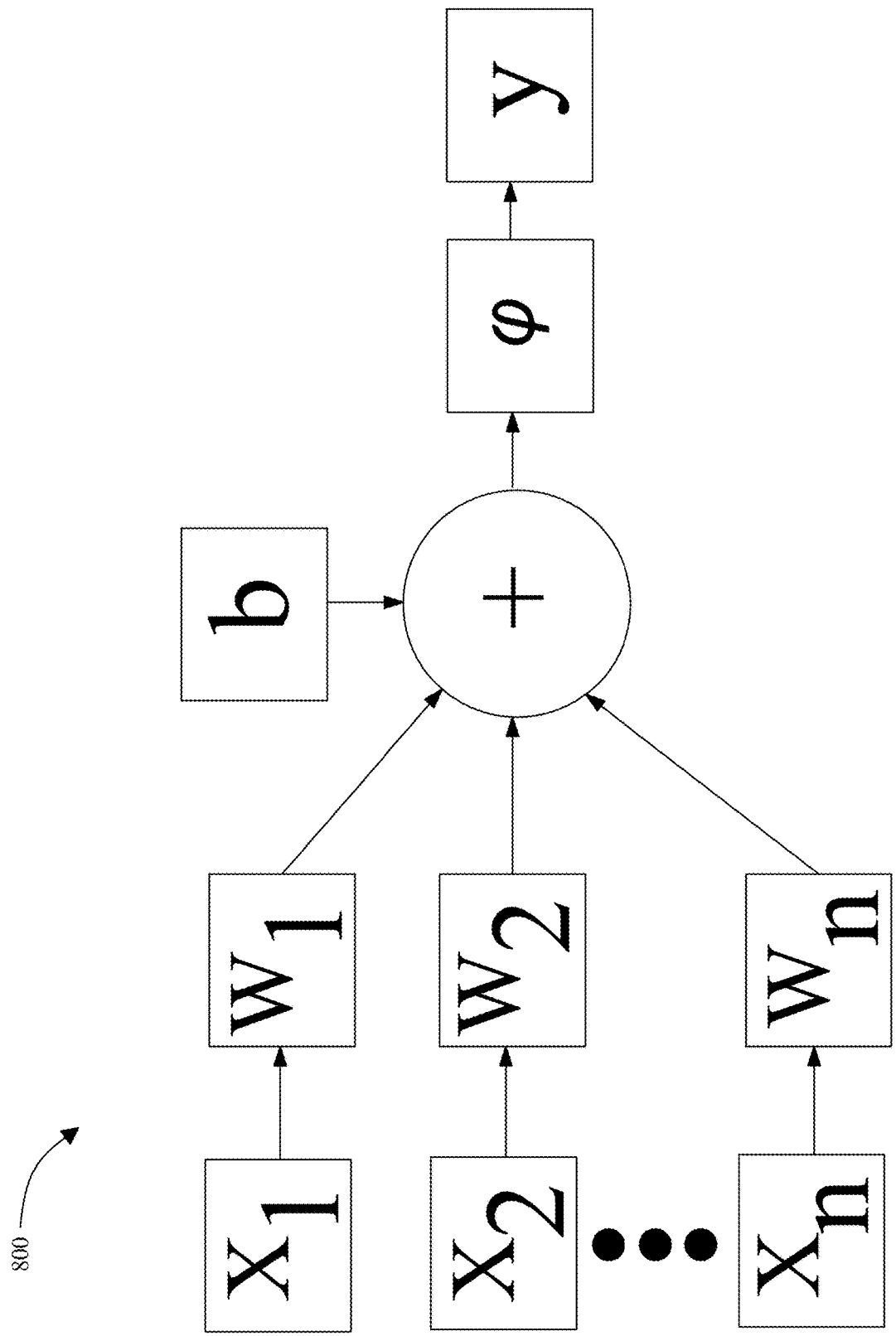
FIG. 8 illustrates a block diagram of an exemplary node.

Referring now to FIG. 8 an exemplary embodiment of a node 800 of a neural network is illustrated. A node may include, without limitation, a plurality of inputs x, that may receive numerical values from inputs to a neural network containing the node and/or from other nodes. Node may perform one or more activation functions to produce its output given one or more inputs, such as without limitation computing a binary step function comparing an input to a threshold value and outputting either a logic 1 or logic 0 output or something equivalent, a linear activation function whereby an output is directly proportional to the input, and/or a non-linear activation function, wherein the output is not proportional to the input. Non-linear activation functions may include, without limitation, a sigmoid function of the form $$f(x) = \frac{1}{1-e^{-x}}$$

given input x, a tanh (hyperbolic tangent) function, of the form $$\frac{e^x - e^{-x}}{e^x + e^{-x}},$$

a tanh derivative function such as $f(x)=\tanh^2(x)$, a rectified linear unit function such as $f(x)=\max(0, x)$, a "leaky" and/or "parametric" rectified linear unit function such as $f(x)=\max(ax, x)$ for some $\alpha$, an exponential linear units function such as $$f(x) = \begin{cases} x \text{ for } x \geq 0 \\ \alpha(e^x - 1)f \text{ for } x < 0 \end{cases}$$

for some value of $\alpha$ (this function may be replaced and/or weighted by its own derivative in some embodiments), a softmax function such as $$f(x_i) = \frac{e^x}{\sum_i x_i}$$

where the inputs to an instant layer are $x_i$, a swish function such as $f(x)=x*\text{sigmoid}(x)$, a Gaussian error linear unit function such as $f(x)=\alpha(1+\tanh(\sqrt{2/\pi}(x+bx^r)))$ for some values of a, b, and r, and/or a scaled exponential linear unit function such as $$f(x) = \lambda \begin{cases} \alpha(e^x - 1)f \text{ for } x < 0 \\ x \text{ for } x \geq 0 \end{cases}.$$

Fundamentally, there is no limit to the nature of functions of inputs x, that may be used as activation functions. As a non-limiting and illustrative example, node may perform a weighted sum of inputs using weights $w_i$, that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 9:
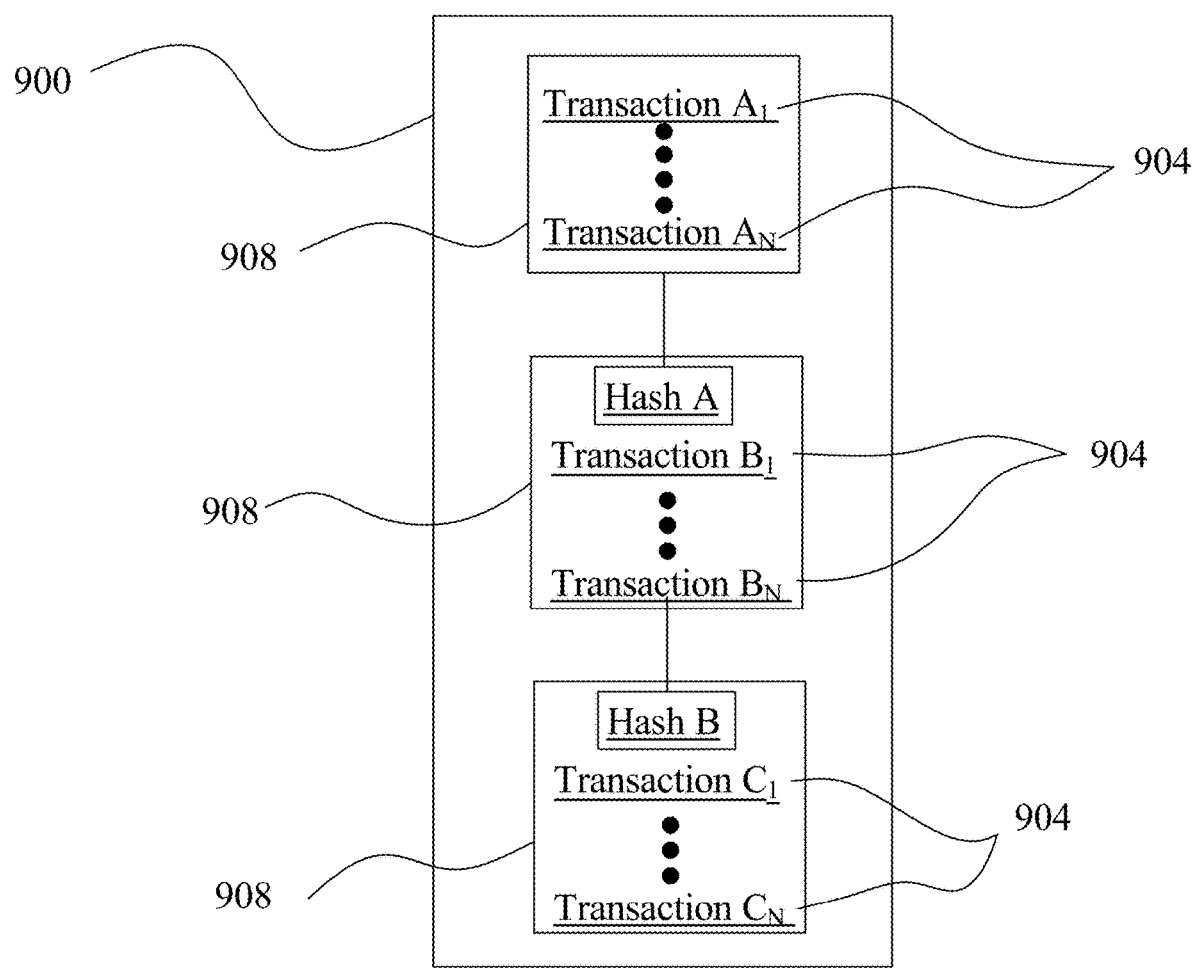
FIG. 9 illustrates a diagram of exemplary immutable sequential listing.

Referring now to FIG. 9, an exemplary embodiment of an immutable sequential listing 900 is illustrated. In an embodiment, methods and systems described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

With continued reference to FIG. 9, in embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

With continued reference to FIG. 9, in some embodiments, systems and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

With continued reference to FIG. 9, in an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-9," and "SHA-3"), "Message Digest" family hashes such as "MD4," "MD5," "MD6," and "RIPEMD," Keccak, "BLAKE" hashes and progeny (e.g., "BLAKE2," "BLAKE-956," "BLAKE-512," and the like), Message Authentication Code ("MAC")-family hash functions such as PMAC, OMAC, VMAC, HMAC, and UMAC, Poly 1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatun hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(9^{n/9})$ for n output bits; thus, it may take on the order of 9256 operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

With continued reference to FIG. 9, a "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

With continued reference to FIG. 9, Secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

With continued reference to FIG. 9, alternatively, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

With continued reference to FIG. 9, in some embodiments, zero-knowledge proof may include any other suitable zero-knowledge proof. Zero-knowledge proof may include, without limitation, bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

With continued reference to FIG. 9, in an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system, or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

With continued reference to FIG. 9, a "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

With continued reference to FIG. 9, in some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

With continued reference to FIG. 9, in some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

With continued reference to FIG. 9, data elements are listing in immutable sequential listing 900; data elements may include any form of data, including textual data, image data, encrypted data, cryptographically hashed data, and the like. Data elements may include, without limitation, one or more at least a digitally signed assertions. In one embodiment, a digitally signed assertion 904 is a collection of textual data signed using a secure proof as described in further detail below; secure proof may include, without limitation, a digital signature as described above. Collection of textual data may contain any textual data, including without limitation American Standard Code for Information Interchange (ASCII), Unicode, or similar computer-encoded textual data, any alphanumeric data, punctuation, diacritical mark, or any character or other marking used in any writing system to convey information, in any form, including any plaintext or cyphertext data; in an embodiment, collection of textual data may be encrypted, or may be a hash of other data, such as a root or node of a Merkle tree or hash tree, or a hash of any other information desired to be recorded in some fashion using a digitally signed assertion 904. In an embodiment, collection of textual data states that the owner of a certain transferable item represented in a digitally signed assertion 904 register is transferring that item to the owner of an address. A digitally signed assertion 904 may be signed by a digital signature created using the private key associated with the owner's public key, as described above.

With continued reference to FIG. 9, a digitally signed assertion 904 may describe a transfer of virtual currency, such as crypto-currency as described below. The virtual currency may be a digital currency. Item of value may be a transfer of trust, for instance represented by a statement vouching for the identity or trustworthiness of the first entity. Item of value may be an interest in a fungible negotiable financial instrument representing ownership in a public or private corporation, a creditor relationship with a governmental body or a corporation, rights to ownership represented by an option, derivative financial instrument, commodity, debt-backed security such as a bond or debenture or other security as described in further detail below. A resource may be a physical machine e.g. a ride share vehicle or any other asset. A digitally signed assertion 904 may describe the transfer of a physical good; for instance, a digitally signed assertion 904 may describe the sale of a product. In some embodiments, a transfer nominally of one item may be used to represent a transfer of another item; for instance, a transfer of virtual currency may be interpreted as representing a transfer of an access right; conversely, where the item nominally transferred is something other than virtual currency, the transfer itself may still be treated as a transfer of virtual currency, having value that depends on many potential factors including the value of the item nominally transferred and the monetary value attendant to having the output of the transfer moved into a particular user's control. The item of value may be associated with a digitally signed assertion 904 by means of an exterior protocol, such as the COLORED COINS created according to protocols developed by The Colored Coins Foundation, the MASTERCOIN protocol developed by the Mastercoin Foundation, or the ETHEREUM platform offered by the Stiftung Ethereum Foundation of Baar, Switzerland, the Thunder protocol developed by Thunder Consensus, or any other protocol.

With continued reference to FIG. 9, in one embodiment, an address is a textual datum identifying the recipient of virtual currency or another item of value in a digitally signed assertion 904. In some embodiments, address is linked to a public key, the corresponding private key of which is owned by the recipient of a digitally signed assertion 904. For instance, address may be the public key. Address may be a representation, such as a hash, of the public key. Address may be linked to the public key in memory of a computing device, for instance via a "wallet shortener" protocol. Where address is linked to a public key, a transferee in a digitally signed assertion 904 may record a subsequent a digitally signed assertion 904 transferring some or all of the value transferred in the first a digitally signed assertion 904 to a new address in the same manner. A digitally signed assertion 904 may contain textual information that is not a transfer of some item of value in addition to, or as an alternative to, such a transfer. For instance, as described in further detail below, a digitally signed assertion 904 may indicate a confidence level associated with a distributed storage node as described in further detail below.

In an embodiment, and with continued reference to FIG. 9 immutable sequential listing 900 records a series of at least a posted content in a way that preserves the order in which the at least a posted content took place. Temporally sequential listing may be accessible at any of various security settings; for instance, and without limitation, temporally sequential listing may be readable and modifiable publicly, may be publicly readable but writable only by entities and/or devices having access privileges established by password protection, confidence level, or any device authentication procedure or facilities described herein, or may be readable and/or writable only by entities and/or devices having such access privileges. Access privileges may exist in more than one level, including, without limitation, a first access level or community of permitted entities and/or devices having ability to read, and a second access level or community of permitted entities and/or devices having ability to write; first and second community may be overlapping or non-overlapping. In an embodiment, posted content and/or immutable sequential listing 900 may be stored as one or more zero knowledge sets (ZKS), Private Information Retrieval (PIR) structure, or any other structure that allows checking of membership in a set by querying with specific properties. Such database may incorporate protective measures to ensure that malicious actors may not query the database repeatedly in an effort to narrow the members of a set to reveal uniquely identifying information of a given posted content.

With continued reference to FIG. 9, immutable sequential listing 900 may preserve the order in which the at least a posted content took place by listing them in chronological order; alternatively or additionally, immutable sequential listing 900 may organize digitally signed assertions 904 into sub-listings 908 such as "blocks" in a blockchain, which may be themselves collected in a temporally sequential order; digitally signed assertions 904 within a sub-listing 908 may or may not be temporally sequential. The ledger may preserve the order in which at least a posted content took place by listing them in sub-listings 908 and placing the sub-listings 908 in chronological order. The immutable sequential listing 900 may be a distributed, consensus-based ledger, such as those operated according to the protocols promulgated by Ripple Labs, Inc., of San Francisco, Calif., or the Stellar Development Foundation, of San Francisco, Calif, or of Thunder Consensus. In some embodiments, the ledger is a secured ledger; in one embodiment, a secured ledger is a ledger having safeguards against alteration by unauthorized parties. The ledger may be maintained by a proprietor, such as a system administrator on a server, that controls access to the ledger; for instance, the user account controls may allow contributors to the ledger to add at least a posted content to the ledger, but may not allow any users to alter at least a posted content that have been added to the ledger. In some embodiments, ledger is cryptographically secured; in one embodiment, a ledger is cryptographically secured where each link in the chain contains encrypted or hashed information that makes it practically infeasible to alter the ledger without betraying that alteration has taken place, for instance by requiring that an administrator or other party sign new additions to the chain with a digital signature. Immutable sequential listing 900 may be incorporated in, stored in, or incorporate, any suitable data structure, including without limitation any database, datastore, file structure, distributed hash table, directed acyclic graph or the like. In some embodiments, the timestamp of an entry is cryptographically secured and validated via trusted time, either directly on the chain or indirectly by utilizing a separate chain. In one embodiment the validity of timestamp is provided using a time stamping authority as described in the RFC 3161 standard for trusted timestamps, or in the ANSI ASC x9.95 standard. In another embodiment, the trusted time ordering is provided by a group of entities collectively acting as the time stamping authority with a requirement that a threshold number of the group of authorities sign the timestamp.

In some embodiments, and with continued reference to FIG. 9, immutable sequential listing 900, once formed, may be inalterable by any party, no matter what access rights that party possesses. For instance, immutable sequential listing 900 may include a hash chain, in which data is added during a successive hashing process to ensure non-repudiation. Immutable sequential listing 900 may include a block chain. In one embodiment, a block chain is immutable sequential listing 900 that records one or more new at least a posted content in a data item known as a sub-listing 908 or "block." An example of a block chain is the BITCOIN block chain used to record BITCOIN transactions and values. Sub-listings 908 may be created in a way that places the sub-listings 908 in chronological order and link each sub-listing 908 to a previous sub-listing 908 in the chronological order so that any computing device may traverse the sub-listings 908 in reverse chronological order to verify any at least a posted content listed in the block chain. Each new sub-listing 908 may be required to contain a cryptographic hash describing the previous sub-listing 908. In some embodiments, the block chain contains a single first sub-listing 908 sometimes known as a "genesis block."

With continued reference to FIG. 9, the creation of a new sub-listing 908 may be computationally expensive; for instance, the creation of a new sub-listing 908 may be designed by a "proof of work" protocol accepted by all participants in forming the immutable sequential listing 900 to take a powerful set of computing devices a certain period of time to produce. Where one sub-listing 908 takes less time for a given set of computing devices to produce the sub-listing 908 protocol may adjust the algorithm to produce the next sub-listing 908 so that it will require more steps; where one sub-listing 908 takes more time for a given set of computing devices to produce the sub-listing 908 protocol may adjust the algorithm to produce the next sub-listing 908 so that it will require fewer steps. As an example, protocol may require a new sub-listing 908 to contain a cryptographic hash describing its contents; the cryptographic hash may be required to satisfy a mathematical condition, achieved by having the sub-listing 908 contain a number, called a nonce, whose value is determined after the fact by the discovery of the hash that satisfies the mathematical condition. Continuing the example, the protocol may be able to adjust the mathematical condition so that the discovery of the hash describing a sub-listing 908 and satisfying the mathematical condition requires more or less steps, depending on the outcome of the previous hashing attempt. Mathematical condition, as an example, might be that the hash contains a certain number of leading zeros and a hashing algorithm that requires more steps to find a hash containing a greater number of leading zeros, and fewer steps to find a hash containing a lesser number of leading zeros. In some embodiments, production of a new sub-listing 908 according to the protocol is known as "mining." The creation of a new sub-listing 908 may be designed by a "proof of stake" protocol as will be apparent to those skilled in the art upon reviewing the entirety of this disclosure.

Continuing to refer to FIG. 9, in some embodiments, protocol also creates an incentive to mine new sub-listings 908. The incentive may be financial; for instance, successfully mining a new sub-listing 908 may result in the person or entity that mines the sub-listing 908 receiving a predetermined amount of currency. The currency may be fiat currency. Currency may be cryptocurrency as defined below. In other embodiments, incentive may be redeemed for particular products or services; the incentive may be a gift certificate with a particular business, for instance. In some embodiments, incentive is sufficiently attractive to cause participants to compete for the incentive by trying to race each other to the creation of sub-listings 908 Each sub-listing 908 created in immutable sequential listing 900 may contain a record or at least a posted content describing one or more addresses that receive an incentive, such as virtual currency, as the result of successfully mining the sub-listing 908.

With continued reference to FIG. 9, where two entities simultaneously create new sub-listings 908, immutable sequential listing 900 may develop a fork; protocol may determine which of the two alternate branches in the fork is the valid new portion of the immutable sequential listing 900 by evaluating, after a certain amount of time has passed, which branch is longer. "Length" may be measured according to the number of sub-listings 908 in the branch. Length may be measured according to the total computational cost of producing the branch. Protocol may treat only at least a posted content contained the valid branch as valid at least a posted content. When a branch is found invalid according to this protocol, at least a posted content registered in that branch may be recreated in a new sub-listing 908 in the valid branch; the protocol may reject "double spending" at least a posted content that transfer the same virtual currency that another at least a posted content in the valid branch has already transferred. As a result, in some embodiments the creation of fraudulent at least a posted content requires the creation of a longer immutable sequential listing 900 branch by the entity attempting the fraudulent at least a posted content than the branch being produced by the rest of the participants; as long as the entity creating the fraudulent at least a posted content is likely the only one with the incentive to create the branch containing the fraudulent at least a posted content, the computational cost of the creation of that branch may be practically infeasible, guaranteeing the validity of all at least a posted content in the immutable sequential listing 900.

With continued reference to FIG. 9, additional data linked to at least a posted content may be incorporated in sub-listings 908 in the immutable sequential listing 900; for instance, data may be incorporated in one or more fields recognized by block chain protocols that permit a person or computer forming a at least a posted content to insert additional data in the immutable sequential listing 900. In some embodiments, additional data is incorporated in an unspendable at least a posted content field. For instance, the data may be incorporated in an OP_RETURN within the BITCOIN block chain. In other embodiments, additional data is incorporated in one signature of a multi-signature at least a posted content. In an embodiment, a multi-signature at least a posted content is at least a posted content to two or more addresses. In some embodiments, the two or more addresses are hashed together to form a single address, which is signed in the digital signature of the at least a posted content. In other embodiments, the two or more addresses are concatenated. In some embodiments, two or more addresses may be combined by a more complicated process, such as the creation of a Merkle tree or the like. In some embodiments, one or more addresses incorporated in the multi-signature at least a posted content are typical crypto-currency addresses, such as addresses linked to public keys as described above, while one or more additional addresses in the multi-signature at least a posted content contain additional data related to the at least a posted content; for instance, the additional data may indicate the purpose of the at least a posted content, aside from an exchange of virtual currency, such as the item for which the virtual currency was exchanged. In some embodiments, additional information may include network statistics for a given node of network, such as a distributed storage node, e.g. the latencies to nearest neighbors in a network graph, the identities or identifying information of neighboring nodes in the network graph, the trust level and/or mechanisms of trust (e.g. certificates of physical encryption keys, certificates of software encryption keys, (in non-limiting example certificates of software encryption may indicate the firmware version, manufacturer, hardware version and the like), certificates from a trusted third party, certificates from a decentralized anonymous authentication procedure, and other information quantifying the trusted status of the distributed storage node) of neighboring nodes in the network graph, IP addresses, GPS coordinates, and other information informing location of the node and/or neighboring nodes, geographically and/or within the network graph. In some embodiments, additional information may include history and/or statistics of neighboring nodes with which the node has interacted. In some embodiments, this additional information may be encoded directly, via a hash, hash tree or other encoding.

With continued reference to FIG. 9, in some embodiments, virtual currency is traded as a crypto-currency. In one embodiment, a crypto-currency is a digital, currency such as Bitcoins, Peercoins, Namecoins, and Litecoins. Crypto-currency may be a clone of another crypto-currency. The crypto-currency may be an "alt-coin." Crypto-currency may be decentralized, with no particular entity controlling it; the integrity of the crypto-currency may be maintained by adherence by its participants to established protocols for exchange and for production of new currency, which may be enforced by software implementing the crypto-currency. Crypto-currency may be centralized, with its protocols enforced or hosted by a particular entity. For instance, crypto-currency may be maintained in a centralized ledger, as in the case of the XRP currency of Ripple Labs, Inc., of San Francisco, Calif. In lieu of a centrally controlling authority, such as a national bank, to manage currency values, the number of units of a particular crypto-currency may be limited; the rate at which units of crypto-currency enter the market may be managed by a mutually agreed-upon process, such as creating new units of currency when mathematical puzzles are solved, the degree of difficulty of the puzzles being adjustable to control the rate at which new units enter the market. Mathematical puzzles may be the same as the algorithms used to make productions of sub-listings 908 in a block chain computationally challenging; the incentive for producing sub-listings 908 may include the grant of new crypto-currency to the miners. Quantities of crypto-currency may be exchanged using at least a posted content as described above.

Figure 10:
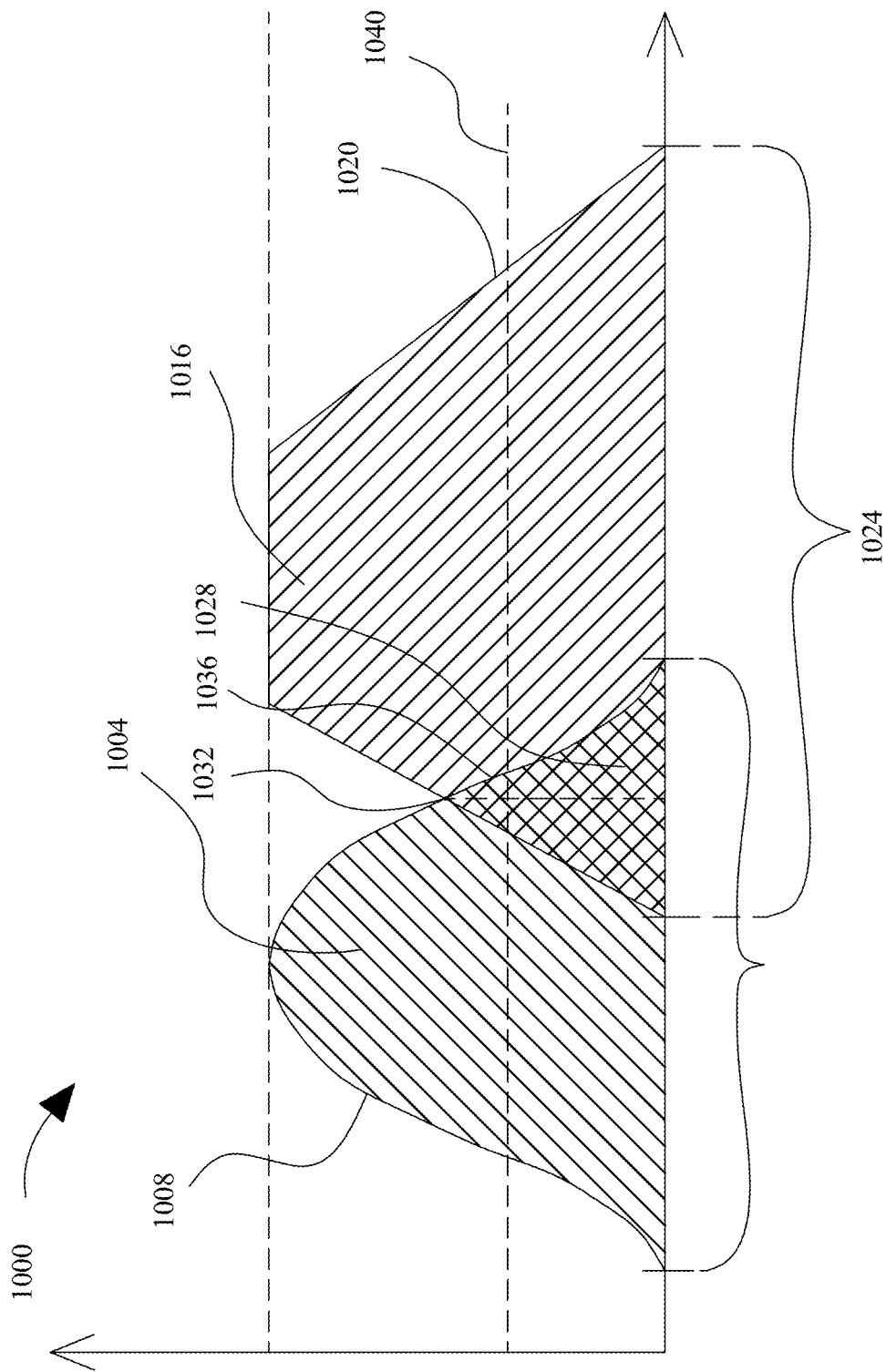
FIG. 10 illustrates a block diagram of a fuzzy set system.

Referring to FIG. 10, an exemplary embodiment of fuzzy set comparison 1000 is illustrated. A first fuzzy set 1004 may be represented, without limitation, according to a first membership function 1008 representing a probability that an input falling on a first range of values 1012 is a member of the first fuzzy set 1004, where the first membership function 1008 has values on a range of probabilities such as without limitation the interval [0,1], and an area beneath the first membership function 1008 may represent a set of values within first fuzzy set 1004. Although first range of values 1012 is illustrated for clarity in this exemplary depiction as a range on a single number line or axis, first range of values 1012 may be defined on two or more dimensions, representing, for instance, a Cartesian product between a plurality of ranges, curves, axes, spaces, dimensions, or the like. First membership function 1008 may include any suitable function mapping first range 1012 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \le x < b \\ \frac{c-x}{c-b}, \text{ if } b < x \le c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

With continued reference to FIG. 10, first fuzzy set 1004 may represent any value or combination of values as described above, including output from one or more machine-learning models, obstacle datum, and a predetermined class, such as without limitation of resolution urgency datum. A second fuzzy set 1016, which may represent any value which may be represented by first fuzzy set 1004, may be defined by a second membership function 1020 on a second range 1024; second range 1024 may be identical and/or overlap with first range 1012 and/or may be combined with first range via Cartesian product or the like to generate a mapping permitting evaluation overlap of first fuzzy set 1004 and second fuzzy set 1016. Where first fuzzy set 1004 and second fuzzy set 1016 have a region 1028 that overlaps, first membership function 1008 and second membership function 1020 may intersect at a point 1032 representing a probability, as defined on probability interval, of a match between first fuzzy set 1004 and second fuzzy set 1016. Alternatively or additionally, a single value of first and/or second fuzzy set may be located at a locus 1036 on first range 1012 and/or second range 1024, where a probability of membership may be taken by evaluation of first membership function 1008 and/or second membership function 1020 at that range point. A probability at 1028 and/or 1032 may be compared to a threshold 1040 to determine whether a positive match is indicated. Threshold 1040 may, in a non-limiting example, represent a degree of match between first fuzzy set 1004 and second fuzzy set 1016, and/or single values therein with each other or with either set, which is sufficient for purposes of the matching process; for instance, threshold may indicate a sufficient degree of overlap between an output from one or more machine-learning models and/or obstacle datum and a predetermined class, such as without limitation resolution urgency datum categorization, for combination to occur as described above. Alternatively or additionally, each threshold may be tuned by a machine-learning and/or statistical process, for instance and without limitation as described in further detail below.

Further referring to FIG. 10, in an embodiment, a degree of match between fuzzy sets may be used to classify obstacle datum with resolution urgency datum. For instance, if a resolution urgency datum has a fuzzy set matching obstacle datum fuzzy set by having a degree of overlap exceeding a threshold, processor 104 may classify the obstacle datum as belonging to the resolution urgency datum categorization. Where multiple fuzzy matches are performed, degrees of match for each respective fuzzy set may be computed and aggregated through, for instance, addition, averaging, or the like, to determine an overall degree of match.

With continued reference to FIG. 10, in an embodiment, an obstacle datum may be compared to multiple resolution urgency datum categorization fuzzy sets. For instance, obstacle datum may be represented by a fuzzy set that is compared to each of the multiple resolution urgency datum categorization fuzzy sets; and a degree of overlap exceeding a threshold between the obstacle datum fuzzy set and any of the multiple resolution urgency datum categorization fuzzy sets may cause processor 104 to classify the obstacle datum as belonging to resolution urgency datum categorization. For instance, in one embodiment there may be two resolution urgency datum categorization fuzzy sets, representing respectively resolution urgency datum categorization and a resolution urgency datum categorization. First resolution urgency datum categorization may have a first fuzzy set; Second resolution urgency datum categorization may have a second fuzzy set; and obstacle datum may have an obstacle datum fuzzy set. processor 104, for example, may compare an obstacle datum fuzzy set with each of resolution urgency datum categorization fuzzy set and non-resolution urgency datum categorization fuzzy set, as described above, and classify an obstacle datum to either, both, or neither of resolution urgency datum categorization nor non-resolution urgency datum categorization. Machine-learning methods as described throughout may, in a non-limiting example, generate coefficients used in fuzzy set equations as described above, such as without limitation x, c, and o of a Gaussian set as described above, as outputs of machine-learning methods. Likewise, obstacle datum may be used indirectly to determine a fuzzy set, as obstacle datum fuzzy set may be derived from outputs of one or more machine-learning models that take the obstacle datum directly or indirectly as inputs.

With continued reference to FIG. 10, a computing device may use a logic comparison program, such as, but not limited to, a fuzzy logic model to determine a resolution urgency datum response. An resolution urgency datum response may include, but is not limited to, obstacle datum, medium urgency, low urgency, and the like; each such resolution urgency datum response may be represented as a value for a linguistic variable representing resolution urgency datum response or in other words a fuzzy set as described above that corresponds to a degree of urgency as calculated using any statistical, machine-learning, or other method that may occur to a person skilled in the art upon reviewing the entirety of this disclosure. In other words, a given element of obstacle datum may have a first non-zero value for membership in a first linguistic variable value such as "high urgency" and a second non-zero value for membership in a second linguistic variable value such as "low urgency" In some embodiments, determining a resolution urgency datum categorization may include using a linear regression model. A linear regression model may include a machine learning model. A linear regression model may be configured to map data of obstacle datum, such as degree of urgency to one or more resolution urgency datum parameters. A linear regression model may be trained using a machine learning process. A linear regression model may map statistics such as, but not limited to, quality of obstacle datum urgency. In some embodiments, determining a resolution urgency datum of obstacle datum may include using a resolution urgency datum classification model. A resolution urgency datum classification model may be configured to input collected data and cluster data to a centroid based on, but not limited to, frequency of appearance, linguistic indicators of quality, and the like. Centroids may include scores assigned to them such that quality of urgency of obstacle datum may each be assigned a score. In some embodiments resolution urgency datum classification model may include a K-means clustering model. In some embodiments, resolution urgency datum classification model may include a particle swarm optimization model. In some embodiments, determining the resolution urgency datum of an obstacle datum may include using a fuzzy inference engine. A fuzzy inference engine may be configured to map one or more obstacle datum data elements using fuzzy logic. In some embodiments, obstacle datum may be arranged by a logic comparison program into resolution urgency datum arrangement. An "resolution urgency datum arrangement" as used in this disclosure is any grouping of objects and/or data based on skill level and/or output score. This step may be implemented as described above in FIGS. 1-9. Membership function coefficients and/or constants as described above may be tuned according to classification and/or clustering algorithms. For instance, and without limitation, a clustering algorithm may determine a Gaussian or other distribution of questions about a centroid corresponding to a given urgency level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 10, an inference engine may be implemented according to input and/or output membership functions and/or linguistic variables. For instance, a first linguistic variable may represent a first measurable value pertaining to obstacle datum, such as a degree of urgency of an element, while a second membership function may indicate a degree of in resolution urgency datum of a subject thereof, or another measurable value pertaining to obstacle datum. Continuing the example, an output linguistic variable may represent, without limitation, a score value. An inference engine may combine rules, such as: "if the urgency level is 'high'"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T (T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b-a*b), bounded sum, and/or drastic T-conorm; any T-conorm may be used that satisfies the properties of commutativity: 1(a, b)=1(b, a), monotonicity: 1(a, b)≤1(c, d) if a≤c and b≤d, associativity: 1(a, 1(b, c))=1(1(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

Further referring to FIG. 10, obstacle datum to be used may be selected by user selection, and/or by selection of a distribution of output scores, such as 100% high urgency, 40% low urgency, and 100% low urgency or the like. Each resolution urgency datum categorization may be selected using an additional function such as non-resolution urgency datum as described above. Additionally and/or alternatively, example of utilization of fuzzy set is merely an example, and person skilled in the art, upon reviewing the entirety of this disclosure, may appreciate various methods of using fuzzy set in apparatus 100.

Figure 11:
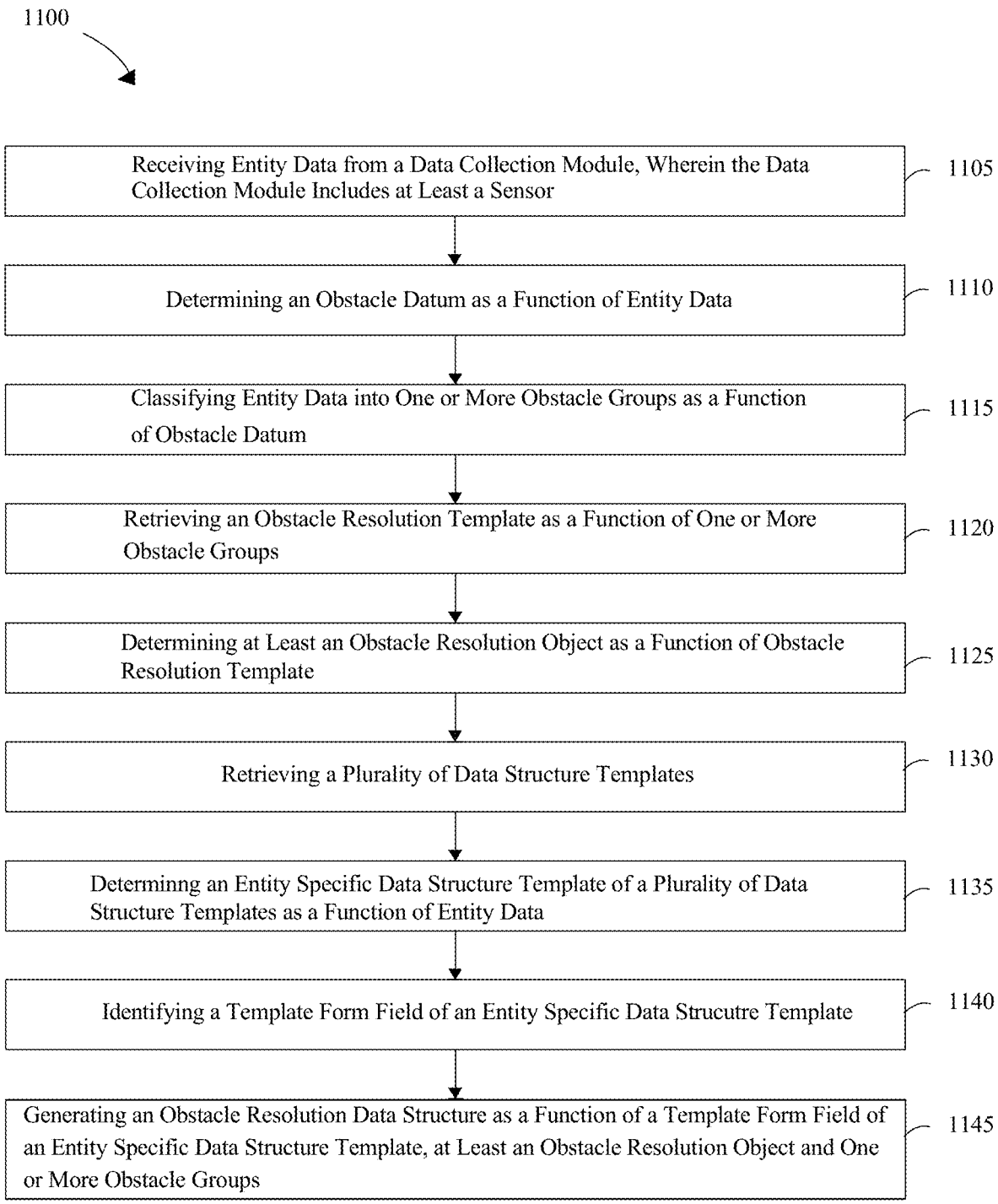
FIG. 11 illustrates a flow diagram of an exemplary method for data aggregation and analysis.

Referring now to FIG. 11, a flow diagram of an exemplary method 1100 for entity data aggregation and analysis is illustrated. Method 1100 includes a step 1105 of receiving, using at least a processor, entity data from a data collection module, wherein the data collection module includes at least a sensor. In some embodiments, the data collection module may further include a chatbot. In some embodiments, method 1100 may further include finding, using the at least a processor, an entity identifier using an optical character recognition and retrieving, using the at least a processor, the entity data as a function of the entity identifier. These may be implemented as disclosed with reference to FIGS. 1-10.

With continued reference to FIG. 11, method 1100 includes a step 1110 of determining, using at least a processor, an obstacle datum as a function of entity data. In some embodiments, method 1100 may further include receiving, using the at least a processor, an obstacle datum handler input for the entity data and determining, using the at least a processor, the obstacle datum as a function of the obstacle datum handler input. These may be implemented as disclosed with reference to FIGS. 1-10.

With continued reference to FIG. 11, method 1100 includes a step 1115 of classifying, using at least a processor, entity data into one or more obstacle groups as a function of obstacle datum of the entity data. These may be implemented as disclosed with reference to FIGS. 1-10.

With continued reference to FIG. 11, method 1100 includes a step 1120 of retrieving, using at least a processor, an obstacle resolution template as a function of one or more obstacle groups. These may be implemented as disclosed with reference to FIGS. 1-10.

With continued reference to FIG. 11, method 1100 includes a step 1125 of determining, using at least a processor, at least an obstacle resolution object as a function of an obstacle resolution template. In some embodiments, method 1100 may further include determining, using the at least a processor, a maneuver obstacle datum as a function of a user entity maneuver datum of the entity data and determining, using the at least a processor, the at least an obstacle resolution object as a function of the maneuver obstacle datum. These may be implemented as disclosed with reference to FIGS. 1-10.

With continued reference to FIG. 11, method 1100 includes a step 1130 of retrieving, using at least a processor, a plurality of data structure templates. These may be implemented as disclosed with reference to FIGS. 1-10.

With continued reference to FIG. 11, method 1100 includes a step 1135 of determining, using at least a processor, an entity specific data structure template of a plurality of data structure templates as a function of entity data. These may be implemented as disclosed with reference to FIGS. 1-10.

With continued reference to FIG. 11, method 1100 includes a step 1140 of identifying, using at least a processor, a template form field of an entity specific data structure template. These may be implemented as disclosed with reference to FIGS. 1-10.

With continued reference to FIG. 11, method 1100 includes a step 1145 of generating, using at least a processor, an obstacle resolution data structure as a function of a template form field of an entity specific data structure template, at least an obstacle resolution object and one or more obstacle groups. In some embodiments, method 1100 may further include determining, using the at least a processor, a pro-resolution datum of the at least an obstacle resolution object and generating, using the at least a processor, the obstacle resolution data structure as a function of the pro-resolution datum. In some embodiments, the obstacle resolution data structure may include an obstacle image sequence. In some embodiments, the obstacle resolution data structure may include a handler timetable data structure. In some embodiments, method 1100 may further include receiving, using the at least a processor, a user input as a function of the obstacle resolution data structure, wherein the user input may include a rejection. In some embodiments, method 1100 may further include generating, using the at least a processor, a rejection resolution datum as a function of the rejection of the user input. These may be implemented as disclosed with reference to FIGS. 1-10.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 12:
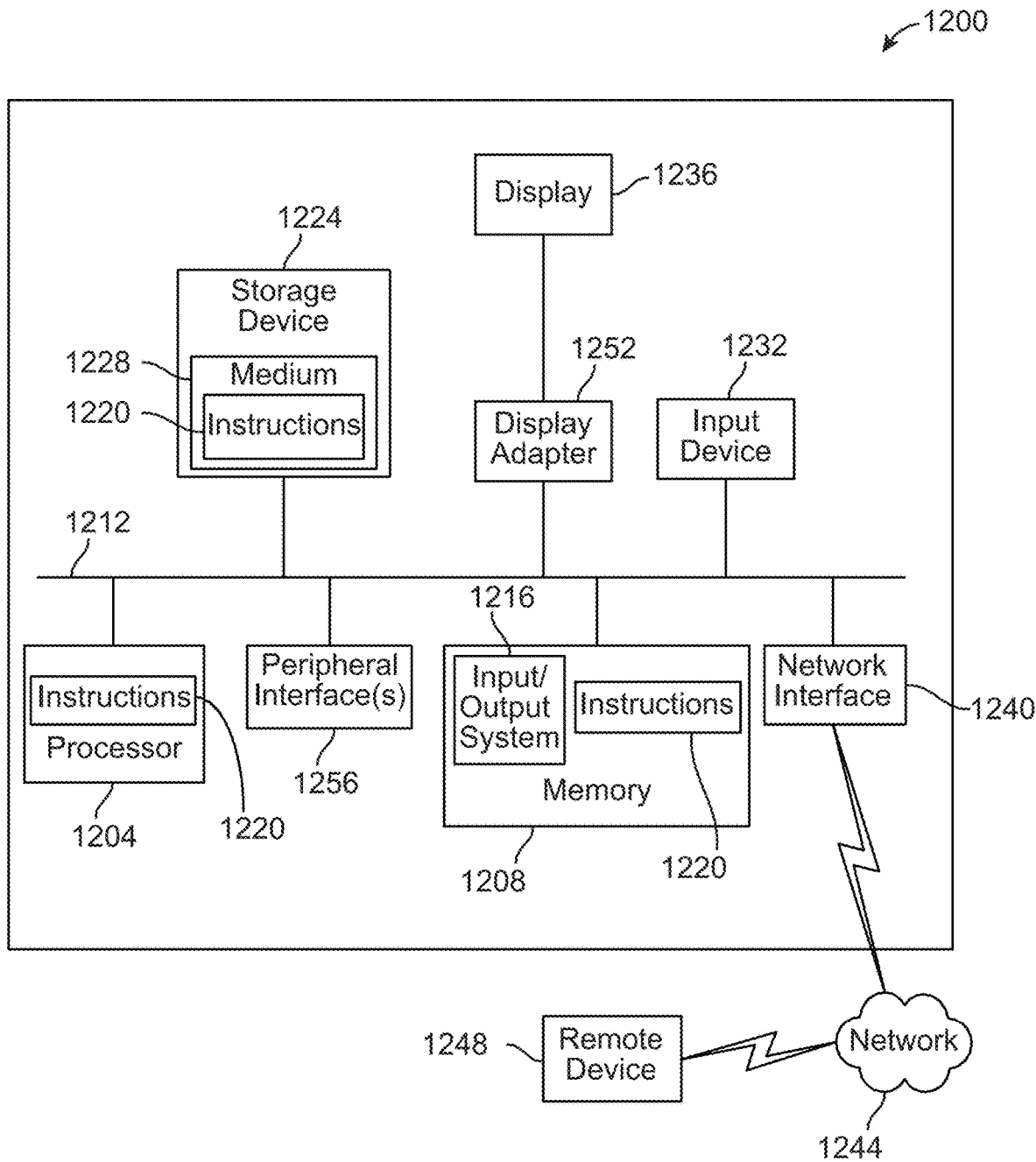
FIG. 12 illustrates a block diagram of a computing system that can be used to implement any one or more of the methodologies disclosed herein and any one or more portions thereof.

FIG. 12 shows a diagrammatic representation of one embodiment of a computing device in the exemplary form of a computer system 1200 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1200 includes a processor 1204 and memory 1208 that communicate with each other, and with other components, via a bus 1212. Bus 1212 may include any of several types of bus structures including, but not limited to, memory bus, memory controller, a peripheral bus, a local bus, and any combinations thereof, using any of a variety of bus architectures.

Processor 1204 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1204 may be organized according to Von Neumann and/or Harvard architecture as a non-limiting example. Processor 1204 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1208 may include various components (e.g., machine-readable media) including, but not limited to, a random-access memory component, a read only component, and any combinations thereof. In one example, a basic input/output system 1216 (BIOS), including basic routines that help to transfer information between elements within computer system 1200, such as during start-up, may be stored in memory 1208. Memory 1208 may also include (e.g., stored on one or more machine-readable media) instructions (e.g., software) 1220 embodying any one or more of the aspects and/or methodologies of the present disclosure. In another example, memory 1208 may further include any number of program modules including, but not limited to, an operating system, one or more application programs, other program modules, program data, and any combinations thereof.

Computer system 1200 may also include a storage device 1224. Examples of a storage device (e.g., storage device 1224) include, but are not limited to, a hard disk drive, a magnetic disk drive, an optical disc drive in combination with an optical medium, a solid-state memory device, and any combinations thereof. Storage device 1224 may be connected to bus 1212 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1224 (or one or more components thereof) may be removably interfaced with computer system 1200 (e.g., via an external port connector (not shown)). Particularly, storage device 1224 and an associated machine-readable medium 1228 may provide nonvolatile and/or volatile storage of machine-readable instructions, data structures, program modules, and/or other data for computer system 1200. In one example, software 1220 may reside, completely or partially, within machine-readable medium 1228. In another example, software 1220 may reside, completely or partially, within processor 1204.

Computer system 1200 may also include an input device 1232. In one example, a user of computer system 1200 may enter commands and/or other information into computer system 1200 via input device 1232. Examples of an input device 1232 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1232 may be interfaced to bus 1212 via any of a variety of interfaces (not shown) including, but not limited to, a serial interface, a parallel interface, a game port, a USB interface, a FIREWIRE interface, a direct interface to bus 1212, and any combinations thereof. Input device 1232 may include a touch screen interface that may be a part of or separate from display 1236, discussed further below. Input device 1232 may be utilized as a user selection device for selecting one or more graphical representations in a graphical interface as described above.

A user may also input commands and/or other information to computer system 1200 via storage device 1224 (e.g., a removable disk drive, a flash drive, etc.) and/or network interface device 1240. A network interface device, such as network interface device 1240, may be utilized for connecting computer system 1200 to one or more of a variety of networks, such as network 1244, and one or more remote devices 1248 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1244, may employ a wired and/or a wireless mode of communication. In general, any network topology may be used. Information (e.g., data, software 1220, etc.) may be communicated to and/or from computer system 1200 via network interface device 1240.

Computer system 1200 may further include a video display adapter 1252 for communicating a displayable image to a display device, such as display device 1236. Examples of a display device include, but are not limited to, a liquid crystal display (LCD), a cathode ray tube (CRT), a plasma display, a light emitting diode (LED) display, and any combinations thereof. Display adapter 1252 and display device 1236 may be utilized in combination with processor 1204 to provide graphical representations of aspects of the present disclosure. In addition to a display device, computer system 1200 may include one or more other peripheral output devices including, but not limited to, an audio speaker, a printer, and any combinations thereof. Such peripheral output devices may be connected to bus 1212 via a peripheral interface 1256. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and apparatuses according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for entity data aggregation and analysis, the apparatus comprising:

at least a processor, and a memory communicatively connected to the at least a processor, wherein the memory contains instructions configuring the at least a processor to:
receive entity data from a data collection module, wherein the data collection module comprises at least a sensor;
determine an obstacle datum as a function of the entity data;
determine a frequency of at least an obstacle resolution object that was previously executed for the obstacle datum;
classify the entity data into one or more obstacle groups as a function of the obstacle datum of the entity data;
determine the at least an obstacle resolution object as a function of the one or more obstacle groups, and the frequency of the at least an obstacle resolution object that was previously executed, wherein determining the at least an obstacle resolution object comprises:
retrieving an obstacle resolution template as a function of the one or more obstacle groups;
determining the at least an obstacle resolution object as a function of the obstacle resolution template;
determine at least a component necessary for the at least an obstacle resolution object using a component identifier;
determine a component availability as a function of the at least a component and the at least an obstacle resolution object; and
transmit a delivery request for an unavailable component in response to the determined component availability; and
generate an obstacle resolution data structure as a function of the at least an obstacle resolution object and the one or more obstacle groups, wherein generating the obstacle resolution data structure comprises:
retrieving a plurality of data structure templates;
determining an entity specific data structure template of the plurality of data structure templates as a function of the entity data, identifying a template form field of the entity specific data structure template; and
generating the obstacle resolution data structure as a function of the template form field of the entity specific data structure template, the at least an obstacle resolution object and the one or more obstacle groups.

2. The apparatus of claim 1, wherein the data collection module further comprises a chatbot.

3. The apparatus of claim 1, wherein determining the obstacle datum comprises:
receiving an obstacle datum handler input for the entity data; and
determining the obstacle datum as a function of the obstacle datum handler input.

4. The apparatus of claim 1, wherein determining the at least an obstacle resolution object further comprises:
determining a pro-resolution datum of the at least an obstacle resolution object; and
generating the obstacle resolution data structure as a function of the pro-resolution datum.

5. The apparatus of claim 1, wherein the obstacle resolution data structure comprises an obstacle image sequence.

6. The apparatus of claim 1, wherein generating the obstacle resolution data structure comprises:
finding an entity identifier using an optical character recognition; and
retrieving the entity data as a function of the entity identifier.

7. The apparatus of claim 1, wherein:
the entity data comprises a user entity maneuver datum; and
the memory contains instructions further configuring the at least a processor to:
determine a maneuver obstacle datum as a function of the user entity maneuver datum of the entity data; and
determine the at least an obstacle resolution object as a function of the maneuver obstacle datum.

8. The apparatus of claim 1, wherein the obstacle resolution data structure comprises a handler timetable data structure.

9. The apparatus of claim 1, wherein the memory contains instructions further configuring the at least a processor to receive a user input as a function of the obstacle resolution data structure, wherein the user input comprises a rejection.

10. The apparatus of claim 9, wherein the memory contains instructions further configuring the at least a processor to generate a rejection resolution datum as a function of the rejection of the user input.

11. A method for entity data aggregation and analysis, the method comprising:
receiving, using at least a processor, entity data from a data collection module, wherein the data collection module comprises at least a sensor;
determining, using the at least a processor, an obstacle datum as a function of the entity data;
determine, using the at least a processor, a frequency of at least an obstacle resolution object that was previously executed for the obstacle datum;
classifying, using the at least a processor, the entity data into one or more obstacle groups as a function of the obstacle datum of the entity data;
determine, using the at least a processor, the at least an obstacle resolution object as a function of the one or more obstacle groups, and the frequency of the at least an obstacle resolution object that was previously executed;
retrieving, using the at least a processor, an obstacle resolution template as a function of the one or more obstacle groups;
determining, using the at least a processor, at least an obstacle resolution object as a function of the obstacle resolution template;
determine, using the at least a processor, at least a component necessary for the at least an obstacle resolution object using a component identifier;
determine, using the at least a processor, a component availability as a function of the at least a component and the at least an obstacle resolution object;
transmit, using the at least a processor, a delivery request for an unavailable component in response to the determined component availability;
retrieving, using the at least a processor, a plurality of data structure templates;
determining, using the at least a processor, an entity specific data structure template of the plurality of data structure templates as a function of the entity data;
identifying, using the at least a processor, a template form field of the entity specific data structure template; and
generating, using the at least a processor, an obstacle resolution data structure as a function of the template form field of the entity specific data structure template, the at least an obstacle resolution object and the one or more obstacle groups.

12. The method of claim 11, wherein the data collection module further comprises a chatbot.

13. The method of claim 11, further comprising:
receiving, using the at least a processor, an obstacle datum handler input for the entity data; and
determining, using the at least a processor, the obstacle datum as a function of the obstacle datum handler input.

14. The method of claim 11, further comprising:
determining, using the at least a processor, a pro-resolution datum of the at least an obstacle resolution object; and
generating, using the at least a processor, the obstacle resolution data structure as a function of the pro-resolution datum.

15. The method of claim 11, wherein the obstacle resolution data structure comprises an obstacle image sequence.

16. The method of claim 11, further comprising:
finding, using the at least a processor, an entity identifier using an optical character recognition, and
retrieving, using the at least a processor, the entity data as a function of the entity identifier.

17. The method of claim 11, further comprising:
determining, using the at least a processor, a maneuver obstacle datum as a function of a user entity maneuver datum of the entity data; and
determining, using the at least a processor, the at least an obstacle resolution object as a function of the maneuver obstacle datum.

18. The method of claim 11, wherein the obstacle resolution data structure comprises a handler timetable data structure.

19. The method of claim 11, further comprising:
receiving, using the at least a processor, a user input as a function of the obstacle resolution data structure, wherein the user input comprises a rejection.

20. The method of claim 19, further comprising:
generating, using the at least a processor, a rejection resolution datum as a function of the rejection of the user input.

* * * * *